US012659033B1

(12) United States Patent
Hallock et al.

(10) Patent No.: US 12,659,033 B1
(45) Date of Patent: Jun. 16, 2026

(54) HIGH-BANDWIDTH, FREE SPACE OPTICAL COMMUNICATIONS LINKS FOR DRONE NETWORKS

(71) Applicant: KlatchWERX LLC, Dover, DE (US)

(72) Inventors: Alexander J. Hallock, Littleton, MA (US); Michael Vestel, San Francisco, CA (US)

(73) Assignee: KLATCHWERX LLC, Dover, DE (US)

( * ) Notice: Subject to any disclaimer, the term of this patent is extended or adjusted under 35 U.S.C. 154(b) by 0 days.

(21) Appl. No.: 19/418,840

(22) Filed: Dec. 12, 2025

Related U.S. Application Data

(60) Provisional application No. 63/735,631, filed on Dec. 18, 2024.

(51) Int. Cl.
  *H04B 10/112* (2013.01)
  *H04B 10/079* (2013.01)
(52) U.S. Cl.
  CPC ..... *H04B 10/1125* (2013.01); *H04B 10/0793* (2013.01); *H04B 10/1129* (2013.01)
(58) Field of Classification Search
  CPC ............ H04B 10/1125; H04B 10/0793; H04B 10/1129; H04B 10/118; H04B 10/1123; H04B 10/1127; H04B 10/071; H04B 10/11
  See application file for complete search history.

(56) References Cited

U.S. PATENT DOCUMENTS

| | | | |
|---|---|---|---|
| 11,855,360 B1* | 12/2023 | Ziegler | H04B 10/118 |
| 2016/0043800 A1* | 2/2016 | Kingsbury | H04B 7/18513 |
| | | | 398/125 |
| 2022/0303009 A1* | 9/2022 | Boroson | H04L 1/1835 |

* cited by examiner

*Primary Examiner* — Hibret A Woldekidan
(74) *Attorney, Agent, or Firm* — GALVIN PATENT LAW LLC; Brian R. Galvin; Brian S. Boon

(57) ABSTRACT

A free space optical communication (FSOC) system suitable for drones with appropriate size, weight, acquisition performance, and range characteristics for a broad variety of drone applications including both civilian and military applications. Depending on requirements, the system may be configured to support point-to-point communications between ground stations and individual drones, mesh networking among multiple drones in a swarm configuration, and hybrid FSOC and RF capabilities providing automatic failover to maintain connectivity when optical line-of-sight is temporarily blocked. The system delivers the operational resilience necessary for tactical operations in contested environments while maintaining the bandwidth, security, and jam-resistance advantages inherent to free space optical communications.

20 Claims, 18 Drawing Sheets

Exemplary System for Free Space Optical Communications for Drone Networks 100

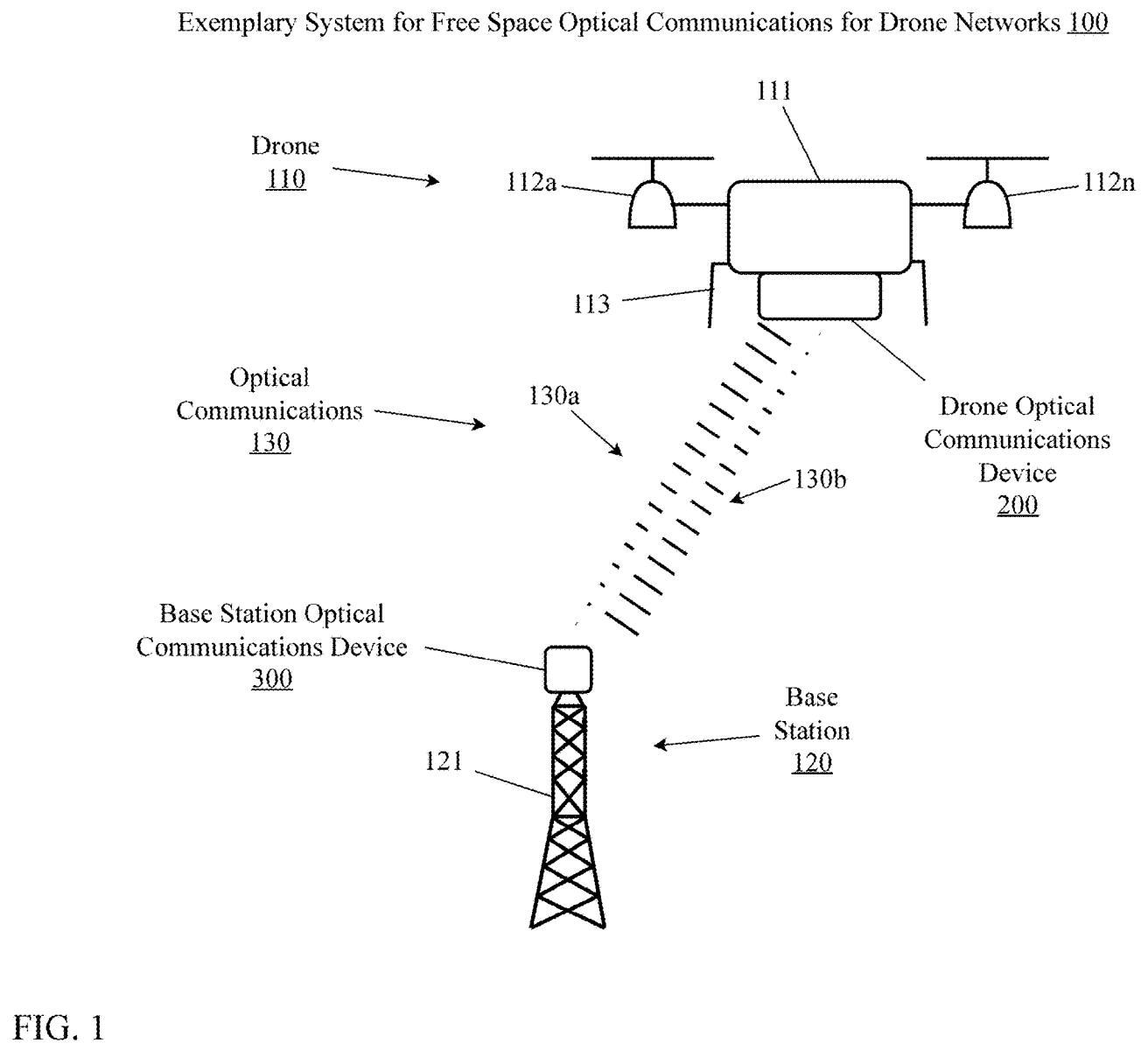

Exemplary System for Free Space Optical Communications for Drone Networks 100

Drone
110

112n

111

112a

113

Drone Optical
Communications
Device
200

Optical
Communications
130

130a

130b

Base
Station
120

121

Base Station Optical
Communications Device
300

FIG. 1

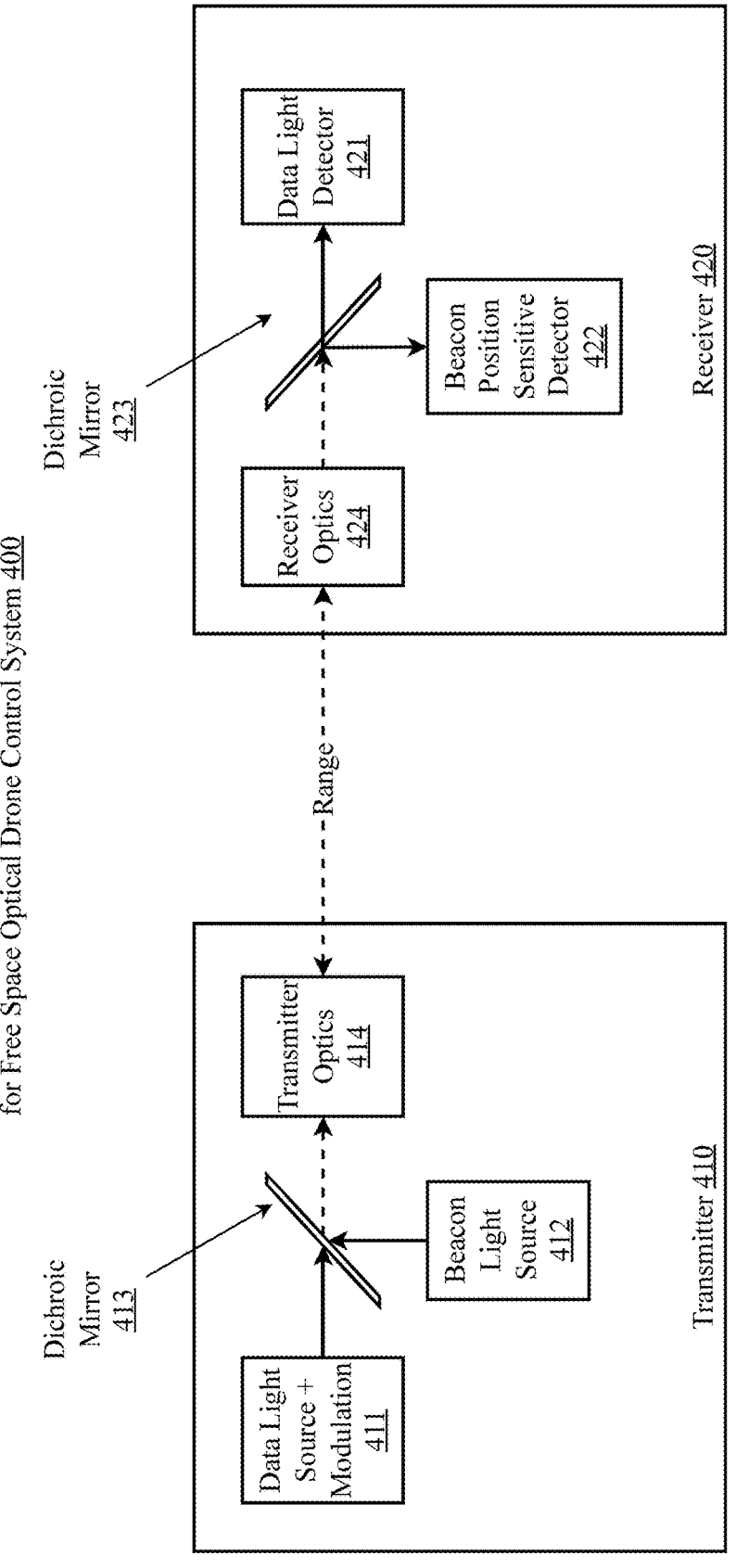

Exemplary System Architecture for Dual-Wave Beam Transmitter & Receiver for Free Space Optical Drone Control System 400

Dichroic Mirror 423

Data Light Detector 421

Beacon Position Sensitive Detector 422

Receiver Optics 424

Receiver 420

Range

Transmitter Optics 414

Dichroic Mirror 413

Beacon Light Source 412

Data Light Source + Modulation 411

Transmitter 410

= single wavelength transmission for either data beam or beacon beam

= dual wavelength transmission wherein data beam and beacon beam are both aligned to the targeted receiver Dichroic mirrors merge and separate beacon wavelength (e.g., 980nm) from data wavelength (e.g., 1550nm)

FIG. 4

Exemplary System Architecture for Base Station-Drone Communications using Common Optics & Fiber Optics Couplers & Solid-State Beam-Steering 500

Solid-state beam steering device eliminates need for active light source on drone, reducing weight (e.g., to <1 kg in some embodiments)

= Fiber optics coupler

Benefits:

- Common optics reduces weight by 30-50% vs separate TX/RX

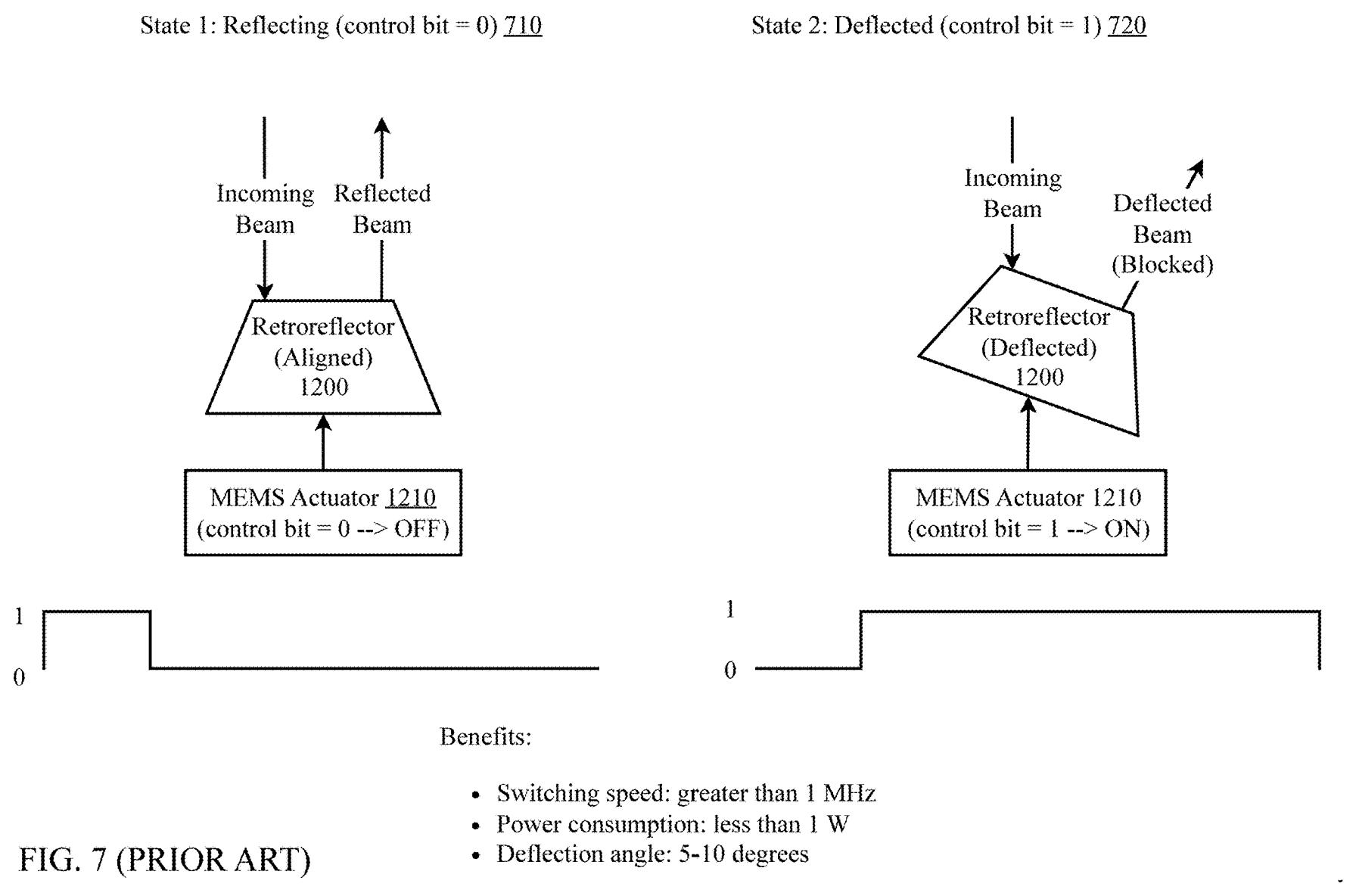

State 1: Reflecting (control bit = 0) 710

Incoming Beam

Reflected Beam

Retroreflector (Aligned) 1200

MEMS Actuator 1210 (control bit = 0 --> OFF)

State 2: Deflected (control bit = 1) 720

Incoming Beam

Deflected Beam (Blocked)

Retroreflector (Deflected) 1200

MEMS Actuator 1210 (control bit = 1 --> ON)

1

0

1

0

Benefits:

- Switching speed: greater than 1 MHz
- Power consumption: less than 1 W
- Deflection angle: 5-10 degrees

FIG. 7 (PRIOR ART)

Examplary Hybrid FSOC/RF with Automatic Failover 1000

Benefits:

- Seamless failover maintains connectivity
- RF provides low-rate backup link
- Automatic reacquisition when conditions improve Exemplary Automatic Failover Logic for Hybrid FSOC/RF 1100

Exemplary Drone Acquisition Sequence 1200

Expected target acquisition time: <10 seconds

Exemplary Overall Base Station Configuration 1300

Improvements over existing systems:

- No SWaP constraints
- High transmit power (>1 W optical)
- Large aperture for extended rangeMultiple drone tracking capability
- Asymmetric design offloads processing Exemplary Implementation of Drone Communication System as Payload 1400

Drone/Payload Mounting Interface 1410

Drone Communication System as Payload 1420

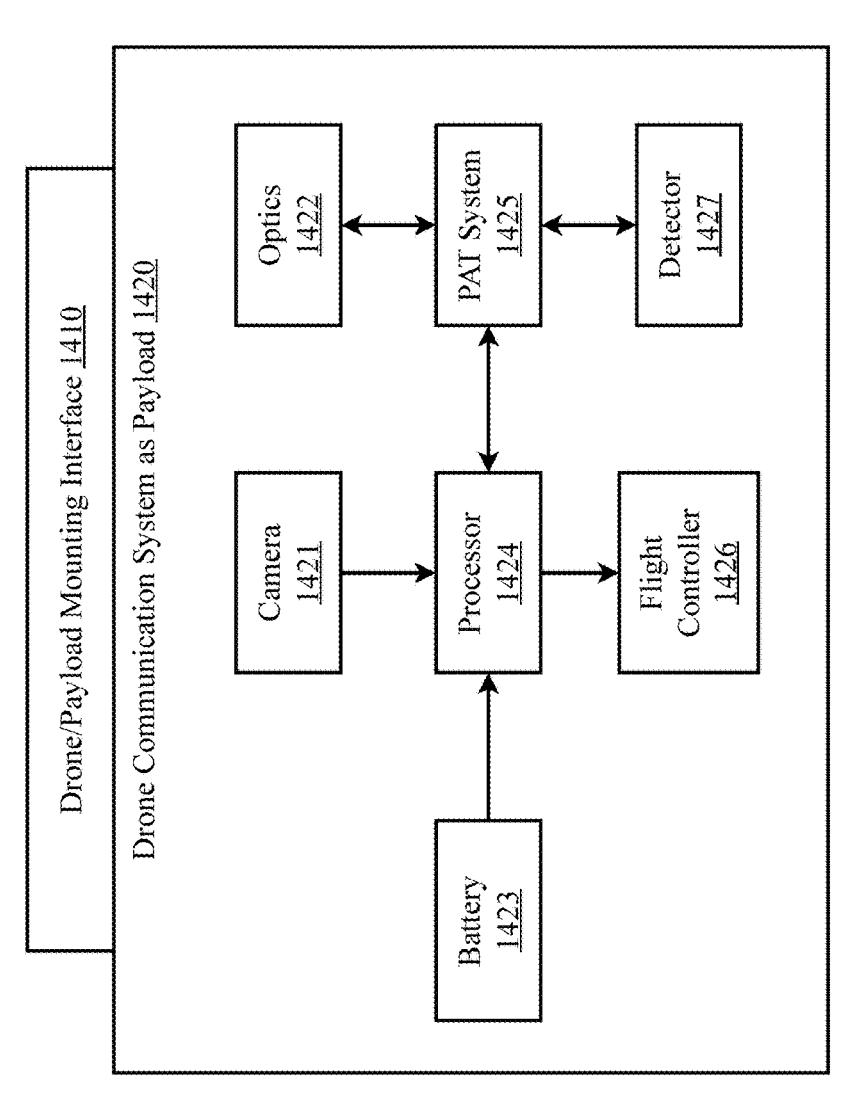

Camera 1421

Optics 1422

Battery 1423

Processor 1424

PAT System 1425

Flight Controller 1426

Detector 1427

Exemplary Payload Specifications:

- Compatible with Group 2 drones
- Standard mounting interface
- Plug-and-play integration

- Weight: <2 kg (ISR Mission)
- <1 kg (Swarm Mission)
- Power: <10 W
- Size: ~15cm x 15cm x 10cm

FIG. 14

Exemplary Tracking Control Loop 1500

Exemplary Tracking Control Architecture 1510

Exemplary Tracking Control Architecture Time Cycle 1520

Exemplary System Specifications 1530

- Update frequency: greater than 1 kHz
- Latency: less than 1 ms per cycle
- Tracking accuracy: less than 50 microrad RMS

HIGH-BANDWIDTH, FREE SPACE OPTICAL COMMUNICATIONS LINKS FOR DRONE NETWORKS

CROSS-REFERENCE TO RELATED APPLICATIONS

The following patent applications are expressly incorporated herein by reference in their entireties:
63/735,631

BACKGROUND OF THE INVENTION

Field of the Art

The present invention is in the field of communications systems, and more particularly optical communications systems for drone networks.

Discussion of the State of the Art

Drone communications are currently dominated by radio frequency (RF) systems, which have traditionally served as the primary means of wireless communication between ground control stations and unmanned aerial vehicles. While RF systems can effectively transmit data over considerable distances and have the advantage of mature technology with established protocols including frequency hopping and spread spectrum techniques, they are inherently limited by bandwidth constraints that typically restrict tactical systems to less than 10 megabits per second. More critically, recent conflicts including the ongoing war in Ukraine have demonstrated that RF systems are highly susceptible to jamming and spoofing by adversaries who have deployed sophisticated electronic warfare capabilities. Russian forces have reportedly jammed more than 10,000 Ukrainian drones per month as of August 2023, with mission failure rates in RF-denied zones reaching 50 to 90 percent, and during the Battle of Bakhmut some drones could not fly beyond 500 meters from their launch point due to intensive jamming. This vulnerability to electronic countermeasures, combined with the ease of detecting and intercepting RF emissions through signals intelligence systems, has created an urgent operational need for alternative communications technologies that can operate effectively in contested electromagnetic environments.

Free space optical communications (FSOC) systems do exist and offer certain advantages over RF systems including immunity to radio frequency interference, extremely high bandwidth capabilities, and inherent security due to narrow beam divergence that makes interception difficult without being positioned directly along the beam path. However, current FSOC systems impose severe size, weight, and power constraints that preclude their use on small tactical drones. Existing systems typically weigh between 40 and 500 kilograms per terminal (base station terminals and aircraft terminals) and consume hundreds of watts of power, with costs ranging from $500,000 to $2,000,000 per base station. These systems rely on mechanical gimbals for pointing, acquisition, and tracking functions, with the gimbal assemblies themselves constituting a substantial portion of the overall system mass. The acquisition process for current systems typically requires 10 to 60 seconds to establish a link, and the mechanical pointing systems cannot compensate quickly enough for the vibration and rapid maneuvers characteristic of small drone platforms.

What is needed is a free space optical communication system suitable for drones with appropriate size, weight, acquisition performance, and range characteristics.

SUMMARY OF THE INVENTION

Accordingly, the inventor has conceived and reduced to practice, a free space optical communication (FSOC) system suitable for drones with appropriate size, weight, acquisition performance, and range characteristics for a broad variety of drone applications including both civilian and military applications. Depending on requirements, the system may be configured to support point-to-point communications between ground stations and individual drones, mesh networking among multiple drones in a swarm configuration, and hybrid FSOC and RF capabilities providing automatic failover to maintain connectivity when optical line-of-sight is temporarily blocked. The system delivers the operational resilience necessary for tactical operations in contested environments while maintaining the bandwidth, security, and jam-resistance advantages inherent to free space optical communications.

According to a preferred embodiment, a free space optical communication system for unmanned aerial vehicles is disclosed, the system comprising: a base station optical communications device configured to transmit and receive optical signals, the base station comprising: a laser light source configured to produce an outgoing laser emission; a first pointing, acquisition, and tracking (PAT) module operating on a first computing device, the first PAT module configured to acquire and track an unmanned aerial vehicle; and a first solid-state beam steering device configured to aim the outgoing laser emission at the unmanned aerial device based on tracking information from the first PAT module; an unmanned aerial vehicle optical communications device comprising: a common optics arrangement configured to both receive the outgoing laser emission from the base station and transmit a return laser emission to the base station through a single shared aperture; a second PAT module operating on a second computing device, the second PAT module configured to acquire and track the base station; and a second solid-state beam steering device configured to aim the return laser emission at the base station optical communications device based on tracking information from the PAT module; and a fiber optic coupler between the common optics arrangement and the second solid-state beam steering device.

According to another preferred embodiment, a method for free space optical communication for unmanned aerial vehicles is disclosed, the method comprising the steps of: at a base station optical communications device configured to transmit and receive optical signals: producing an outgoing laser emission using a laser light source; acquiring and tracking an unmanned aerial vehicle using a first pointing, acquisition, and tracking (PAT) module operating on a first computing device; and aiming the outgoing laser emission at the unmanned aerial device using a first solid-state beam steering device based on tracking information from the first PAT module; at an unmanned aerial vehicle optical communications device: receiving the outgoing laser emission from the base station and transmitting a return laser emission to the base station through a single shared aperture using a common optics arrangement; acquiring and tracking the base station using a second PAT module operating on a second computing device; and aiming the return laser emission at the base station optical communications device using a second solid-state beam steering device based on tracking information from the PAT module; and coupling optical signals between the common optics arrangement and the second solid-state beam steering device using a fiber optic coupler.

According to an aspect of an embodiment, the unmanned aerial vehicle optical communications device is configured as a payload for the unmanned aerial communications device.

According to an aspect of an embodiment, the outgoing laser emission and the return laser emission are in the infrared spectrum from 800 nm to 1 mm.

According to an aspect of an embodiment, the outgoing laser emission and the return laser emission are in the range of 1,250 nanometers to 1,850 nanometers (1,550 nm+/−300 nm).

According to an aspect of an embodiment, the second solid state beam steering device comprises retroreflectors or micromirrors; and the return laser emission is a reflection of the outgoing laser emission from the retroreflectors or micromirrors of the second solid-state beam steering device.

According to an aspect of an embodiment, the unmanned aerial vehicle optical communications device further comprises a second laser light source; the return laser emission is a laser emission from the second laser light source; and the second solid-state beam steering device comprises an optical phased array (OPA) or a photonic integrated circuits (PIC).

According to an aspect of an embodiment, the base station optical communications device further comprises: a third laser light source configured to produce a second outgoing laser emission; and a first dichroic mirror; the unmanned aerial vehicle optical communications device further comprises: a second dichroic mirror; a beacon position detector; and a data light detector; wherein: the first outgoing laser emission is a beacon signal at a first wavelength; the second outgoing laser emission a data signal at a second wavelength; the first dichroic mirror is configured to merge the first outgoing laser emission and the second outgoing laser emission into a dual-wave beam aimed at the unmanned aerial vehicle; the second dichroic mirror is configured to separate the dual-wave beam back into the first outgoing laser emission and the second outgoing laser emission; the beacon position detector is configured to decode the beacon signal of the first outgoing laser emission; and the data light detector is used to decode the data signal of the second outgoing laser emission.

According to an aspect of an embodiment, the first wavelength is in the range of 800 nanometers to 1,250 nanometers; the second wavelength is in the range of 1,250 nanometers to 1,850 nanometers; and the dichroic mirrors are configured to reflect the first wavelength and pass through the second wavelength.

According to an aspect of an embodiment, the base station optical communications device further comprises: a first radio frequency communications subsystem; a first link monitor operating on the first computing device; and a first switching logic module operating on the first computing device; the unmanned aerial vehicle optical communications device further comprises: a second radio frequency communications subsystem; a second link monitor operating on the second computing device; and a second switching logic module operating on the second computing device; wherein: the link monitors monitor a quality of an optical communications connection and a quality of a radio frequency communications connection between the base station optical communications device and the unmanned aerial vehicle optical communications device; when the switching logic modules determine that the quality of the optical communications connection falls below a threshold, they switch to radio frequency communications using the radio frequency communications systems, and vice-versa.

According to an aspect of an embodiment, a tracking control loop operating on the base station optical communications device comprising a cycle of detection of a laser emission, position error computation, control algorithm calculation, beam steering, and laser emission to a target operates at 1 millisecond or less per cycle.

BRIEF DESCRIPTION OF THE DRAWING FIGURES

FIG. 1 illustrates an exemplary system for free space optical communication for drone networks.

FIG. 4 illustrates an exemplary system architecture for a free space optical drone communication system with optical beacon.

FIG. 7 (PRIOR ART) illustrates a known retroreflector modulation system that may be used to enable ultra-lightweight drone payload configurations by eliminating the need for an active light source on the drone.

FIG. 14 illustrates an exemplary implementation of drone communication system as payload for a free-space optical communication system for drone networks.

DETAILED DESCRIPTION OF THE INVENTION

Figure 2:
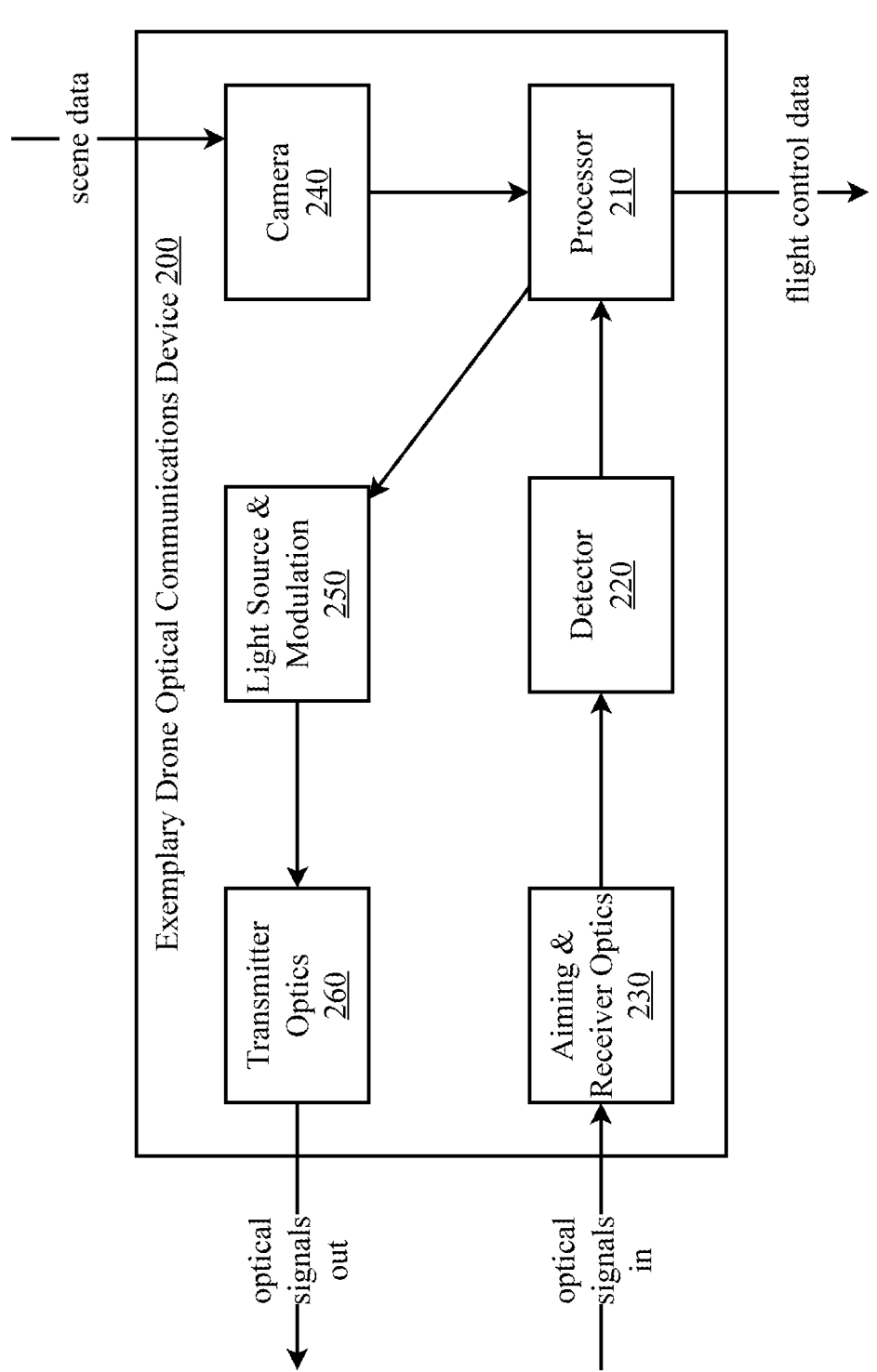
FIG. 2 illustrates an exemplary drone optical communication device.

The inventor has conceived, and reduced to practice, a free space optical communication (FSOC) system suitable for drones with appropriate size, weight, acquisition performance, and range characteristics for a broad variety of drone applications including both civilian and military applications. Depending on requirements, the system may be configured to support point-to-point communications between ground stations and individual drones, mesh networking among multiple drones in a swarm configuration, and hybrid FSOC and RF capabilities providing automatic failover to maintain connectivity when optical line-of-sight is temporarily blocked. The system delivers the operational resilience necessary for tactical operations in contested environments while maintaining the bandwidth, security, and jam-resistance advantages inherent to free space optical communications.

The present disclosure relates to systems and methods for establishing high-bandwidth, jam-resistant communications links with unmanned aerial vehicles operating in contested electromagnetic environments. Embodiments described herein solve the size, weight, acquisition time, and bandwidths problems of existing FSOC systems, enabling free space optical communications on size-constrained drone platforms by dramatically reducing the size, weight, and power requirements of optical communications terminals while maintaining the performance characteristics necessary for real-time command and control operations with video data transmission.

A fundamental problem is the vulnerability of radio frequency communications systems to jamming, spoofing, and detection by adversaries equipped with sophisticated electronic warfare capabilities. Recent military conflicts have demonstrated that RF-based drone communications can be effectively disrupted, with jamming causing mission failure rates between 50 and 90 percent in contested areas. This vulnerability creates buffer zones around defended areas where drone operations become impractical, fundamentally limiting the tactical effectiveness of unmanned systems in modern warfare scenarios.

While free space optical communications offers inherent advantages including immunity to radio frequency jamming, high bandwidth capabilities exceeding 20 megabits per second for real-time video transmission, and low probability of intercept and low probability of detection characteristics, existing FSOC systems have been unsuitable for tactical drone applications due to prohibitive size, weight, and power requirements. Current FSOC terminals (base station terminals and aircraft terminals) were designed for aerospace applications and weigh between 40 and 500 kilograms, consume hundreds of watts of power, and cost between $500,000 and $2,000,000 per unit. These systems rely on mechanical gimbals for pointing, acquisition, and tracking functions, with the gimbal assemblies contributing substantial mass and introducing mechanical complexity that limits response speed. These systems cannot be used for anything but the largest military aircraft-type drones. First, they are prohibitively heavy, weighing far more than a typical drone's payload capacity. Second, they consume hundreds of watts of power, which is more than many small drones have available on board. Third, the acquisition process for current systems typically requires 10 to 60 seconds to establish a link, and the mechanical pointing systems cannot compensate quickly enough for the vibration and rapid maneuvers characteristic of small drone platforms. And fourth, small drones in many military applications are expendable or designed to be sacrificed (e.g., when used as guided explosive bombs), making a cost in excess of $500 k untenable. For smaller drones, a new types of FSOC system is required.

The FSOC system described herein achieves a transformative reduction in system requirements by implementing an asymmetric architecture where heavy and complex components are located at a ground-based or aerial base station while the drone payload is minimized to only essential elements. The drone payload in various embodiments weighs less than 10 kilograms, preferably less than 2 kilograms, and in the most weight-constrained embodiments less than 1 kilogram, while consuming less than 10 watts of power. This represents approximately a 500-fold reduction in weight and 1000-fold reduction in cost compared to existing FSOC systems, making the technology practical for deployment on Group 2 tactical drones and even smaller platforms.

In terms of system performance, some embodiments herein achieve levels of performance up to a couple orders of magnitude better than existing systems in certain metrics. For example, existing PAT technologies involving gimbals weigh anywhere up to 500 kg for the gimbal component, have pointing resolutions as poor as 1000 μrad, acquisition refresh rates as low as 100 Hz (cycles per second), and tracking speeds as low as 1°/second. These performance characteristics are not sufficient to track drones which can only carry small payloads, are small enough to require precise pointing resolutions (especially at kilometer-scale distances), move fast enough and have high enough rates of movement change to require acquisition times of 1000 Hz or more and tracking speeds of 100°/second (especially at closer than kilometer-scale distances). Systems and/or components described herein can achieve drone payload weights of 10 kg or less, pointing resolutions of 50 μrad or less, acquisition times of 1,000 Hz or greater, and tracking speeds of 100°/second or more. In preferred embodiments and depending on configuration, systems and/or components described herein can achieve drone payload weights of 2 kg or less, pointing resolutions of 5 μrad or less, acquisition times of 10,000 Hz or greater, and tracking speeds of 1000°/second or more.

The dramatic size and weight reduction is achieved primarily through the elimination of mechanical gimbals in favor of solid-state beam steering technologies. The system employs microelectromechanical systems (MEMS) micromirror arrays, optical phased arrays, or photonic integrated circuits to perform pointing and tracking functions electronically rather than through mechanical motion. MEMS micromirror implementations utilize arrays of individually addressable microscale mirrors capable of tilting through small angles under electronic control. Optical phased array implementations utilize arrays of phase shifters integrated into photonic circuits where the relative phase of light emitted from each element is electronically controlled to create interference patterns that steer the beam.

Any optical wavelengths may be used for the laser light in the systems described herein. However, use of laser light in the infrared spectrum has certain advantages for optical drone communications. Therefore, in some embodiments, the system operates using laser light at infrared wavelengths in the range of 800 nanometers to 1 millimeter. In a preferred embodiment, the system uses laser light in the range of 1,250 nanometers to 1,850 nanometers (1,550 nm+/−300 nm). This wavelength selection around 1,550 provides multiple advantages including eye safety at practical power levels, availability of mature telecom-grade components, reduced atmospheric scattering compared to visible wavelengths, and covertness since infrared emissions are not visible to the unaided human eye. In embodiments using dual-beam technologies, different wavelengths of laser light may be used for different purposes. For example, a laser at one wavelength may be used as a tracking beacon, while a laser at a different wavelength may be used for data transmission. In a preferred embodiment using dichroic mirrors, the tracking beacon may use a laser light in the range of 800 nanometers to 1,250 nanometers (with a preference at 980 nm) while data may be transmitted using a laser light in the range of 1,250 nanometers to 1,850 nanometers (with a preference at 1,550 nm).

Acquisition of optical links may employ multiple complementary techniques to ensure reliable link establishment. In some embodiments, optical beacons operating at a wavelength distinct from the data communications wavelength are employed. In alternative embodiments emphasizing extreme weight reduction, a retroreflector-based configuration eliminates the need for an active light source on the drone payload. The base station transmits an interrogation beam that is captured by receiver optics on the drone and directed to a modulated retroreflector that can switch between reflecting and non-reflecting states. The retroreflector may be aligned to return the interrogation beam to the base station or tilted to prevent the interrogation beam from returning. This approach achieves payload weights below 1 kilogram by eliminating the laser source and associated electronics.

The bidirectional communications architecture enables simultaneous uplink transmission of control commands from the base station to the drone and downlink transmission of video and sensor data from the drone to the base station. The system is designed to support minimum data rates exceeding 20 megabits per second for acceptable quality video, and preferably 50 megabits per second or 100 megabits per second for high-definition video streams.

For applications requiring communications among multiple drones operating as a coordinated swarm, the system may implement mesh networking protocols where each drone maintains optical links with multiple neighboring drones. An exemplary network topology includes a base station maintaining optical links with one or more intelligence, surveillance, and reconnaissance (ISR) overwatch drones positioned at higher altitudes. These ISR overwatch drones may serve as relay platforms, each maintaining optical links with a cluster of mission drones operating at lower altitudes. Within each cluster, mission drones optionally maintain mesh connections with each other, providing redundant communication paths that maintain network connectivity even if individual links are temporarily blocked.

In some embodiments, hybrid communications capability combining free space optical primary links with radio frequency backup channels ensures continuous connectivity even when optical line-of-sight is unavailable. In these embodiment, the system continuously monitors optical link quality and automatically switches to radio frequency backup communications when optical link quality degrades below acceptable thresholds. When optical line-of-sight is subsequently reestablished, the system may automatically revert to optical communications to exploit the superior bandwidth and jam resistance.

In some embodiments, the system may be designed to operate across ranges exceeding 1 kilometer, with preferred embodiments achieving ranges exceeding 5 kilometers or 10 kilometers under favorable atmospheric conditions. Tracking speeds may exceed 10 degrees per second to follow maneuvering drones, with preferred embodiments achieving 30 degrees per second or 50 degrees per second tracking capability. The field of regard may exceed 90 degrees in at least one axis, with hemispherical coverage desirable for maximum operational flexibility.

The disclosed systems and methods thus address a critical capability gap in existing tactical drone communications by providing jam-resistant, high-bandwidth connectivity with size, weight, power, and cost characteristics compatible with deployment on small drone platforms. By leveraging solid-state beam steering technologies originally developed for light detection and ranging applications and implementing an asymmetric architecture that minimizes drone payload requirements, embodiments described herein enable optical communications for tactical drones where such capability was previously unavailable.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

The skilled person will be aware of a range of possible modifications of the various embodiments described herein. Accordingly, the present invention is defined by the claims and their equivalents.

Definitions

"Drone," "unmanned aerial vehicle," and "UAV" are used interchangeably herein to mean a device having no human pilot, crew, or passengers on board which is capable of taking flight, being guided remotely by a human being, remotely by algorithms, locally by onboard algorithms, or any combination thereof.

"Laser" as used herein means a light-producing device that produces coherent, monochromatic (i.e., single wavelength), highly directional light through the process of light amplification by stimulated emission of radiation (LASER). Lasers produce light that can be transmitted long distances with a very narrow beam.

DETAILED DESCRIPTION OF THE DRAWING FIGURES

FIG. 1 illustrates an exemplary system for free space optical communications for drone networks 100. Exemplary system 100 comprises a drone optical communication device 200 in bidirectional optical communication with a base station optical communication device 300 through optical communications 130. Base station 120 is shown mounted on tower 121, although in various embodiments base station 120 could be mounted on a vehicle such as a Humvee, a portable tower, or a large drone such as an overwatch drone capable of carrying a large payload to high altitudes.

In this embodiment, drone 110 carries a drone optical communications device 200 as a payload, but in other embodiments drone optical communications device might be built in to drone 110. Drone optical communications device 200 is specifically designed to meet strict size, weight, and power requirements that enable drone 110 to carry device 200 while maintaining flight capabilities. Depending on the configuration of various embodiments, drone optical communications device 200 weighs less than 10 kilograms, and may weight less than 1 kilogram in some embodiments described herein. Drone optical communications device 200 of thie embodiment consumes less than 10 watts of power, and may consume less than 5 watts in some configurations. These ultra-low size, weight, and power requirements represent a 500-fold weight reduction and 1000-fold cost reduction compared to existing free space optical communications systems designed for larger aircraft.

Drone 110 in this example is a quadcopter configuration with fuselage 111, rotors 112a-n, and landing legs 113. It should be understood that drone 110 could take various forms including but not limited to quadcopters, fixed-wing aircraft, vertical takeoff and landing (VTOL) aircraft, or other unmanned aerial vehicles. Drone 110 may be of any classification sufficient to carry drone optical communications device 200. Non-limiting examples of such classifications include Group 2 drones with payload capacity of 10-25 kilograms, and Group 3 drone with payload capacity up to 600 kilograms, depending on the specific mission requirements.

Base station 120 houses base station optical communications device 300. Unlike drone optical communications device 200, base station optical communications device 300 is not necessarily constrained by size, weight, or power limitations, but reductions in size, weight, and power are useful in the base station, as well, especially in base stations that are not ground-based. System 100 employs an asymmetric architecture where any large or complex components that would add excessive weight to drone 110 are instead located at base station 120. This asymmetric design allows base station optical communications device 300 to incorporate larger optics, more powerful light sources, more sophisticated processors, and more power-intensive tracking systems without impacting the flight performance of drone 110.

Optical communications 130 comprises uplink optical beam 130a traveling from base station optical communications device 300 to drone optical communications device 200 and downlink optical beam 130b traveling from drone optical communications device 200 to base station optical communications device 300. Uplink optical beam 130a carries control data comprising flight commands to enable a user to steer drone 110 remotely. Downlink optical beam 130b carries real-time video data captured by a camera on drone 110, transmitting the video data preferably at data rates exceeding 20 megabits per second (Mbps) to enable real-time monitoring of the scene.

System 100 utilizes laser emissions to transmit optical signals. Operating with infrared optical signals makes system 100 immune to radio frequency (RF) interference and jamming, providing jam-free communications even in contested electromagnetic environments where RF-based drone communications would fail. Any optical wavelengths may be used for the laser light in the systems described herein. However, use of laser light in the infrared spectrum has certain advantages for optical drone communications. Therefore, in some embodiments, the system operates using laser light at infrared wavelengths in the range of 800 nanometers to 1 millimeter. In a preferred embodiment, the system uses laser light in the range of 1,250 nanometers to 1,850 nanometers (1,550 nm+/−300 nm). This wavelength selection around 1,550 provides multiple advantages including eye safety at practical power levels, availability of mature telecom-grade components, reduced atmospheric scattering compared to visible wavelengths, and covertness since infrared emissions are not visible to the unaided human eye. In embodiments using dual-beam technologies, different wavelengths of laser light may be used for different purposes. For example, a laser at one wavelength may be used as a tracking beacon, while a laser at a different wavelength may be used for data transmission. In a preferred embodiment using dichroic mirrors, the tracking beacon may use a laser light in the range of 800 nanometers to 1,250 nanometers (with a preference at 980 nm) while data may be transmitted using a laser light in the range of 1,250 nanometers to 1,850 nanometers (with a preference at 1,550 nm).

System 100 maintains optical alignment between drone optical communications device 200 and base station optical communications device 300 through pointing, acquisition, and tracking (PAT) systems incorporated into both devices. Base station optical communications device 300 is capable of pointing for the purpose of acquiring and tracking drone 110 as a remote device. Once drone 110 is acquired, system 100 continuously tracks drone 110 to maintain the bidirectional optical link as drone 110 maneuvers through space.

System 100 addresses the problem of achieving free-space optical communications on size-constrained drone platforms by dramatically reducing the weight of airborne optical communications terminals from 40-500 kilograms required by current technology to less than 1-2 kilograms in some embodiments. This weight reduction is achieved through the implementation of gimbal-free, solid-state PAT systems using technologies such as MEMS (microelectromechanical systems) micromirrors, optical phased arrays (OPAs), and photonic integrated circuits (PICs). These solid-state beam steering technologies eliminate the heavy mechanical gimbals used in conventional free space optical communications systems while providing the rapid tracking speeds necessary to follow a moving drone.

System 100 provides low probability of intercept and low probability of detection (LPI/LPD) characteristics due to the narrow, directional nature of optical beams 130a and 130b. The narrow beam divergence of infrared optical signals makes them very difficult to intercept compared to radio frequency transmissions that propagate omnidirectionally. This covert nature of optical communications 130 keeps operators hidden and enables drone 110 to operate even while radio communications are disrupted by adversarial electronic warfare measures.

In various embodiments, system 100 may employ acquisition and tracking methods including optical beacons with position-sensitive detectors, retroreflectors on drone 110 to return signals to base station 120, cameras or detectors to acquire images or signals, low-rate RF side-channels for initial position information, or mission planning approaches where the optical link is acquired at short standoff distances. System 100 may utilize machine learning algorithms for predictive tracking to anticipate drone 110 movements and maintain optical alignment despite vibration and rapid maneuvering.

System 100 addresses critical operational needs documented in modern conflicts where RF-based drone communications experience 50-90% mission failure rates in RF-denied zones due to jamming. By providing jam-resistant, high-bandwidth optical communications, system 100 enables reliable command and control of drone 110 while receiving real-time intelligence, surveillance, and reconnaissance (ISR) video data, even in contested electromagnetic environments where conventional RF communications would be completely disabled.

FIG. 2 illustrates an exemplary drone optical communications device 200 in block diagram form showing the primary functional components and data flow paths. Drone optical communications device 200 is specifically designed to meet strict size, weight, and power requirements that enable it to serve as a payload on small tactical drones while providing high-bandwidth bidirectional optical communications. Drone optical communications device 200 comprises receiver components for receiving optical signals carrying control commands, transmitter components for transmitting optical signals carrying video data, processing components for coordinating the various subsystems, and imaging components for capturing scene data.

Optical signals carrying control data enter drone optical communications device 200 through aiming and receiver optics 230. Aiming and receiver optics 230 comprises optical elements including lenses, mirrors, telescopes, and related optical components selected to capture and focus the incoming infrared optical signals. A wide array of lenses, mirrors, telescopes and related optical elements may be used, with appropriate materials and coatings determined by the wavelength of light used. In preferred embodiments operating at approximately 1550 nanometers, optical elements with appropriate infrared coatings are selected. Aiming and receiver optics 230 may include optical filters to reduce interference from background light such as sunlight, enhancing the signal-to-noise ratio of the received optical signals.

Aiming and receiver optics 230 incorporates pointing, acquisition, and tracking functionality to maintain optical alignment with a base station as the drone maneuvers through space. In various embodiments, aiming and receiver optics 230 may employ solid-state beam steering technologies to minimize size, weight, and power consumption. These solid-state technologies include microelectromechanical systems (MEMS) micromirror arrays, optical phased arrays, and photonic integrated circuits that enable fast, lightweight pointing without requiring heavy mechanical gimbals. The solid-state approach allows aiming and receiver optics 230 to achieve rapid tracking speeds exceeding 30 degrees per second with pointing accuracies better than 50 microradians while maintaining a weight of less than 1 kilogram.

Captured optical signals from aiming and receiver optics 230 are directed to detector 220. Detector 220 converts the received optical signals into electrical signals that can be processed by subsequent electronic components. Detector 220 is chosen to maximize sensitivity while providing fast enough response time to decode high-speed data transmissions. Depending on configuration, detector 220 may comprise an indium gallium arsenide (InGaAs) photodiode or a germanium (Ge) photodiode, with avalanche photodiodes (APDs) being particularly well-suited for this application due to their high sensitivity and fast response characteristics.

Detector 220 provides feedback signals to aiming and receiver optics 230 to enable motion control and improved aiming by maximizing the detected signal strength.

Detector 220 outputs electrical signals representing the received data to processor 210. Processor 210 serves as the central coordination unit for device 200, managing data flow between the various instrument subunits. Processor 210 may comprise a microcomputer, microcontroller, or similar computing device to minimize weight and power draw, which are important constraints for airborne applications.

Processor 210 decodes the electrical signals from detector 220 to extract flight control data. This flight control data comprises control commands transmitted from the base station that are readable by the drone's flight control system. Processor 210 outputs the decoded flight control data to the drone's flight control system, enabling a remote user to steer the drone in real-time through commands transmitted via the optical link. The flight control data may include commands for altitude adjustment, heading changes, speed modifications, or other flight parameters necessary for remote piloting of the drone.

Drone optical communications device 200 of this embodiment includes camera 240 for capturing video data of the surrounding scene. Camera 240 captures scene data representing the drone's field of view. In various embodiments, camera 240 may be mounted on a payload, in a fixed position relative to the drone's fuselage, and/or may be mounted on a gimbal or other positioning mechanism to enable pan, tilt, and zoom capabilities. Camera 240 captures real-time video data suitable for intelligence, surveillance, and reconnaissance (ISR) operations, target designation, or other remote sensing applications.

Scene data from camera 240 is transmitted to processor 210. Processor 210 encodes the video data into a format suitable for transmission via the optical link. The encoding process translates the video data into a string of bits that will be represented by optical signals in on and off states. Processor 210 encodes the video data at sufficient data rates to enable real-time video transmission, typically requiring data rates exceeding 20 megabits per second (Mbps) and preferably exceeding 50 Mbps or 100 Mbps for higher quality video.

Encoded video data from processor 210 is sent to light source and modulation 250. Light source and modulation 250 generates modulated optical signals that encode the video data as a series of on and off states. In some embodiments, light source is a laser In various embodiments, light source and modulation 250 may comprise different configurations depending on the specific laser technology employed. Some laser sources have integrated modulation ability, such as vertical-cavity surface-emitting lasers (VC-SELs), which can be directly modulated by the encoded data stream. Alternatively, light source and modulation 250 may comprise a continuously operating laser such as a fiber laser, solid state laser, or diode laser paired with an external modulator that switches the light on and off according to the encoded data.

When employing an external modulator, light source and modulation 250 may utilize electro-optic switches or acousto-optic switches with consideration for the maximum switching speed required to achieve the desired data rate. Higher switching speeds are required to transmit quality, real-time video data. Light source and modulation 250 may be configured with fiber coupling for simple integration or may utilize free space versions along with support structures to keep optical alignment. The choice between fiber-coupled and free-space configurations depends on specifications and cost considerations, with fiberized elements generally being smaller and less power intensive than their free space equivalents.

Modulated optical signals from light source and modulation 250 are directed to transmitter optics 260. Transmitter optics 260 focuses and directs the modulated optical signals across space toward the base station. Transmitter optics 260 comprises lenses, mirrors, telescopes, or other optical elements selected to produce an appropriately collimated and directed optical beam. A wide array of lenses, mirrors, telescopes and related optical elements may be used, with appropriate materials and coatings determined by the wavelength of light used.

In preferred embodiments, transmitter optics 260 are oriented in the same direction as aiming and receiver optics 230 using the aiming components of aiming and receiver optics 230. This alignment ensures that the downlink optical beam carrying video data is properly directed toward the base station that is transmitting the uplink optical beam carrying control commands. In some embodiments, aiming and receiver optics 230 and transmitter optics 260 may comprise common optics where the receiver and transmitter share the same set of optical elements, providing additional size and weight reduction benefits.

Device 200 achieves dramatic size, weight, and power reductions compared to conventional free space optical communications systems through certain innovations described herein. The integration of solid-state beam steering in aiming and receiver optics 230 eliminates heavy mechanical gimbals. The use of compact, low-power components such as VCSEL light sources in light source and modulation 250 and avalanche photodiodes in detector 220 minimizes power consumption. The selection of a compact, efficient processor 210 reduces computational overhead. The optional use of common optics and fiberized optical components further reduces size and weight. These innovations enable device 200 to achieve a total weight of less than 2 kilograms and preferably less than 1 kilogram while consuming less than 10 watts of power and preferably less than 5 watts, representing a 500-fold weight reduction and 1000-fold cost reduction compared to existing aerospace-grade free space optical communications terminals.

Device 200 operates in an asymmetric system architecture where the corresponding base station optical communications device carries the computational burden and incorporates larger optics and power-intensive components that would be impractical for device 200 to carry. This asymmetric design philosophy allows device 200 to be optimized exclusively for minimum size, weight, and power while maintaining high-bandwidth communications capability. Any large or complex part of the overall system that can be located on the base station and removed from device 200 is relocated to the base station, as size, weight, and power of device 200 are severely restricted by the carrying capacity and flight performance requirements of the drone.

The combination of components shown in FIG. 2 enables device 200 to provide jam-resistant, high-bandwidth optical communications for tactical drones operating in radio frequency denied or contested environments. In a preferred embodiment, utilizing infrared optical signals in the wavelength range of 800 nanometers to 1 millimeter for beacon signals and in the wavelength of 1550 nanometers for data transmission, device 200 achieves low probability of intercept and low probability of detection characteristics while remaining immune to radio frequency jamming that would disable conventional RF-based drone communications. This enables reliable real-time command and control with simultaneous high-definition video downlink even in heavily contested electromagnetic environments where adversaries employ sophisticated electronic warfare techniques.

Figure 3:
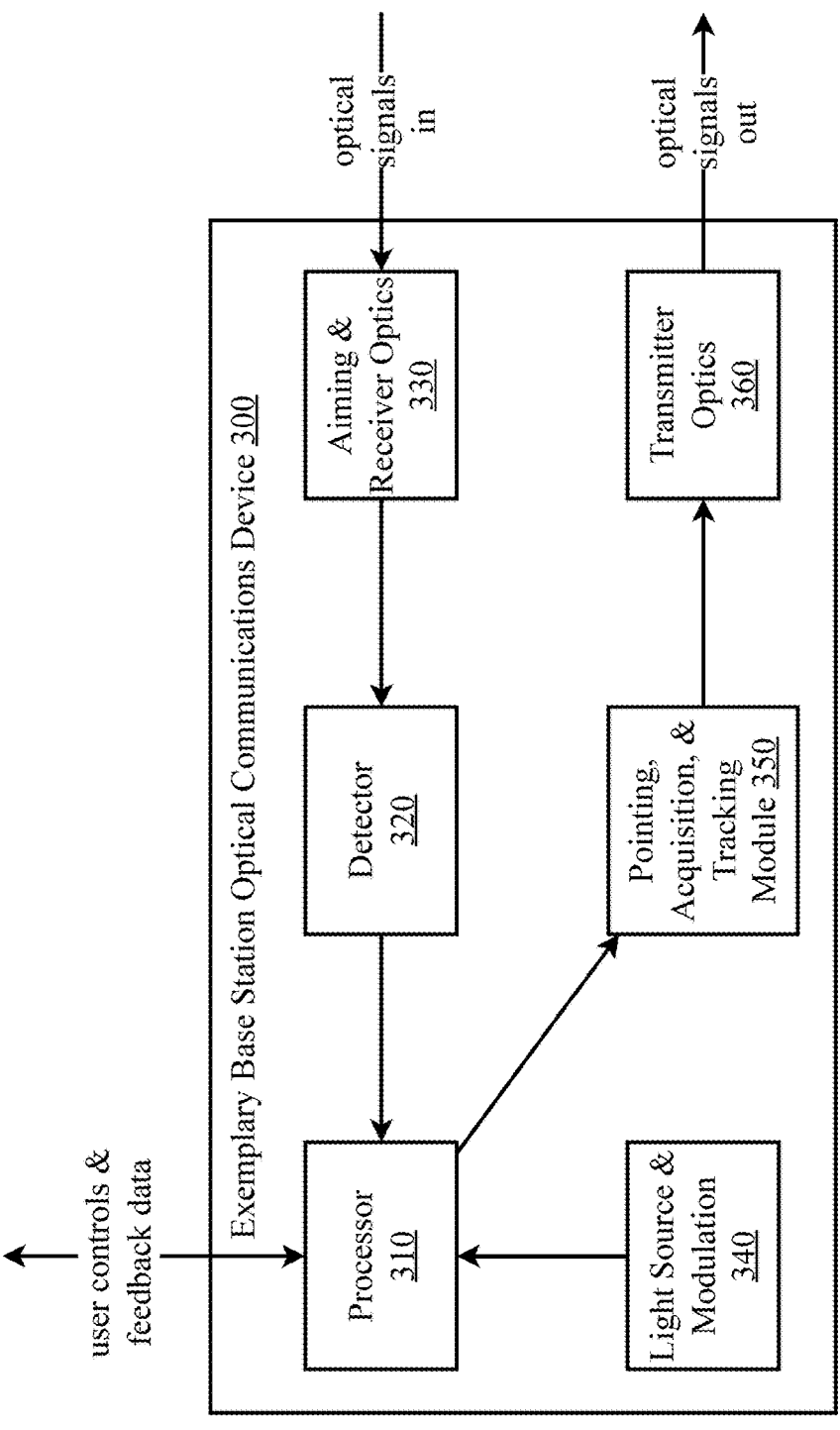
FIG. 3 illustrates an exemplary base station optical communication device.

FIG. 3 illustrates an exemplary base station optical communications device 300 in block diagram form showing the primary functional components and data flow paths. Base station optical communications device 300 operates in an asymmetric system architecture where device 300 is not constrained (or is less constrained in some embodiments) by size, weight, or power limitations that apply to the corresponding drone-mounted optical communications device. This asymmetric architecture allows base station optical communications device 300 to incorporate larger optics, more powerful light sources, more sophisticated processors, and more power-intensive tracking systems without impacting the flight performance of the drone.

Base station optical communications device 300 interfaces with a user who provides control commands and receives feedback data including real-time video transmitted from the drone. User controls may include flight commands enabling the user to steer the drone remotely by specifying altitude adjustments, heading changes, speed modifications, or other flight parameters. Feedback data comprises real-time video data transmitted from the drone, enabling the user to monitor the drone's field of view for intelligence, surveillance, and reconnaissance (ISR) operations, target designation, or other remote sensing applications. The bidirectional interface between the user and device 300 enables comprehensive remote operation of the drone even in radio frequency denied or contested environments.

User control commands are received by processor 310. Processor 310 serves as the central coordination unit for device 300, managing data flow between the various instrument subunits and coordinating the overall operation of the optical communications system. Processor 310 may comprise a laptop, microcomputer, or other computing device with sufficient processing power to handle the encoding and decoding operations required for high-bandwidth optical communications. Unlike the drone-mounted processor which may be optimized for minimal size, weight, and power consumption, processor 310 can be a more powerful computing device that provides enhanced processing capabilities for managing the base station operations.

Processor 310 translates user control commands into encoded data suitable for transmission via the optical link. The encoding process converts the control commands into a string of bits represented by optical signals in on and off states. Processor 310 outputs the encoded control data to light source and modulation 340 to generate modulated optical signals that encode the control commands as a series of on and off states for transmission to the drone via transmitter optics 360.

Light source and modulation 340 may comprise various configurations depending on the specific laser technology employed. In some embodiments, light source and modulation 340 employs laser sources with integrated modulation ability, such as vertical-cavity surface-emitting lasers (VCSELs) that can be directly modulated by the encoded data stream. Alternatively, light source and modulation 340 may comprise a continuously operating laser such as a fiber laser, solid state laser, or diode laser paired with an external modulator positioned next in the optical train to switch the light on and off according to the encoded data.

When employing an external modulator, light source and modulation 340 may utilize electro-optic switches or acousto-optic switches selected with consideration for the maximum switching speed required to achieve the desired data rate. Light source and modulation 340 may be configured with fiber coupling for simple integration or may utilize free space versions along with support structures to maintain optical alignment. Since base station optical communications device 300 is not weight-constrained, light source and modulation 340 can employ more powerful laser sources that provide higher optical power levels, enabling longer range communications and improved link margins compared to the drone-mounted light source. Optical signals from light source and modulation 340 are sent to pointing, acquisition, and tracking module 350 for transmission to drone via transmitter optics 360.

Pointing, acquisition, and tracking module 350 comprises a system of beam steering optics that can use visual data such as images from a camera and internal feedback such as reflected or received power from the drone to optimize the power level of the optical signals being exchanged. Pointing, acquisition, and tracking module 350 points the optical beam toward the drone, acquiring the optical link when the drone is within range, and tracking the drone continuously as it maneuvers through space.

Pointing, acquisition, and tracking module 350 may employ various technologies for rapidly steering optical beams. In some embodiments, module 350 may utilize fast steering mirrors (FSMs) as the most common technology for rapid beam steering. Alternatively, module 350 may employ solid-state beam steering technologies including microelectromechanical systems (MEMS) micromirror arrays, optical phased arrays, or photonic integrated circuits. These solid-state technologies enable rapid tracking speeds while eliminating heavy mechanical gimbals. Pointing, acquisition, and tracking module 350 ideally maintains control loop frequencies exceeding 100 hertz (Hz) and preferably exceeding 1 kilohertz (kHz) to enable rapid tracking of the moving drone despite vibration and maneuvering.

Pointing, acquisition, and tracking module 350 receives feedback from processor 310 to optimize beam steering operations. This feedback loop enables module 350 to adjust pointing based on information about the strength and quality of received optical signals from the drone. By maximizing the received signal strength, module 350 continuously optimizes the bidirectional optical link. Processor 310 may employ machine learning algorithms for predictive tracking that anticipate drone movements based on flight patterns, further improving the tracking performance of pointing, acquisition, and tracking module 350.

Optical signals from pointing, acquisition, and tracking module 350 are directed to transmitter optics 360. Transmitter optics 360 focuses and directs the modulated optical signals across space toward the drone. Transmitter optics 360 comprises lenses, mirrors, telescopes, or other optical elements selected to produce an appropriately collimated and directed optical beam. A wide array of lenses, mirrors, telescopes and related optical elements are commercially available, with appropriate materials and coatings determined by the wavelength of light used. Since device 300 is not size or weight constrained, transmitter optics 360 can employ larger apertures that provide tighter beam collimation and improved range performance compared to the drone-mounted transmitter optics.

Base station optical communications device 300 also receives optical signals transmitted from the drone carrying real-time video data. These incoming optical signals are captured by receiver optics 330. Receiver optics 330 comprises optical elements including lenses, mirrors, telescopes, and related optical components selected to capture and focus the incoming infrared optical signals transmitted from the drone. A wide array of lenses, mirrors, telescopes and related optical elements may be used, with appropriate materials and coatings determined by the wavelength of light used. Receiver optics 330 may comprise optical filters to reduce interference from background light such as sunlight, enhancing the signal-to-noise ratio of the received optical signals.

Since Base station optical communications device 300 is not weight-constrained or is less weight-constrained, receiver optics 330 can employ larger collection apertures that gather more optical power from the relatively weak signal transmitted by the drone. This larger aperture capability at the base station compensates for the limited optical power that can be transmitted by the weight-constrained drone-mounted device. Aiming and receiver optics 330 works in conjunction with pointing, acquisition, and tracking module 350 to maintain optimal alignment with the drone as it moves through space.

Captured optical signals from receiver optics 330 are directed to detector 320. Detector 320 converts the received optical signals into electrical signals that can be processed by subsequent electronic components. Detector 320 is selected to maximize sensitivity while providing fast enough response time to decode high-speed data transmissions carrying real-time video. In some embodiments, detector 320 may comprise an indium gallium arsenide (InGaAs) photodiode or a germanium (Ge) photodiode, with avalanche photodiodes (APDs) being particularly well-suited for this application due to their high sensitivity and fast response characteristics.

Electrical signals from detector 320 are transmitted to processor 310. Processor 310 decodes the electrical signals to extract the video data transmitted from the drone. This decoding process reconstructs the video data into a format that is viewable and actionable by the user. Processor 310 ideally decodes video data at rates exceeding 20 megabits per second (Mbps) to enable real-time video monitoring, and preferably at rates exceeding 50 Mbps or 100 Mbps for higher quality video streams. The decoded video data is presented to the user as feedback data, enabling real-time situational awareness of the drone's surroundings.

Processor 310 also provides feedback signals to pointing, acquisition, and tracking module 350 based on the strength and quality of signals received from detector 320. This feedback enables module 350 to continuously optimize the bidirectional optical link by adjusting beam steering to maximize received signal power. The control loop formed by this feedback mechanism operates at frequencies exceeding 100 Hz and preferably exceeding 1 kHz to maintain stable tracking of the moving drone.

Base station optical communications device 300 leverages its relative freedom from size, weight, and power constraints to provide superior performance compared to the drone-mounted device. By incorporating more powerful laser sources in light source and modulation 340, larger optical apertures in transmitter optics 360 and aiming and receiver optics 330, more sensitive detectors in detector 320, more powerful processors in processor 310, and more sophisticated tracking systems in pointing, acquisition, and tracking module 350, device 300 compensates for the limitations necessarily imposed on the drone-mounted device and enables the overall system to achieve long-range, high-bandwidth optical communications.

The asymmetric architecture embodied by base station optical communications device 300 enables practical free space optical communications for small tactical drones by relocating large or complex components to the base station and removing them from the drone. This asymmetric design allows the drone-mounted device to achieve ultra-low size, weight, and power metrics, in some embodiments less than 2 kilograms and less than 5 watts while the base station device provides the power, aperture, and processing capability needed for long-range, high-bandwidth optical links. This architecture enables reliable jam-resistant communications for drone operations in radio frequency denied or contested environments where conventional RF-based communications would be disabled by adversarial electronic warfare measures.

FIG. 4 illustrates an exemplary system architecture for dual-wave beam transmitter and receiver 400 employing an optical beacon system to facilitate pointing, acquisition, and tracking operations. System architecture 400 comprises transmitter 410 and receiver 420 separated by a range across which optical communications are established. Architecture 400 represents an embodiment where the use of an optical beacon relaxes the requirement for continuous data exchange to maintain alignment between transmitter 410 and receiver 420. This optical beacon approach provides an acquisition and tracking method that can simplify system operation and improve reliability.

Transmitter 410 comprises data light source and modulation 411 for generating modulated optical signals carrying data. Data light source and modulation 411 operates at a primary data wavelength selected for optimal data transmission characteristics. In preferred embodiments, data light source and modulation 411 operates at approximately 1550 nanometers (nm), which provides advantages including eye safety, covertness, and the ability to leverage existing telecommunications technologies. Data light source and modulation 411 may comprise a vertical-cavity surface-emitting laser (VCSEL) with integrated modulation capability, or alternatively may comprise a continuously operating laser such as a fiber laser, solid state laser, or diode laser paired with an external modulator.

Transmitter 410 also comprises beacon light source 412 for generating an optical beacon signal. In some embodiments, the beacon signal is continuous. Beacon light source 412 operates at a beacon wavelength that is different from the data wavelength to enable wavelength-based separation of the beacon and data signals. In preferred embodiments, beacon light source 412 operates at approximately 980 nm, providing sufficient wavelength separation from the 1550 nm data wavelength to enable effective dichroic filtering. In this embodiment, beacon light source 412 emits without being modulated with data, as the beacon serves for tracking and aiming purposes rather than data transmission.

Optical signals from data light source and modulation 411 and beacon light source 412 are directed to dichroic mirror 413. Dichroic mirror 413 comprises an optical element that transmits some wavelengths of light while reflecting others based on wavelength-selective interference coatings. Dichroic mirror 413 is configured to merge the beacon wavelength and the data wavelength by aligning beacon light from beacon light source 412 with data light from data light source and modulation 411 before sending them both through transmitter optics 414. The specific transmission and reflection characteristics of dichroic mirror 413 are selected based on the particular wavelengths employed, with the mirror transmitting one wavelength while reflecting the other to achieve optical path combination.

Combined optical signals from dichroic mirror 413 are directed to transmitter optics 414. Transmitter optics 414 focuses and directs both the data beam and the beacon beam across the range toward receiver 420. Transmitter optics 414 comprises lenses, mirrors, telescopes, or other optical elements selected to produce appropriately collimated and co-aligned optical beams for both wavelengths. Since both the data wavelength and beacon wavelength pass through the same transmitter optics 414, the data beam and beacon beam are inherently aligned and propagate along essentially the same optical path toward receiver 420, as indicated by the dashed line representing dual wavelength transmission.

Optical signals transmitted from transmitter 410 propagate across the range and are captured by receiver optics 424 of receiver 420. Receiver optics 424 comprises optical elements including lenses, mirrors, telescopes, and related optical components selected to capture and focus the incoming optical signals at both the data wavelength and the beacon wavelength. Receiver optics 424 includes optical filters to reduce interference from background light such as sunlight while allowing passage of the signal wavelengths. The captured dual wavelength optical signals are directed from receiver optics 424 to dichroic mirror 423.

Dichroic mirror 423 comprises an optical element configured to separate the beacon wavelength from the data wavelength. Dichroic mirror 423 exploits the wavelength difference between the approximately 980 nm beacon signal and the approximately 1550 nm data signal to spatially separate these two optical beams. Through wavelength-selective transmission and reflection, dichroic mirror 423 directs the data wavelength light along one optical path toward data light detector 421 while directing the beacon wavelength light along a different optical path toward beacon position sensitive detector 422. This wavelength-based beam separation enables simultaneous detection of both the data signal and the beacon signal using separate, specialized detectors optimized for each function.

Data wavelength light separated by dichroic mirror 423 is directed to data light detector 421. Data light detector 421 converts the received optical data signals into electrical signals that can be processed to extract the transmitted data. Data light detector 421 is selected to maximize sensitivity at the data wavelength while providing fast enough response time to decode high-speed data transmissions. Data light detector 421 may comprise an indium gallium arsenide (InGaAs) photodiode or a germanium (Ge) photodiode, with avalanche photodiodes (APDs) being particularly well-suited due to their high sensitivity and fast response characteristics.

Beacon wavelength light separated by dichroic mirror 423 is directed to beacon position sensitive detector 422. Beacon position sensitive detector 422 comprises a specialized detector capable of determining the spatial position of the incident beacon light on its detection surface. Beacon position sensitive detector 422 generates signals indicating not only the intensity of the beacon light but also the location where the beacon light strikes the detector. This positional information provides feedback to the pointing, acquisition, and tracking system about which direction to steer the beam to maximize the received signal strength and maintain optimal optical alignment.

Beacon position sensitive detector 422 enables tracking of transmitter 410 by receiver 420 without requiring the data stream itself to provide pointing feedback. In this embodiment, beacon light source 412 transmits a continuous, unmodulated beam such that beacon position sensitive detector 422 receives a steady signal that can be used for tracking purposes independent of the data transmission state. This continuous beacon signal simplifies acquisition and tracking operations because the system does not need to decode data transmissions to extract pointing information.

This dual-wave beam architecture 400 may be implemented symmetrically where both transmitter 410 and receiver 420 are equipped with the dual wavelength capability shown. In a bidirectional communications system, the base station may incorporate the architecture of transmitter 410 and receiver 420, while the drone payload also incorporates the architecture of transmitter 410 and receiver 420. Alternatively, dual-wave beam architecture 400 may be implemented asymmetrically where only one end of the link incorporates a beacon light source. For example, the base station could be equipped as transmitter 410 with both data light source and modulation 411 and beacon light source 412, while the drone payload could be equipped as receiver 420 with beacon position sensitive detector 422 that tracks the beacon transmitted from the base station.

The optical beacon approach embodied in this dual-wave beam architecture 400 provides several advantages for free space optical communications with drones. First, the continuous nature of the beacon signal from beacon light source 412 simplifies initial acquisition because receiver 420 can detect and lock onto the beacon signal before attempting to decode data transmissions. Second, beacon position sensitive detector 422 provides real-time pointing error information that enables rapid tracking corrections to follow a maneuvering drone. Third, the wavelength separation between data and beacon signals enabled by dichroic mirrors 413 and 423 allows simultaneous, independent optimization of data transmission and tracking functions.

The wavelength selection for the beacon and data signals in architecture 400 represents a balance of several factors. The data wavelength of approximately 1550 nm provides eye safety for the high-power data transmission, enables use of telecommunications components with favorable cost and performance characteristics, and provides good atmospheric transmission. The beacon wavelength of approximately 980 nm is sufficiently separated from the data wavelength to enable effective dichroic filtering while still falling within the infrared spectrum where detector technology is well-developed. The 570 nm wavelength separation between the 980 nm beacon and 1550 nm data signals provides adequate spectral separation for dichroic mirrors 413 and 423 to achieve high transmission of one wavelength and high reflection of the other wavelength, enabling efficient beam combination and separation with minimal optical losses.

This dual-wave beam architecture 400 enables the overall free space optical communications system to maintain reliable pointing, acquisition, and tracking even when the drone is maneuvering rapidly or when the data link experiences temporary interruptions. The continuous beacon signal provides an always-available reference for tracking purposes, ensuring that optical alignment can be maintained or quickly re-established. This improves the robustness and reliability of the optical communications link for tactical drone operations in challenging environments where maintaining continuous lock on a fast-moving target is critical for mission success.

Figure 5:
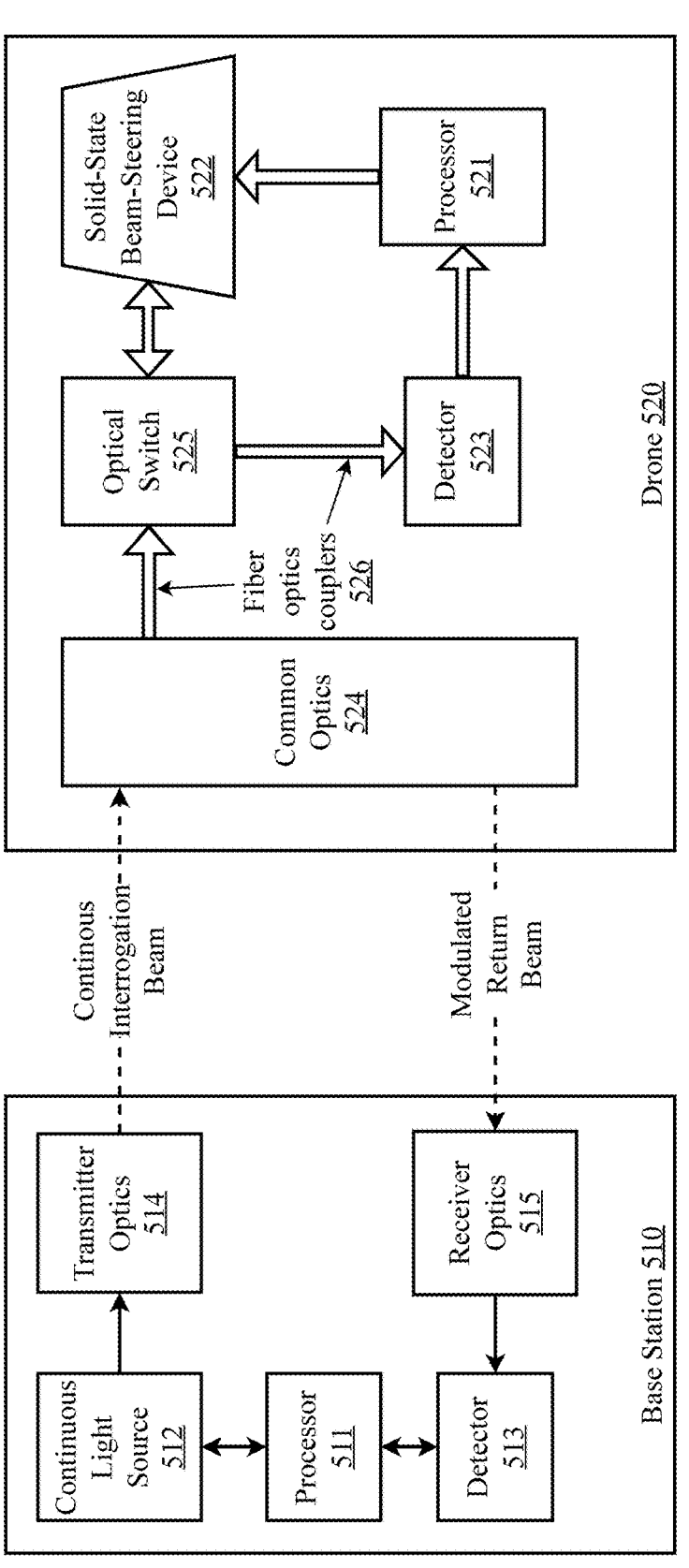
FIG. 5 illustrates an exemplary system architecture for a free space optical drone communication system with common optics, fiber optic couplers, and solid-state beam steering.

FIG. 5 illustrates an exemplary system architecture for base station-drone communications using common optics, fiber optics couplers, and solid-state beam-steering device 500. This embodiment represents a further advancement in reducing the size, weight, and power requirements of the airborne terminal by incorporating solid-state beam-steering technology that eliminates the need for an active light source on the drone, enabling weight reduction to less than 1 kilogram in some embodiments.

The system comprises a base station 510 and a drone 520 that communicate bidirectionally using optical signals. Base station 510 of this embodiment comprises a continuous light source 512 that generates a continuous interrogation beam. This continuous beam approach differs from traditional modulated transmission systems by maintaining a constant optical carrier that is subsequently modulated by the drone payload rather than at the source.

A processor 511 at base station 510 coordinates the various instrument subunits and processes incoming data from detector 513. The continuous light from source 512 is directed through transmitter optics 514 which focus and direct the continuous interrogation beam across the free space gap to drone 520. Transmitter optics 514 may comprise lenses, mirrors, telescopes, and related optical elements that are commercially available. Appropriate materials and coatings are determined by the wavelength of light used, with 1550 nanometers being particularly suitable for covert, eye-safe operation while taking advantage of existing telecommunications technologies.

At drone 520, the continuous interrogation beam is captured by common optics 524 that serve the dual function of both receiving incoming optical signals and transmitting outgoing modulated signals. This common aperture configuration represents a significant weight reduction compared to systems employing separate transmitter and receiver optics. Common optics 524 may be coupled to other optical components through fiber optics couplers 526, which enable efficient routing of optical signals within the compact drone payload.

In this embodiment, fiber optics couplers 526 direct the incoming continuous interrogation beam to an optical switch 525. Optical switch 525 controls the routing of optical signals between multiple optical paths, enabling the system to alternate between receiving control commands and transmitting video data. The use of fiberized optical components, including fiber optics couplers 526 and optical switch 525, provides several advantages including reduced size, lower weight, and decreased power consumption compared to free space optical equivalents. Optical elements can be integrated directly into optical fibers, as splitters, modulators, and reflectors are well-established technologies in the telecommunications industry.

When drone 520 is in receiving mode, optical switch 525 directs the incoming optical signal to detector 523, which converts the optical signal into an electrical signal. Detector 523 should be chosen to maximize sensitivity while maintaining a fast enough response time to decode control commands. InGaAs and Ge photodiodes, particularly avalanche photodiodes, work well for this application at the preferred 1550 nanometer wavelength. The electrical signal from detector 523 is sent to processor 521 where it can be decoded into flight commands that are readable by the drone's flight control system.

When drone 520 is in transmitting mode, optical switch 525 directs the continuous interrogation beam to solid-state beam-steering device. Solid-state beam-steering device 522 enables rapid, precise control of the optical beam direction without requiring mechanical gimbals or heavy motorized pointing systems. This solid-state approach dramatically reduces the weight, size, and power consumption of the pointing, acquisition, and tracking subsystem.

Solid-state beam-steering device 522 may comprise various technologies such as retroreflectors, microelectromechanical systems (MEMs) micromirror arrays, optical phased arrays, photonic integrated circuites (PICs), spatial light modulators, or other electronically controllable beam-steering mechanisms. In a micromirror embodiment, MEMS micromirror arrays with individual mirror elements can provide response times of less than 1 millisecond for beam repositioning, enabling control loop frequencies exceeding 1 kilohertz necessary for tracking fast-moving or vibrating platforms. In an optical phased array embodiment, electronically controlled phase shifters manipulate the interference pattern of light emitted from multiple sources to steer the beam without any mechanical motion, potentially achieving fields of regard exceeding 90 degrees in at least one axis. In some embodiments, these technologies can be combined either for beam steering or for data modulation. For example, miniature retroreflectors combined with MEMs may be used to passively reflect light back to a source (e.g., the base station) or to modulate the light back to the source into a signal by rapidly redirecting the retroreflectors away from the direction of the source and back again (resulting in a digital signal of on/off bits).

Processor 521 encodes video data from a camera onboard drone 520 and controls solid-state beam-steering device 522 to modulate the continuous interrogation beam. The modulation creates a series of on and off states in the return beam, encoding the video data for transmission back to base station 510. This approach eliminates the need for an active light source on drone 520, as the continuous interrogation beam from base station 510 provides the optical carrier that is subsequently modulated by solid-state beam-steering device 522. Processor 521 may comprise compact single-board computers or microprocessors which provide sufficient computational capability while maintaining low size, weight, and power characteristics suitable for small drone platforms.

The modulated return beam travels back through common optics 524 and across the free space gap to base station 510. At base station 510, receiver optics 515 collect and focus the modulated return beam into detector 513. Detector 513 converts the modulated optical signal into an electrical signal that is sent to processor 511 for decoding and reconstruction into viewable video data.

The architecture illustrated in FIG. 5 achieves several ey advantages over existing systems. By eliminating the active light source from drone 520, the total payload weight can be reduced to less than 1 kilogram in some embodiments, representing a 500-fold weight reduction compared to existing free-space optical communication terminals that typically weigh 40 to 500 kilograms. The use of solid-state beam-steering device 522 instead of mechanical gimbals eliminates slow, heavy, mechanical pointing systems while enabling faster tracking speeds exceeding 30 degrees per second with pointing accuracies better than 50 microradians.

The integration of fiber optics couplers 526 throughout the drone payload enables a compact, lightweight design by eliminating the need for precise free-space optical alignments that would otherwise require heavy mounting structures and adjustment mechanisms. Fiberized elements are generally smaller and less power intensive than their free space equivalents, contributing to the overall weight and power reduction objectives.

The asymmetric architecture where base station 510 carries the continuous light source 512 and larger optical components while drone 520 carries only the minimal components necessary for modulation and detection represents a key design principle. Any large or complex part of the system that can be located on the tower and removed from the drone should be, as size, weight, and power of the payload are severely restricted for small tactical drones.

The system maintains bidirectional communications capability, enabling a user to receive real-time video data at rates exceeding 20 megabits per second while sending control commands to drone 520. The optical link functions by locating and tracking drone 520 in space through feedback mechanisms that maximize received signal strength at detector 523 on drone 520 and detector 513 at base station 510.

In some embodiments, the system operates using infrared optical signals in the wavelength range of 800 nanometers to 1 millimeter, with a preference for 1550 nanometer wavelength. This wavelength selection provides eye-safe operation per IEC standards, covert communications with low probability of intercept and low probability of detection, and compatibility with mature telecommunications components including fiber optic components, lasers, detectors, and modulators developed for the telecommunications industry.

Solid-state beam-steering device 522 enables the system to achieve pointing resolution of 5 to 50 microradians, acquisition speeds exceeding 10 kilohertz, and tracking speeds exceeding 100 degrees per second, meeting the demanding requirements for maintaining optical links with fast-moving, maneuvering drones operating in RF-denied or contested environments. The control loop frequency of the pointing and tracking system can exceed 1 kilohertz, providing rapid compensation for drone vibrations and motion that would otherwise break the optical link.

This embodiment is particularly well-suited for deployment on Group 2 tactical drones with payload capacities of 10 to 25 kilograms, where the sub-1-kilogram weight of the drone payload leaves substantial capacity for mission-specific sensors and equipment. The dramatic reduction in size, weight, and power achieved through the combination of common optics 524, fiber optics couplers 526, and solid-state beam-steering device 522 enables reliable, high-bandwidth optical communications on platforms that were previously unable to carry free-space optical communication systems due to weight and power constraints.

Figure 6:
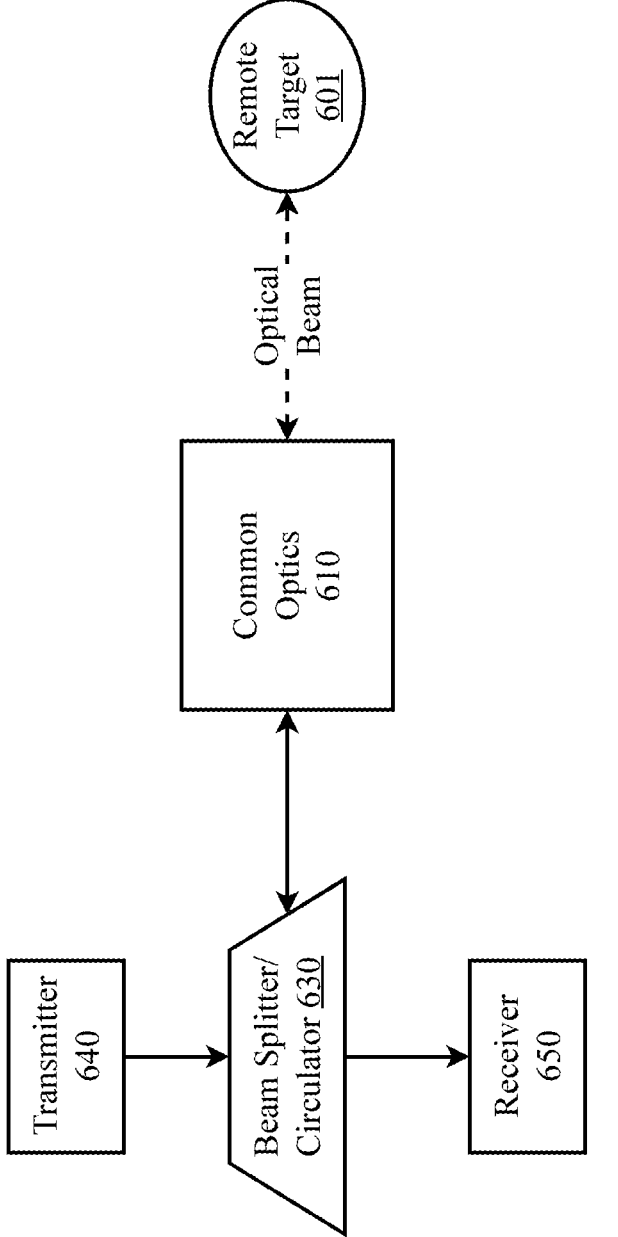
FIG. 6 (PRIOR ART) illustrates a known common aperture optics configuration that may be used for weight reduction in free-space optical communication systems.
Figure 8:
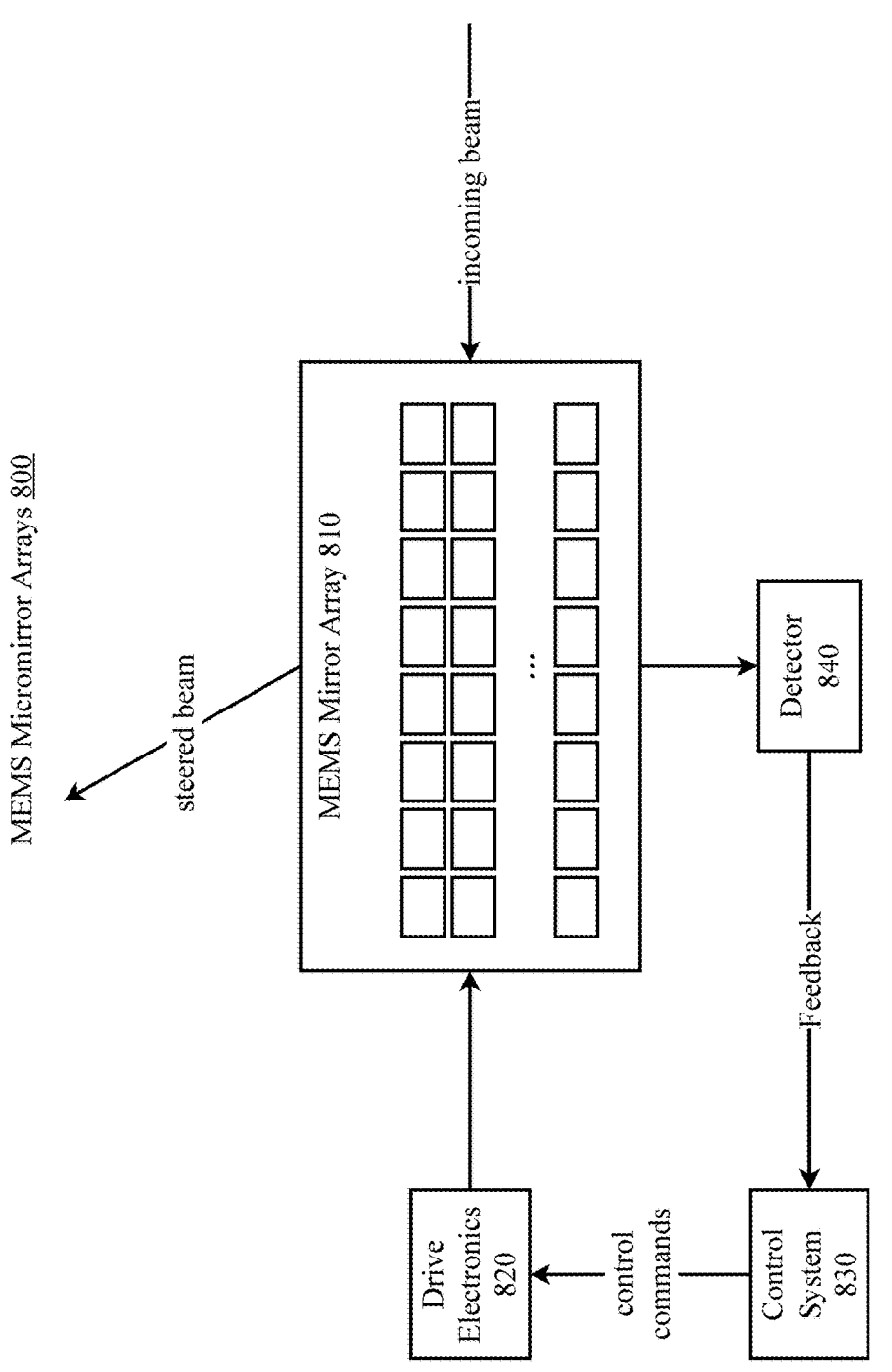
FIG. 8 (PRIOR ART) illustrates an exemplary architecture for use of a MEMS micromirror array for drone-base communication that enables solid-state beam steering without mechanical gimbals.
Figure 9:
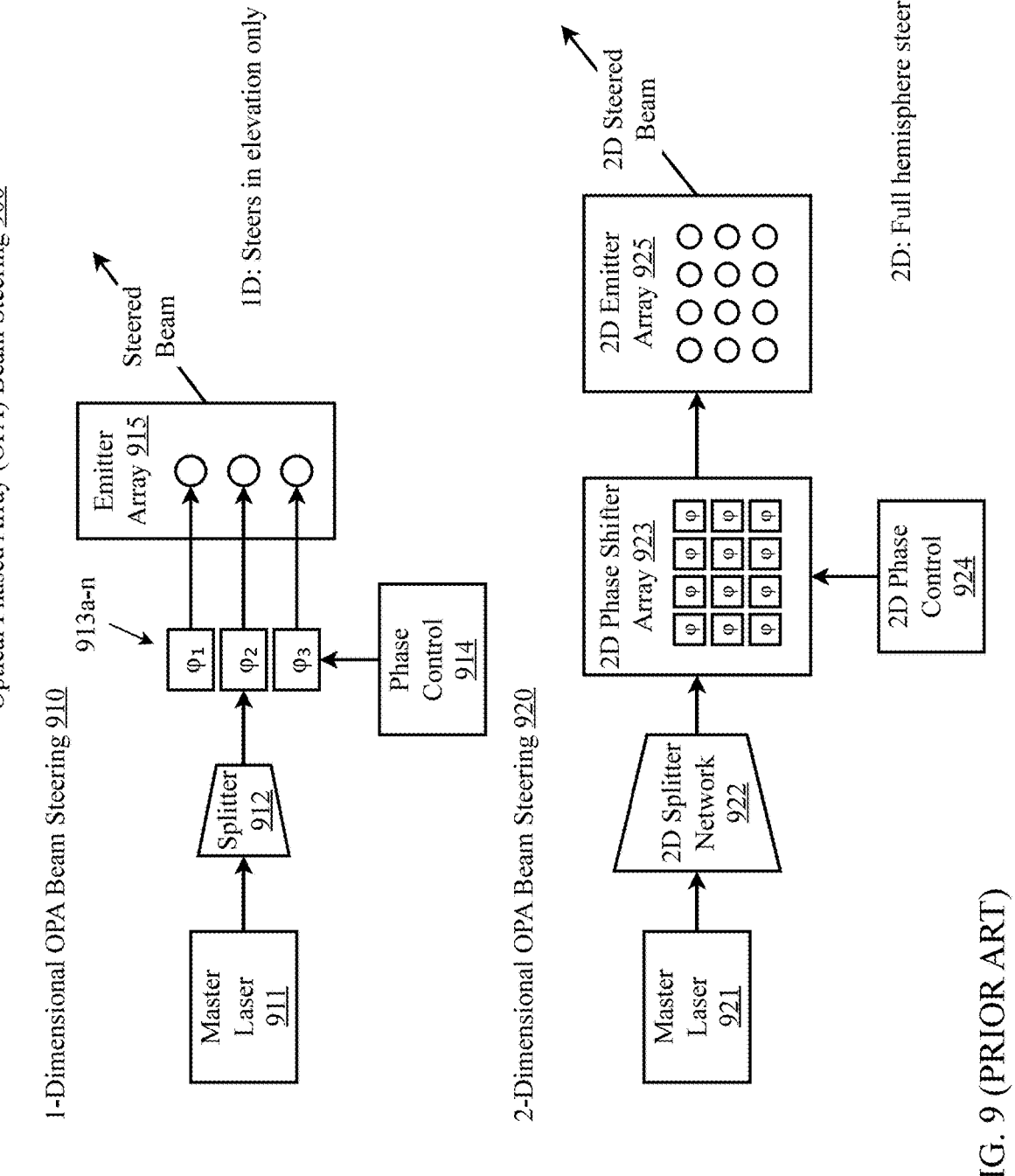
FIG. 9 (PRIOR ART) illustrates known optical phased array beam steering 900 which is another solid-state beam steering technology that enables solid-state beam steering without mechanical gimbals.

FIG. 6 below shows a known common aperture optics configuration that may be used for common optics 524. FIG. 7, FIG. 8, and FIG. 9 below show various known technologies that may be used for solid-state beam steering device 522. While known, these technologies have not been adapted for use in drone communications as described herein. The disclosures herein improve upon the known technologies shown in FIG. 6, FIG. 7, FIG. 8, and FIG. 9 by combining them into configurations that enable deployment on small tactical drones, including but not limited to eliminating active transmitters from the drone payload through retroreflector-based or solid-state beam-steering approaches, replacing mechanical pointing systems with solid-state beam-steering devices such as MEMS micromirror arrays or optical phased arrays, integrating fiber optic components to minimize size and weight, and/or employing asymmetric system architectures where heavy components are located at the base station rather than on the drone.

By building upon the weight-saving principles of common aperture optics 600 while incorporating the additional innovations disclosed herein, the system described herein achieves total drone payload weights of less than 2 kilograms, and in some embodiments less than 1 kilogram, representing a 500-fold weight reduction compared to existing free-space optical communication terminals that typically weigh 40 to 500 kilograms. This dramatic weight reduction enables high-bandwidth, jam-resistant optical communications on small tactical drone platforms that were previously unable to carry free-space optical communication systems.

For tactical drone communications, one-dimensional OPA beam steering 910 may be combined with mechanical rotation to provide full coverage while maintaining lower complexity than two-dimensional OPA beam steering 920. A slowly rotating mount provides azimuthal coverage while the optical phased array provides rapid elevation steering. This hybrid approach achieves wide field of regard while reducing the number of phase shifters and control channels required. Alternatively, multiple one-dimensional arrays oriented in different directions can provide coverage of a larger solid angle without mechanical rotation.

The integration of optical phased array beam steering 900 with other system components requires careful attention to optical alignment, thermal management, and electromagnetic compatibility. Master laser 911 and master laser 921 must be thermally stabilized to maintain wavelength stability and coherence. Phase control 914 and two-dimensional phase control 924 electronics must be shielded from electromagnetic interference that could disrupt the precision phase control. The optical interfaces between splitters, phase shifters, and emitters must maintain alignment under the vibration and temperature variations experienced during drone flight.

FIG. 6 (PRIOR ART) illustrates known configuration for common aperture optics 600 used in optical communication systems.

Common aperture optics 600 comprises components arranged to enable bidirectional optical communications through a single shared optical aperture. At the center of the configuration are common optics 610 which serve the dual function of both transmitting optical signals to remote target 601 and receiving optical signals returned from remote target 601. Common optics 610 may comprise lenses, mirrors, telescopes, and related optical elements that collect, focus, and direct optical beams.

Remote target 601 represents the distant communication partner, which in the context of the present disclosure could be a drone, base station, or other platform requiring optical communications capability. Optical beams travel between common optics 610 and remote target 601 across free space, enabling wireless optical data transmission without physical connections.

A beam splitter or circulator 630 is positioned between common optics 610 and the transmitter and receiver subsystems. Beam splitter or circulator 630 performs separates the transmit and receive optical paths, allowing signals from transmitter 640 to be directed toward common optics 610 while simultaneously routing received signals from common optics 610 toward receiver 650.

In a beam splitter implementation, beam splitter or circulator 630 uses a partially reflective optical surface to divide optical power between the transmit and receive paths. A typical beam splitter might reflect 50 percent of the incident light while transmitting the remaining 50 percent, though other splitting ratios can be employed depending on system requirements. The beam splitter approach is relatively simple but inherently loses optical power through the splitting process, as transmitted signals from transmitter 640 lose half their power through the beam splitter, and received signals similarly lose half their power before reaching receiver 650.

In a circulator implementation, beam splitter or circulator 630 uses polarization-based or wavelength-based optical routing to more efficiently separate transmit and receive paths with minimal optical loss. An optical circulator routes light from port to port in a specific sequence, such that light entering from transmitter 640 exits toward common optics 610, while light entering from common optics 610 exits toward receiver 650. Circulators typically achieve higher optical efficiency than simple beam splitters, with insertion losses of less than 1 decibel compared to the 3 decibel loss inherent in 50-50 beam splitters.

Transmitter 640 generates modulated optical signals containing data to be transmitted to remote target 601. Transmitter 640 may comprise a laser source with integrated modulation capability, such as a vertical-cavity surface-emitting laser, or may comprise a continuous laser source coupled with an external modulator such as an electro-optic or acousto-optic modulator. The modulated optical signal from transmitter 640 is directed to beam splitter or circulator 630, which routes the signal to common optics 610 for transmission across the free space optical link.

Receiver 650 detects and demodulates optical signals received from remote target 601. Optical signals collected by common optics 610 are routed through beam splitter or circulator 630 to receiver 650. Receiver 650 comprises a photodetector that converts the optical signal into an electrical signal, along with associated electronics for signal conditioning, amplification, and data recovery. Suitable photodetectors include InGaAs avalanche photodiodes or Ge photodiodes, which provide high sensitivity at infrared wavelengths such as 1550 nanometers.

The primary benefit of common aperture optics 600 configuration is weight reduction compared to systems employing entirely separate transmitter and receiver optical assemblies. By sharing common optics 610 for both transmit and receive functions, the configuration achieves weight reductions of 30 to 50 percent compared to separate transmit and receive optical systems. This weight saving is particularly significant in aerospace and mobile platform applications where minimizing payload weight is critical.

However, despite being a known technology, common aperture optics 600 configuration still presents several limitations for ultra-lightweight drone applications. First, the configuration still requires substantial optical components including common optics 610 with sufficient aperture size to achieve adequate optical gain over long ranges. For example, to achieve communications ranges of 1 to 10 kilometers, common optics 610 typically requires aperture diameters of 5 to 20 centimeters, with corresponding optics masses of hundreds of grams to several kilograms depending on materials and design. Second, the known configuration does not address the weight and power requirements of transmitter, which in conventional free-space optical systems includes both a laser source and modulator that collectively consume significant power and add substantial weight to the payload. Laser sources suitable for long-range free-space optical communications typically require optical output powers of 100 milliwatts to several watts, with corresponding electrical power consumption of 1 to 10 watts or more depending on laser efficiency. Third, common optics does not address any pointing, acquisition, or tracking mechanisms, which is essential for maintaining optical alignment between common optics 610 and remote target 601 over long distances. Prior art pointing and tracking systems typically employ mechanical gimbals with motors and position encoders, which add substantial weight and complexity to the optical terminal. Conventional gimbal-based pointing systems for free-space optical communications weigh 10 to 100 kilograms or more, making them unsuitable for small tactical drones with total payload capacities of only 10 to 25 kilograms.

FIG. 7 (PRIOR ART) illustrates a known retroreflector modulation system 700 that may be used to enable ultra-lightweight drone payload configurations by eliminating the need for an active light source on the drone. This embodiment is particularly advantageous for achieving sub-1 kg communications payloads, representing a 500-fold weight reduction compared to conventional systems.

Retroreflector modulation system 700 operates in two distinct states to encode binary data onto an optical beam originating from a base station. In State 1, shown as 710, a retroreflector 711 is maintained in an aligned configuration that reflects an incoming beam back toward its source. When a control bit equals 0, retroreflector 711 remains in this reflecting state. A MEMS actuator 712 controls the orientation of retroreflector 710, and when the control bit is 0, MEMS actuator 712 remains in an OFF state, allowing retroreflector 711 to maintain its alignment. The incoming beam strikes retroreflector 711 and is returned as a reflected beam along substantially the same optical path back to the base station. This undeflected state encodes a logical "1" in the modulated signal.

State 2, depicted as 720, represents the deflected configuration corresponding to a control bit value of 1. In this state, MEMS actuator 722 is energized to an ON state (control bit=1), causing retroreflector 721 to tilt or deflect from its aligned position. The deflection angle is typically in the range of 5 to 10 degrees, which is sufficient to steer the reflected beam away from the base station receiver. The incoming beam continues to strike retroreflector 721, but the deflected beam is directed away from the return path and effectively blocked from reaching the base station detector. This deflected state encodes a logical "1" in the modulated signal.

The modulation mechanism achieves high-speed switching with switching speeds greater than 1 MHz, enabling data rates exceeding 20 Mbps as required for real-time video transmission from the drone to the base station. MEMS actuator 712, 722 consumes less than 1 W of power during operation, contributing to the ultra-low power requirements of less than 10 W for the entire drone payload. This power efficiency is critical for small tactical drones with limited onboard power budgets.

Retroreflector 700 may be implemented as a corner cube retroreflector or a retroreflector array, selected based on the required aperture size and field of view. The retroreflective properties ensure that light is returned toward its source over a range of incident angles, providing some tolerance for misalignment between the drone and base station during flight operations.

The base station transmits a continuous interrogation beam at an infrared wavelength, preferably 1550 nm for eye safety and covertness. This continuous beam illuminates retroreflector 700 on the drone payload. The drone's onboard processor encodes video data from a camera into a binary data stream, which controls MEMS actuator 710 to modulate the returned signal. The base station receiver detects the modulated retroreflected signal and decodes it to reconstruct the video stream.

FIG. 8 (PRIOR ART) illustrates a known MEMS micromirror arrays 800 used for beam steering in optical communication and sensing systems. As disclosed herein, MEMS micromirror arrays can be used to reduce size and weight in communications systems for small tactical drone applications.

MEMS micromirror arrays 800 comprise a MEMS mirror array 810 which comprises multiple individual micromirror elements arranged in a one-dimensional or two-dimensional array. Each individual micromirror element in MEMS mirror array 810 can be independently tilted or repositioned through electrostatic, electromagnetic, or piezoelectric actuation mechanisms. The individual micromirrors are typically fabricated using semiconductor manufacturing techniques, resulting in mirror elements with dimensions ranging from tens to hundreds of micrometers.

An incoming beam strikes MEMS mirror array 810, where it is reflected by the individual micromirror elements. By controlling the tilt angle of each micromirror element, the system can steer the reflected beam in desired directions, creating a steered beam that exits MEMS mirror array 810 at a controllable angle. The incoming beam may originate from a laser source or other optical transmitter, and the steered beam may be directed toward a remote target.

Drive electronics 820 provide the electrical signals necessary to actuate the individual micromirror elements in MEMS mirror array 810. Drive electronics 820 receives control commands from control system 830 and converts these high-level pointing commands into the specific voltage or current waveforms required to position each micromirror element at the desired angle. For electrostatically actuated MEMS mirrors, drive electronics 820 typically generates voltage signals in the range of tens to hundreds of volts, with precise control over the voltage magnitude determining the tilt angle of each mirror. For electromagnetically or piezo-electrically actuated mirrors, drive electronics 820 generates appropriate current or voltage signals matched to the specific actuation mechanism.

Control system 830 coordinates the operation of MEMS micromirror arrays 800 by processing feedback information and generating appropriate control commands to maintain accurate beam pointing. Control system 830 receives feedback signals from detector 840 and uses this information to compute pointing errors and generate corrective control commands. Control system 830 may implement various control algorithms including proportional-integral-derivative control, state-space control, or adaptive control methods to achieve stable, accurate beam pointing despite disturbances such as platform vibrations or atmospheric turbulence.

Detector 840 monitors the optical system performance and provides feedback signals to control system 830. In a typical implementation, detector 840 may comprise a position-sensitive detector, quadrant detector, or focal plane array that measures the position or intensity of optical signals received from the remote target. The feedback signals from detector 840 enable control system 830 to determine whether the steered beam is accurately pointed at the intended target and to compute the pointing corrections needed to maintain or acquire accurate alignment.

The closed-loop control architecture formed by control system 830, drive electronics 820, MEMS mirror array 810, and detector 840 enables rapid, accurate beam pointing with continuous correction for disturbances. The control loop operates at high update rates, with control system 830 processing feedback from detector 840, computing pointing errors, transmitting control commands to drive electronics 820, and actuating MEMS mirror array 810 at frequencies exceeding 100 hertz and potentially exceeding 1 kilohertz depending on system design and component performance.

MEMS micromirror arrays 800 provide several significant performance benefits compared to traditional mechanical gimbal systems. The response time of MEMS mirror array 810 is typically less than 1 millisecond, enabling rapid beam repositioning that is orders of magnitude faster than mechanical gimbals which typically exhibit response times of tens to hundreds of milliseconds. This fast response time enables MEMS micromirror arrays 800 to track rapidly moving targets and to compensate for high-frequency vibrations that would otherwise disrupt optical alignment.

The pointing resolution of MEMS micromirror arrays 800 is typically in the range of 5 to 50 microradians, providing fine angular control that enables accurate pointing over long distances. At a range of 10 kilometers, a pointing resolution of 10 microradians corresponds to a beam positioning accuracy of 10 centimeters, which is sufficient for maintaining optical communications links with moving targets. The fine pointing resolution is achieved through precise control of the individual micromirror tilt angles, with drive electronics 820 providing high-resolution voltage or current control and control system 830 implementing fine-grained control algorithms.

The field of regard of MEMS micromirror arrays 800 typically ranges from 60 to 180 degrees, providing wide-angle beam steering capability without mechanical rotation. The field of regard is determined by the maximum tilt angle achievable by the individual micromirror elements, with larger tilt angles enabling wider steering ranges. One-dimensional MEMS mirror arrays can typically achieve fields of regard of 60 to 90 degrees in a single axis, while two-dimensional arrays can provide hemispherical or near-hemispherical coverage approaching 180 degrees in multiple axes. This wide field of regard enables MEMS micromirror arrays 800 to point at targets across a broad angular range without requiring mechanical rotation of the entire optical system.

Despite these performance advantages, prior art MEMS micromirror arrays 800 still present challenges for ultralightweight drone applications. Existing MEMS-based beam steering systems typically weigh several hundred grams to several kilograms when including MEMS mirror array 810, drive electronics 820, control system 830, detector 840, and associated optical components such as lenses and beam expanders. The power consumption of these systems ranges from several watts to tens of watts depending on the size of MEMS mirror array 810 and the actuation mechanism employed.

Additionally, prior art MEMS micromirror arrays 800 are typically designed as standalone beam steering devices that require separate transmitter and receiver optical systems. When integrated into a complete optical communications terminal, the total system weight increases significantly due to the addition of laser sources, modulators, receivers, transmit optics, receive optics, and structural components. These additional components can add several kilograms to the total payload weight, making the complete system unsuitable for small tactical drones with limited payload capacity unless combined with other technologies as described herein to further optimize the system for use with small tactical drones.

FIG. 9 (PRIOR ART) illustrates known optical phased array beam steering 900 which is another solid-state beam steering technology that enables solid-state beam steering without mechanical gimbals. Optical phased arrays provide electronic beam steering without moving parts by controlling the phase of light emitted from an array of sources. This technology was developed for the LiDAR industry and but may be used as a solid-state beam steering device in combination with other technologies achieve the ultra-low size, weight, and power requirements necessary for tactical drone communications. The figure depicts both one-dimensional and two-dimensional optical phased array implementations, showing the progression from elevation-only steering to full hemispherical coverage.

A one-dimensional optical phased array beam steering system 910 demonstrates the fundamental principles of phase-controlled beam steering in a single dimension. One-dimensional OPA beam steering 910 comprises a master laser 911 that generates coherent optical radiation at the desired wavelength, preferably 1550 nm for eye safety and covertness in free-space optical communications applications. Master laser 911 may be implemented as a distributed feedback laser diode, vertical-cavity surface-emitting laser, or fiber laser selected for output power, wavelength stability, and modulation capability.

Light from master laser 911 is directed to a splitter 912 that divides the optical power among multiple channels. Splitter 912 may comprise a one-by-N optical splitter implemented in fiber optic form or as a free-space beam splitter. The splitter creates N optical paths, where N typically ranges from 8 to 512 or more depending on the desired field of regard and pointing resolution. Each output channel from splitter 912 carries a portion of the original optical power with equal phase relationship to the master source.

The split optical signals are routed through individual phase shifters 913*a-n* that introduce controlled phase delays ranging from $\varphi_1$ through $\varphi_n$. Phase shifters 913*a-n* may be implemented using thermo-optic phase shifters, electro-optic modulators, or liquid crystal on silicon devices. Each phase shifter introduces a phase delay determined by a control signal from phase control 914. The phase delays are selected according to the desired beam steering angle, with the phase progression across the array creating constructive and destructive interference that steers the output beam.

Phase control 914 comprises electronic circuitry and control algorithms that compute the required phase values for each channel to achieve the desired steering angle. Phase control 914 implements the fundamental relationship between steering angle $\theta$ and phase progression, where $\theta = \sin^{-1}(\lambda/2\pi d)$ for a linear array with element spacing d and wavelength $\lambda$. Phase control 914 receives steering commands from a higher-level control system and converts these into individual phase control signals for phase shifters 913*a-n*.

After passing through phase shifters 913*a-n*, the phase-controlled optical signals are directed to an emitter array 915 that converts the guided optical signals into free-space radiation. Emitter array 915 comprises a linear array of optical antennas, waveguide gratings, or surface-emitting structures that couple light from the waveguides or fibers into free space. The emitters are spaced at intervals that determine the maximum steering angle and the presence of grating lobes. Typical emitter spacing ranges from one-half wavelength to several wavelengths, with tighter spacing providing wider steering range but requiring more complex fabrication.

The optical signals emitted from emitter array 915 interfere in the far field to produce a steered beam. When all emitters radiate in phase, the beam propagates perpendicularly to the array. By introducing a linear phase gradient across the array through phase shifters 913*a-n*, the beam direction can be steered to angles off the array normal. One-dimensional OPA beam steering 910 steers in elevation only, meaning the beam can be directed up or down relative to the array plane but maintains a fixed azimuthal direction. This limitation restricts the field of regard to a fan-shaped region, which may be sufficient for some applications where the drone motion is constrained to a single plane or where mechanical rotation provides azimuthal coverage.

A two-dimensional optical phased array beam steering system 920 extends the beam steering capability to provide full hemispherical coverage by controlling phase in both dimensions. Two-dimensional OPA beam steering 920 comprises a master laser 921 that generates the coherent optical radiation, similar to master laser 911 in the one-dimensional configuration. Master laser 921 provides the optical source for the entire array and must deliver sufficient power to supply all emitters after accounting for splitting losses and phase shifter insertion losses.

Light from master laser 921 is directed to a two-dimensional splitter network 922 that divides the optical power among M×N channels, where M and N represent the number of elements in each dimension of the array. Two-dimensional splitter network 922 may be implemented as a cascade of one-dimensional splitters, as a star coupler, or as a photonic integrated circuit that distributes power to all output channels. The splitting network introduces loss proportional to the logarithm of the number of channels, requiring higher input power from master laser 921 or the use of optical amplifiers to maintain sufficient power at each emitter.

The split optical signals are routed to a two-dimensional phase shifter array 923 that introduces independent phase control for each element in the M×N array. Two-dimensional phase shifter array 923 comprises M×N individual phase shifting elements arranged in a grid pattern. Each phase shifter can introduce a phase delay $\varphi$ ranging from 0 to $2\pi$ under control of two-dimensional phase control 924. The phase pattern across the array determines both the elevation and azimuth steering angles of the output beam. Complex phase patterns can be implemented to achieve beam shaping, multiple simultaneous beams, or adaptive optics correction for atmospheric turbulence.

Two-dimensional phase control 924 comprises the electronic and computational systems necessary to calculate and apply the required phase values to two-dimensional phase shifter array 923. Two-dimensional phase control 924 implements more complex algorithms than phase control 914 because it must compute phase values for steering in both elevation and azimuth. The control system may employ lookup tables, real-time calculation, or machine learning algorithms to determine optimal phase patterns. For steering to elevation angle $\theta$ and azimuth angle $\varphi$, the phase at position (m,n) in the array is given by $\varphi_{mn} = (2\pi/\lambda)(m \cdot dx \cdot \sin(\theta)\cos(\varphi) + n \cdot dy \cdot \sin(\theta)\sin(\varphi))$, where dx and dy are the element spacings in the x and y directions.

After passing through two-dimensional phase shifter array 923, the phase-controlled optical signals are directed to a two-dimensional emitter array 925 that radiates the optical signals into free space. Two-dimensional emitter array 925 comprises M×N optical antennas or surface-emitting elements arranged in a grid pattern. The emitters may be vertical-cavity surface-emitting lasers amplified by the phase-shifted master laser signal, grating couplers etched into a photonic integrated circuit, or other structures that efficiently couple guided optical modes into free-space radiation modes. The spacing between emitters in two-dimensional emitter array 925 determines the maximum steering angle and the field of regard, with typical spacings in the range of 3 to 10 micrometers for 1550 nm wavelength operation.

The optical signals emitted from two-dimensional emitter array 925 interfere in three-dimensional space to produce a two-dimensional steered beam. By controlling the phase pattern across two-dimensional phase shifter array 923, the beam can be steered to any direction within the hemisphere above the array. Two-dimensional OPA beam steering 920 typically beam steering of less than 30 degrees in any direction from the face of the two-dimensional phase shifter array 923.

The field of regard achieved by optical phased array beam steering 900 depends on the array configuration and element spacing. For one-dimensional OPA beam steering 910, steering is limited to elevation angles, with typical field of regard (maximum angle of beam steering) ranging from ±45 degrees (90 degrees in total) depending on element spacing. Arrays with emitter spacing of approximately $\lambda/2$ can achieve the widest steering angles before grating lobes appear. For two-dimensional OPA beam steering 920, the field of regard (maximum angle of beam steering) is less than ±15 degrees (30 degrees in total).

The pointing resolution of optical phased array beam steering 900 is determined by the number of elements in the array and the aperture size. Larger arrays with more elements provide finer angular resolution according to the diffraction-limited beamwidth $\theta=\lambda/D$, where D is the aperture diameter. An array with 512 elements spaced at 5 micrometers provides an aperture of approximately 2.5 mm, yielding a diffraction-limited beamwidth of approximately 620 microradians at 1550 nm wavelength. This pointing resolution of less than 1 milliradian is sufficient for free-space optical communications at ranges of several kilometers.

The response time for optical phased array beam steering 900 is determined by the switching speed of phase shifters 913*a-n* and phase shifter array 923. Electro-optic phase shifters can achieve switching times of less than 1 nanosecond, while thermo-optic phase shifters typically require 1 to 10 microseconds. Liquid crystal on silicon devices operate in the range of 1 to 10 milliseconds. For drone tracking applications requiring response times less than 1 millisecond, electro-optic or thermo-optic phase shifters are preferred. The fast response time enables tracking of drones moving at velocities exceeding 30 degrees per second and compensation for high-frequency vibration.

However, optical phased array beam steering 900 faces several technical challenges that must be addressed for practical implementation on drone platforms. The optical efficiency is typically limited by splitting losses, phase shifter insertion losses, and coupling losses at the emitters. Total system efficiency may range from 10 to 50 percent, requiring higher laser power to achieve the same radiated power as a system without these losses. Power consumption in phase control 914 and two-dimensional phase control 924 can be significant, particularly for thermo-optic phase shifters that require continuous heating. Electro-optic phase shifters reduce power consumption but may require higher drive voltages.

The fabrication complexity of two-dimensional OPA beam steering 920 is substantially higher than one-dimensional OPA beam steering 910 due to the need for M×N phase shifters and the two-dimensional splitter network. Photonic integrated circuit technology enables integration of splitter network 922, phase shifter array 923, and emitter array 925 on a single chip, but this requires advanced fabrication processes and careful design to minimize phase errors and amplitude imbalances. The yield and cost of such integrated devices remain challenges for widespread deployment.

Calibration of optical phased array beam steering 900 is necessary to compensate for fabrication variations, temperature effects, and aging. Each phase shifter may exhibit slightly different phase response to control signals, requiring characterization and calibration to achieve accurate beam steering. The calibration process may involve measuring the far-field beam pattern for various phase settings and computing correction factors that are stored in phase control 914 or two-dimensional phase control 924. Adaptive calibration algorithms that update corrections based on received signal strength can maintain performance over time and temperature variations.

Figure 10:
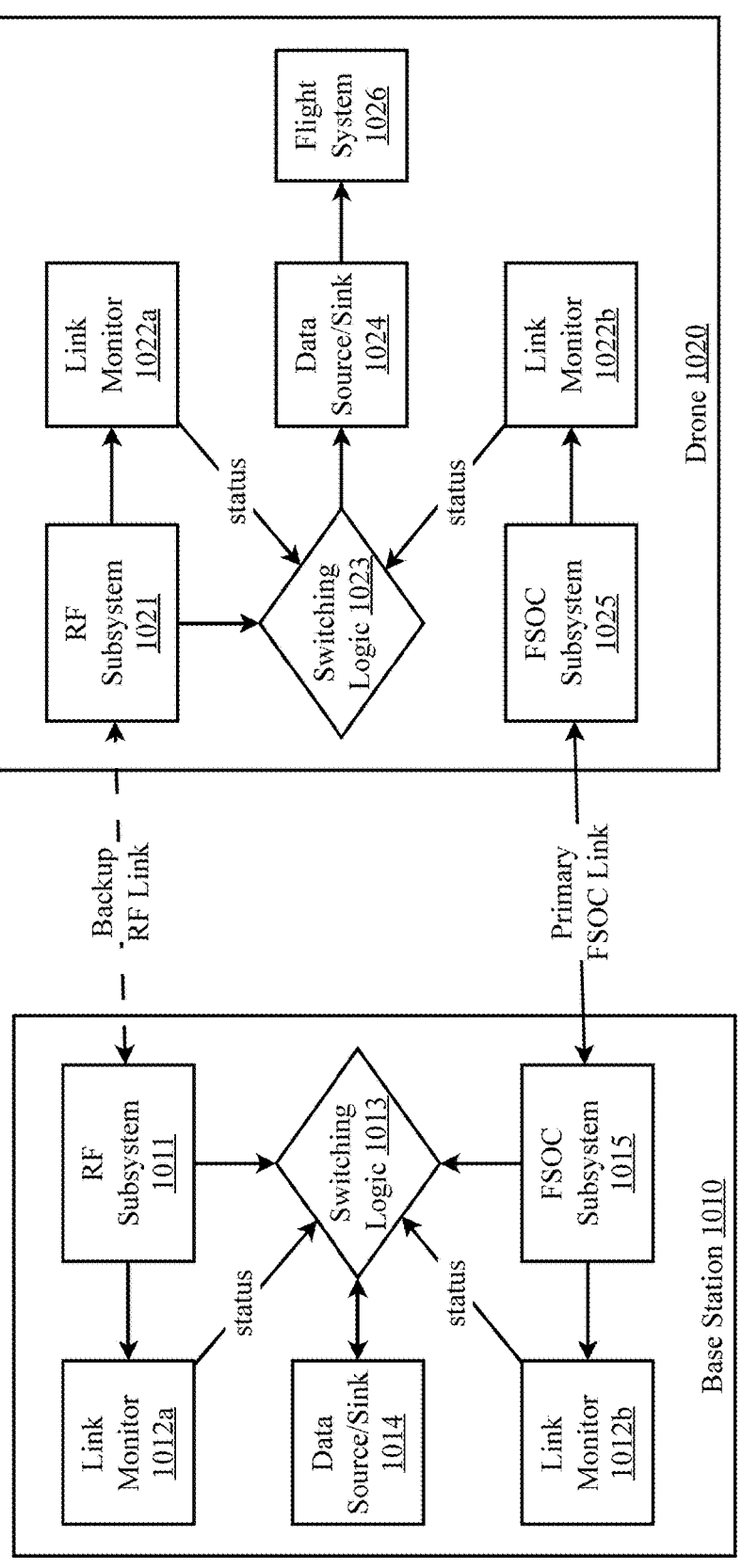
FIG. 10 illustrates an exemplary hybrid free-space optical communication and radio frequency system with automatic failover.

FIG. 10 illustrates an exemplary hybrid FSOC/RF communications system with automatic failover capability 1000. This embodiment provides robust tactical communications by combining a primary free-space optical communications link with a secondary radio frequency backup link, enabling seamless failover to maintain connectivity during atmospheric degradation, line-of-sight blockages, or other conditions that may temporarily disrupt the optical link. System 1000 comprises a base station 1010 in bidirectional communication with a drone 1020 through both optical and radio frequency channels.

Base station 1010 includes an FSOC subsystem 1015 that implements the free-space optical communications functionality as described in the preceding embodiments. In this embodiment, FSOC subsystem 1015 is capable of transmitting and receiving infrared optical signals in the wavelength range of 800 nm to 1 mm, with a beacon at around 890 nm and data transferred at around 1550 nm. FSOC subsystem 1015 incorporates the pointing, acquisition, and tracking systems, optical transmitter and receiver components, modulation systems, and beam steering optics necessary to establish and maintain a high-bandwidth optical communications link with drone 1020. The primary FSOC link provides data rates exceeding 20 Mbps, enabling real-time video transmission from drone 1020 to base station 1010 while simultaneously supporting uplink transmission of control commands from base station 1010 to drone 1020.

Base station 1010 further includes an RF subsystem 1011 that provides radio frequency communications capability as a backup to the primary optical link. RF subsystem 1011 comprises conventional radio frequency transmitters, receivers, and antenna systems operating at frequencies suitable for drone communications, typically in UHF, L-band, or S-band ranges. While RF subsystem 1011 typically provides lower bandwidth than FSOC subsystem 1015, it offers greater robustness against atmospheric conditions, line-of-sight obstructions, and other environmental factors that can disrupt optical communications. RF subsystem 1011 helps maintain basic connectivity during adverse weather conditions such as fog, heavy rain, or dust that may attenuate the optical signal, and for providing initial positioning information to facilitate rapid acquisition of the optical link when conditions improve.

Link monitor 1012*a* continuously monitors the performance and status of FSOC subsystem 1015 by measuring parameters such as received signal strength, bit error rate, signal-to-noise ratio, and link availability. Link monitor 1012*a* generates status signals that quantify the quality and reliability of the optical communications link, providing real-time feedback about the health of the primary communications channel. These status signals are fed to switching logic 1013, which implements the intelligent decision-making algorithms that determine when to transition between the optical and radio frequency links.

Similarly, link monitor 1012*b* continuously monitors the performance and status of RF subsystem 1011, measuring parameters such as received signal strength indicator, bit error rate, signal-to-noise ratio, and link availability for the radio frequency channel. Link monitor 1012*b* provides status signals to switching logic 1013, enabling the system to assess the comparative performance of both communications channels and make informed decisions about which link should carry the active traffic at any given time.

Switching logic 1013 implements the automatic failover algorithms that determine which communications subsystem should actively carry traffic between data source/sink 1014 and drone 1020. Switching logic 1013 receives status signals from both link monitor 1012*a* and link monitor 1012*b*, comparing the performance metrics of the optical and radio frequency links. Under normal operating conditions when the optical link is functioning properly, switching logic 1013 routes traffic through FSOC subsystem 1015 to take advantage of the higher bandwidth and enhanced security characteristics of free-space optical communications. However, when the status signals from link monitor 1012*a* indicate degradation of the optical link below predetermined thresholds, switching logic 1013 automatically transitions traffic to RF subsystem 1011, ensuring that connectivity is maintained even when optical communications are temporarily unavailable.

The switching criteria implemented by switching logic 1013 may include multiple factors such as received signal strength falling below a minimum threshold, bit error rate exceeding a maximum acceptable value, complete loss of optical signal detection, or predictive algorithms that anticipate link degradation based on environmental conditions. Switching logic 1013 implements hysteresis in the switching decisions to prevent rapid oscillation between links during marginal conditions. Additionally, switching logic 1013 continuously monitors the status of both links even when traffic is being carried by only one channel, enabling automatic reacquisition of the primary optical link when conditions improve. This automatic reacquisition capability ensures that the system returns to high-bandwidth optical communications as soon as environmental conditions permit, maximizing the utilization of the superior performance characteristics of the free-space optical link.

Data source/sink 1014 represents the interface to the user and ground control systems, providing the source of control commands to be transmitted to drone 1020 and serving as the destination for video data and telemetry received from drone 1020. Data source/sink 1014 may comprise computing systems, displays, user interfaces, recording devices, and network interfaces that enable operators to control drone 1020 and receive real-time situational awareness data. Data source/sink 1014 connects to switching logic 1013, allowing the automatic failover system to transparently manage the underlying communications link without requiring operator intervention during link transitions.

On the airborne side of the communications system, drone 1020 includes complementary subsystems that mirror the functionality of base station 1010 while adhering to the size, weight, and power constraints imposed by the drone platform. Drone 1020 comprises an FSOC subsystem 1025 that implements the lightweight optical communications terminal optimized for airborne deployment. FSOC subsystem 1025 incorporates solid-state beam steering technologies, miniaturized optics, compact detectors, and power-efficient components necessary to achieve the ultra-low size, weight, and power (SWaP) metrics needed for tactical drone applications. FSOC subsystem 1025 weighs less than 10 kg, preferably less than 2 kg for Group 2 drones, and consumes less than 10 W of power, enabling deployment on small tactical unmanned aerial vehicles.

FSOC subsystem 1025 on drone 1020 may utilize any of the weight-reduction embodiments described in the preceding figures, including common aperture optics that share transmit and receive paths, retroreflector-based architectures that eliminate the need for an active light source on the drone, MEMS-integrated pointing and modulation systems, fiberized optical components for compact packaging, or photonic integrated circuits that combine multiple optical functions on a single chip. The specific implementation of FSOC subsystem 1025 is selected based on the payload capacity of the particular drone platform, the required communications range and data rate, and the operational environment.

Drone 1020 further includes RF subsystem 1021, which provides radio frequency communications capability that complements FSOC subsystem 1025. RF subsystem 1021 on the drone side comprises lightweight radio transceivers, compact antennas, and associated electronics that enable bidirectional radio communications with RF subsystem 1011 on base station 1010. RF subsystem 1021 is designed to minimize size, weight, and power consumption while providing sufficient range and bandwidth to serve as an effective backup link when optical communications are unavailable.

Link monitor 1022*a* on drone 1020 continuously monitors the performance and status of FSOC subsystem 1025, measuring the same parameters that link monitor 1012*a* measures on the base station side. Link monitor 1022*a* generates status signals that quantify the quality of the received optical signal, providing feedback to switching logic 1023 about the health of the primary optical communications channel from the perspective of the airborne receiver.

Link monitor 1022*b* monitors the performance and status of RF subsystem 1021 on drone 1020. Link monitor 1022*b* measures parameters such as received signal strength, bit error rate, and link quality for the radio frequency backup channel, providing status information to switching logic 1023 to enable intelligent failover decisions on the drone side.

Switching logic 1023 on drone 1020 implements automatic failover algorithms that parallel the functionality of switching logic 1013 on base station 1010. Switching logic 1023 receives status signals from link monitor 1022*a* and link monitor 2, comparing the performance of the optical and radio frequency links from the drone's perspective. Switching logic 1023 determines which communications subsystem should actively carry traffic between data source/sink 1024 and base station 1010, implementing the same intelligent failover criteria, hysteresis algorithms, and automatic reacquisition capabilities as switching logic 1013.

The switching decisions made by switching logic 1023 on drone 1020 are coordinated with the switching decisions made by switching logic 1013 on base station 1010 through exchange of link status information over whichever communications channel is currently active. This coordination ensures that both ends of the communications link agree on which channel is carrying traffic, preventing situations where the base station is transmitting on one channel while the drone is listening on a different channel. The coordination may be implemented through explicit handshaking protocols, implicit detection of signal presence on each channel, or predetermined switching criteria that ensure both ends make the same failover decision when presented with the same link conditions.

Data source/sink 1024 on drone 1020 represents the interface to the drone's onboard systems, including the flight system 1026, camera systems, sensors, and other payload components. Data source/sink 1024 receives control commands from base station 1010 via the communications link and provides video data, telemetry, and other information to be transmitted back to base station 1010. Data source/sink 1024 connects to switching logic 1023, enabling transparent management of the underlying communications link without requiring modification of the drone's flight control software or payload systems.

Flight system 1026 comprises the flight controller, navigation systems, inertial measurement units, and motor control systems that maintain drone 1020 in stable flight and execute the commanded maneuvers. Flight system 1026 receives control commands from data source/sink 1024, which have been transmitted from base station 1010 over either the optical or radio frequency link depending on which channel is currently active. Flight system 1026 provides telemetry data back to data source/sink 1024 for transmission to base station 1010, including information such as position, velocity, attitude, battery status, and system health.

The primary FSOC link between FSOC subsystem 1015 on base station 1010 and FSOC subsystem 1025 on drone 1020 is indicated by the optical connection path shown in FIG. 10. In this embodiment, the primary link operates in the infrared wavelength range of 800 nm to 1 mm and provides high-bandwidth communications exceeding 20 Mbps. The primary FSOC link offers several advantages over radio frequency communications, including immunity to radio frequency jamming and interference, low probability of intercept and detection due to the narrow beamwidth of the optical signal, high bandwidth enabling real-time video transmission, and the ability to operate in RF-denied or contested environments where adversaries have employed sophisticated jamming techniques to disrupt conventional radio communications.

The backup RF link between RF subsystem 1011 on base station 1010 and RF subsystem 1021 on drone 1020 is indicated by the radio frequency connection path shown in FIG. 10. This backup link provides a lower-bandwidth but more environmentally robust communications channel that can maintain connectivity during conditions that disrupt the optical link. The backup RF link may also be used during initial acquisition of the optical link, as it can provide coarse positioning information that enables rapid pointing of the optical systems toward each other, reducing acquisition time from the tens of seconds typical of blind search patterns to just a few seconds.

The benefits of the hybrid FSOC/RF architecture illustrated in FIG. 10 are substantial and address several critical operational requirements for tactical drone communications in contested environments. Seamless failover maintains connectivity between base station 1010 and drone 1020 even during temporary disruptions of the primary optical link, ensuring that operators retain control of the drone and continue to receive situational awareness data during adverse conditions. This continuous connectivity is essential for mission success, as loss of communications can result in loss of the drone asset, failure to complete mission objectives, or inability to respond to dynamic tactical situations.

The RF backup provides a lower-rate backup link that, while offering lower bandwidth than the primary optical link, is sufficient to maintain basic control of drone 1020 and receive low-resolution imagery or critical telemetry during periods when the optical link is unavailable. This lower-rate backup is particularly valuable for maintaining positional awareness and ensuring that drone 1020 can be safely recovered even if extended weather conditions prevent reestablishment of the high-bandwidth optical link.

Automatic reacquisition when conditions improve is another significant benefit of the hybrid architecture. Switching logic 1013 and switching logic 1023 continuously monitor the status of both communications channels even when traffic is being carried by only one link. When the status signals from link monitor 1012a and link monitor 1022a indicate that the optical link quality has improved above the thresholds necessary for reliable communications, the switching logic automatically transitions traffic back to FSOC subsystem 1015 and FSOC subsystem 1025, restoring the superior bandwidth and security characteristics of free-space optical communications without requiring operator intervention. This automatic reacquisition capability ensures that the system takes maximum advantage of optical communications whenever environmental conditions permit, while seamlessly falling back to radio frequency backup during adverse conditions.

The hybrid architecture illustrated in FIG. 10 is particularly valuable for operations in environments where weather conditions may be variable or unpredictable, where obstacles such as smoke, dust, or vegetation may temporarily obscure line-of-sight, or where rapid maneuvers by drone 1020 may temporarily break the optical link before the pointing and tracking systems can reacquire. The automatic failover and reacquisition capabilities ensure robust, reliable communications across the full range of operational conditions, combining the high performance of free-space optical communications with the environmental robustness of radio frequency backup.

In some embodiments, the hybrid system may implement intelligent bandwidth management that dynamically allocates traffic between the optical and radio frequency links based on priority and available bandwidth. For example, high-priority control commands may be transmitted simultaneously over both links to ensure delivery even if one link fails, while lower-priority telemetry or video data may be transmitted only over the high-bandwidth optical link when available. The switching logic may also implement graceful degradation strategies that reduce video quality or frame rate when operating over the lower-bandwidth RF backup link, ensuring that connectivity is maintained while managing user expectations about the reduced performance characteristics of the backup channel.

The automatic failover capabilities may also incorporate predictive algorithms that anticipate link degradation based on environmental sensors, weather data, or learned patterns of link behavior. For example, if onboard sensors on drone 1020 detect increasing fog density or the optical receiver signal strength shows a declining trend, switching logic 1023 may preemptively activate RF subsystem 1021 before complete loss of the optical link, enabling a proactive failover that is transparent to the operator rather than a reactive failover that occurs only after the optical link has failed completely.

The coordination between switching logic 1013 on base station 1010 and switching logic 1023 on drone 1020 may be implemented through various protocols, including explicit coordination messages transmitted over both the optical and radio frequency links, heartbeat signals that indicate the health of each link, or predetermined switching criteria that ensure both ends make consistent decisions. The coordination protocol ensures that both ends of the link agree on which channel is active at any given time, preventing miscommunications that could result from one end transmitting on the optical link while the other end is listening only on the radio frequency link.

The implementation of hybrid FSOC/RF system 1000 provides a robust, reliable communications solution for tactical drone operations in contested environments, combining the superior performance characteristics of free-space optical communications with the environmental robustness and proven reliability of radio frequency backup systems. This hybrid architecture significantly improves mission success rates compared to optical-only or RF-only systems, ensuring that operators maintain control of drone assets and receive critical situational awareness data across the full range of operational conditions encountered in real-world tactical scenarios.

Figure 11:
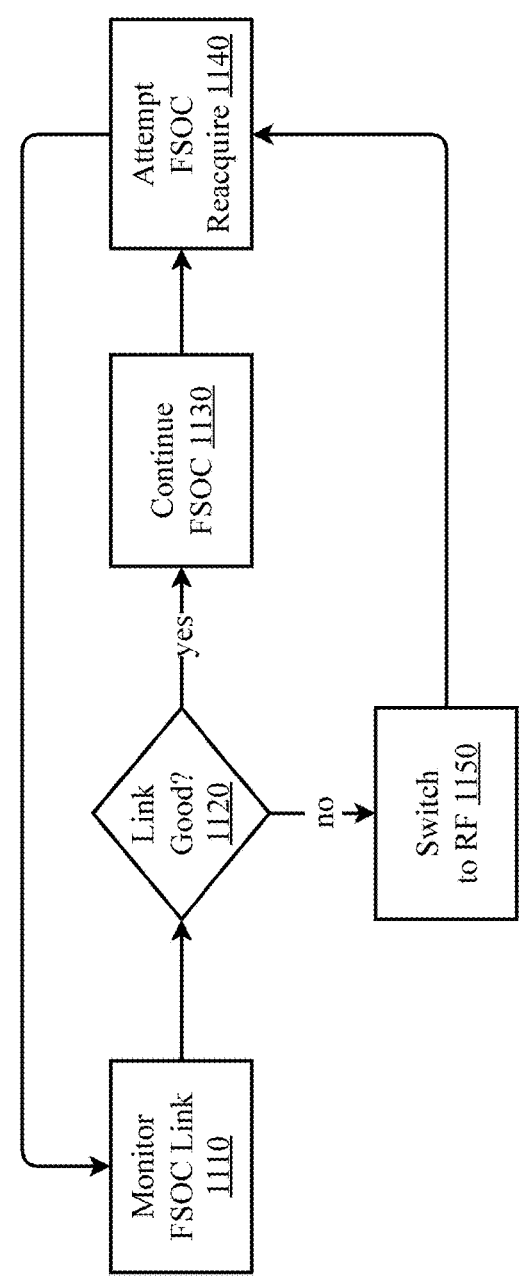
FIG. 11 illustrates exemplary automatic failover logic for a hybrid free-space optical communication and radio frequency system.

FIG. 11 illustrates exemplary automatic failover logic for a hybrid free-space optical communications and radio frequency system 1100 that implements intelligent switching between communications modes to maintain continuous connectivity during varying operational conditions. This control flow represents the decision-making process executed by switching logic at both the base station and drone to manage transitions between the high-bandwidth optical link and the backup radio frequency link. The logic may operate continuously throughout mission operations, monitoring link quality and making switching decisions based on predetermined thresholds and policies. The automatic nature of the failover process ensures that connectivity is maintained without requiring manual intervention from operators, who may be managing multiple drones simultaneously or operating in high-workload tactical scenarios.

The failover logic begins with a monitor FSOC link step 1110 that continuously assesses the quality and availability of the free-space optical communications link. Monitor FSOC link 1110 measures multiple performance parameters including received signal strength, bit error rate, packet loss rate, signal-to-noise ratio, and link availability. These measurements are performed at regular intervals, typically ranging from milliseconds to seconds depending on the expected rate of change in link conditions. For drone communications where atmospheric conditions and line-of-sight geometry can change rapidly, monitoring intervals of 100 milliseconds to 1 second provide appropriate response time while avoiding excessive computational overhead.

Monitor FSOC link 1110 implements measurement techniques appropriate for the optical link characteristics. Received signal strength is determined by measuring the photocurrent from the optical detector, with values typically expressed in decibels relative to a reference level or as absolute optical power in milliwatts. Bit error rate is computed by comparing received data against known patterns or by counting cyclic redundancy check failures in received packets. Packet loss rate is calculated by tracking sequence numbers in the communications protocol and identifying gaps indicating lost packets. Signal-to-noise ratio is derived from the ratio of signal photocurrent to noise current from the detector and amplifier chain.

Following the monitoring phase, control flow proceeds to a link good decision step 1120 that evaluates whether the free-space optical communications link is operating within acceptable performance parameters. Link good 1120 compares the measurements from monitor FSOC link 1110 against predetermined threshold values that define acceptable link quality. The decision may be based on a single parameter such as received signal strength, or may combine multiple parameters using a weighted scoring function or decision tree. Exemplary threshold values might include minimum received signal strength of −30 to −40 dBm, maximum bit error rate of $10^{-6}$ to $10^{-9}$, maximum packet loss rate of 0.1 to 1 percent, and minimum signal-to-noise ratio of 10 to 20 dB.

In some embodiments, link good 1120 may implement hysteresis in the threshold comparison to prevent rapid oscillation between the yes and no branches when link quality hovers near the decision boundary. The hysteresis is achieved by defining two threshold levels rather than a single threshold. When link quality degrades below a lower threshold, link good 1120 transitions to the no branch indicating that the link has failed. The link must then recover to a higher threshold before link good 1120 returns to the yes branch indicating that the link is restored. The separation between the lower and upper thresholds determines the hysteresis band, with typical values ranging from 3 to 10 dB for signal strength thresholds. Link good 1120 may implement more sophisticated decision algorithms than simple threshold comparison. Machine learning techniques could be employed to predict link failures before they occur based on trends in the measured parameters. For example, if signal strength is declining steadily even though it has not yet crossed the failure threshold, a predictive algorithm might initiate a proactive switch to radio frequency mode to avoid a disruptive link outage. Such predictive approaches require more computational resources but can improve overall system performance and user experience.

When link good 1120 determines that the optical link is operating satisfactorily, control flow proceeds along the yes path to a continue FSOC step 1130 that maintains operation on the primary optical communications mode. Continue FSOC 1130 represents the normal operational state where high-bandwidth communications are available for real-time video transmission and other data-intensive functions. During this state, data flows through the free-space optical subsystems at both the base station and drone, with pointing, acquisition, and tracking systems actively maintaining beam alignment. The radio frequency backup subsystem may remain powered but idle, or may be placed in a low-power standby mode to reduce overall system power consumption. Continue FSOC 1130 may adjust data transmission parameters based on measured link quality. When link quality is high, the system may increase data rate or reduce error correction overhead to maximize throughput. When link quality is marginal but still above the failure threshold, the system may reduce data rate or increase error correction to maintain reliability. This adaptive approach optimizes the use of available link capacity while delaying or avoiding the need to switch to the lower-bandwidth radio frequency backup.

After continue FSOC 1130, control flow proceeds to an attempt FSOC reacquire step 1140 that performs maintenance functions to optimize the optical link performance. Attempt FSOC reacquire 1140 may adjust pointing and tracking parameters to maximize received signal strength, update calibration factors to compensate for temperature drift, or perform periodic beam sweeps to verify that the current pointing direction provides the best signal. These optimization activities occur transparently without interrupting data communications. The reacquisition attempts ensure that the system is continuously seeking the best possible optical link quality rather than settling for marginal performance that might be vulnerable to further degradation. Attempt FSOC reacquire 1140 implements a background acquisition process that does not interfere with ongoing radio frequency communications. The optical subsystems perform beam scanning, signal detection, and tracking attempts while data continues to flow over the radio link. If the optical signal is detected and locked, the link quality is assessed to determine whether it exceeds the upper hysteresis threshold for returning to optical mode. If so, the system coordinates another mode transition back to optical communications. If the optical signal is not detected or remains below the threshold, the reacquisition attempt concludes and the system remains on the radio frequency backup link.

Attempt FSOC reacquire 1140 may implement different strategies depending on whether the optical link is currently active or whether the system is operating on radio frequency backup. When the optical link is active, reacquisition attempts focus on optimizing the existing lock through fine adjustments to pointing and tracking parameters. When operating on radio frequency, reacquisition attempts must perform a full acquisition sequence including beam scanning and signal detection. The latter case consumes more power and time, so the reacquisition interval is typically longer when operating on backup.

Following attempt FSOC reacquire 1140, control flow returns to monitor FSOC link 1110 to begin another iteration of the monitoring and decision cycle. This forms a continuous loop that repeats throughout the duration of optical communications operation. The loop frequency determines how rapidly the system can respond to changing link conditions, with typical iteration rates of 1 to 10 Hz providing appropriate balance between responsiveness and computational efficiency. Higher loop rates enable faster detection of link degradation but consume more processing resources, while lower rates reduce overhead but may result in delayed response to atmospheric changes or other disruptions.

When link good 1120 determines that the optical link quality has degraded below acceptable thresholds, control flow proceeds along the no path to a switch to RF step 1150 that transitions communications to the backup radio frequency mode. Switch to RF 1150 activates the radio frequency subsystems at both the base station and drone, establishes the radio link, and redirects data routing from the optical path to the radio path. The switching operation is performed in a controlled manner to minimize data loss during the transition.

Switch to RF 1150 implements a handshaking protocol between the base station and drone to coordinate the mode transition. The protocol ensures that both ends of the communications link switch to radio frequency mode simultaneously and that data transmission resumes only after the radio link is confirmed operational. The handshaking may utilize the degraded optical link if still partially functional, or may use the radio frequency link itself with the base station transmitting a beacon signal that the drone detects before beginning data transmission. The protocol includes timeout mechanisms to handle cases where one end of the link fails to complete the transition, ensuring that the system does not hang in an intermediate state. During switch to RF 1150, data buffering prevents loss of information during the transition interval. Outgoing data is queued in memory at both the base station and drone during the switching operation. Once the radio frequency link is established and confirmed operational, the buffered data is transmitted followed by resumption of normal data flow. The buffer size is dimensioned to hold several seconds worth of data at the maximum rate, ensuring that no data is lost even if the transition requires multiple seconds to complete. For applications where latency is critical, the buffer size may be reduced and some data discarded to minimize delay, with higher-layer protocols handling retransmission if needed. Switch to RF 1150 may provide notification to higher-level systems and operators that a mode transition has occurred. The notification allows mission planning systems to adapt to the reduced bandwidth by prioritizing critical data or reducing video resolution. Operators can be alerted that the drone has switched to backup communications, allowing them to make informed decisions about whether to continue the mission or return the drone to base if high-bandwidth data is essential. The notification may be delivered through status displays, audio alerts, or messages sent to mission management systems.

Following switch to RF 1150, control flow proceeds to attempt FSOC reacquire 1140, which takes on a different function when operating on the radio frequency backup link. Rather than optimizing an active optical link, attempt FSOC reacquire 1140 now periodically attempts to reestablish the optical link while communications continue over the radio channel. The reacquisition attempts occur at regular intervals, typically every few seconds to every few minutes depending on the expected duration of atmospheric disruptions and the computational cost of acquisition.

The implementation of logic 1100 may be executed in software on the control processors at the base station and drone, or may be implemented in firmware on dedicated communications controller hardware. Software implementation provides flexibility for modifying thresholds and policies through configuration changes, while firmware or hardware implementation may offer faster execution and lower latency. Hybrid approaches using software for high-level decision making and hardware for time-critical measurements and control provide a balance between flexibility and performance.

The timing parameters in logic 1100 should be selected to balance responsiveness against stability. If the monitoring interval in monitor FSOC link 1110 is too short, the system may respond to transient fluctuations that would resolve on their own, causing unnecessary switching. If the interval is too long, the system may fail to detect rapid link degradation, resulting in extended outages before switching to backup. Similarly, the hysteresis band in link good 1120 must be wide enough to prevent oscillation but narrow enough to avoid unnecessarily remaining on backup when optical link quality has recovered.

The reacquisition interval in attempt FSOC reacquire 1140 when operating on radio frequency backup represents a tradeoff between restoration speed and power consumption. More frequent reacquisition attempts enable faster return to high-bandwidth optical mode when conditions improve, but consume more power for operating the optical subsystems during unsuccessful attempts. Adaptive algorithms may adjust the reacquisition interval based on observed patterns, attempting reacquisition more frequently when link quality is marginally below threshold and less frequently when optical propagation is clearly blocked.

Logic 1100 provides a robust framework for managing hybrid communications that maintains connectivity across diverse operational conditions. The automatic failover ensures that temporary atmospheric disruptions do not result in loss of drone control or termination of missions. The automatic restoration to optical mode ensures that high-bandwidth capability is utilized whenever available. The continuous monitoring and intelligent decision making optimize system performance without requiring constant operator attention, reducing workload and enabling operation of larger drone swarms with limited personnel.

The control flow can be extended to handle additional communications modes beyond optical and radio frequency. If multiple radio frequency channels are available, link good 1120 and switch to RF 1150 could be elaborated to select among the available radio options based on their relative quality and jamming environment. If satellite communications backup is available, an additional decision point could route to satellite mode when both optical and terrestrial radio links are unavailable. The basic structure of continuous monitoring, quality assessment, and intelligent switching provides a framework that scales to more complex communications architectures.

Implementation of logic 1100 must account for coordination between the base station and drone. Both ends of the communications link must execute compatible logic and must agree on threshold values and switching policies. Configuration management ensures that both systems are programmed with matching parameters. The coordination protocol executed during switch to RF 1150 ensures that both ends transition together. If coordination fails due to communications disruption or system faults, fallback mechanisms ensure that at least one communications mode remains operational even if it is not the optimal choice.

The exemplary automatic failover logic 1100 represents a key enabling capability for reliable tactical drone operations in real-world environments. By intelligently managing transitions between high-bandwidth optical communications and robust radio frequency backup, the system maintains continuous connectivity while maximizing data throughput. The automatic nature of the failover and restoration processes reduces operator workload and ensures consistent system behavior. This control logic framework supports the operational requirements for drone communications in diverse atmospheric conditions and tactical scenarios where communications assurance is essential for mission success.

Figure 12:
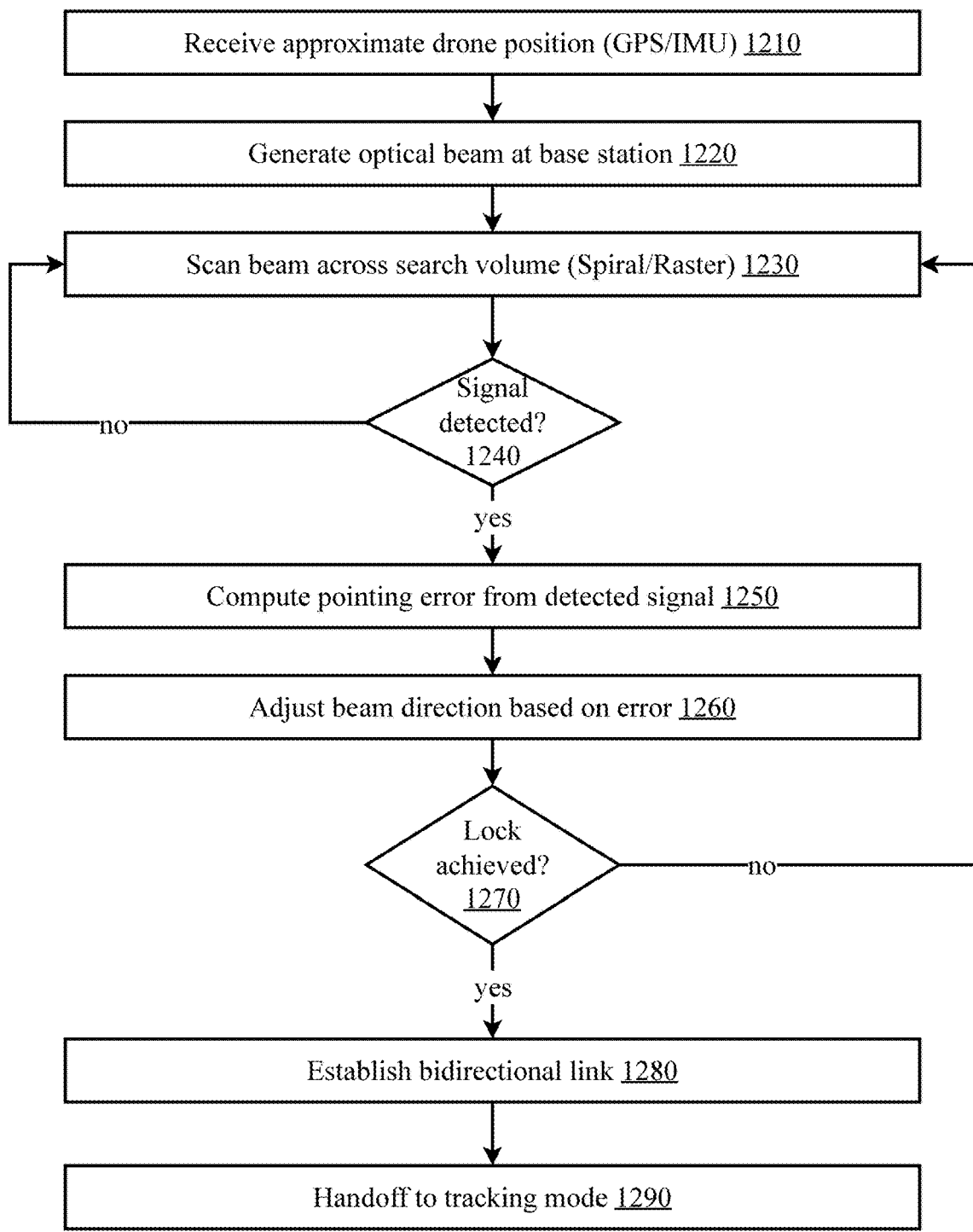
FIG. 12 illustrates an exemplary drone acquisition sequence for establishing free-space optical communication between a base station and a drone in an asymmetric optical communication system.

FIG. 12 illustrates an exemplary drone acquisition sequence 1200 for establishing free-space optical communications between a base station and a drone in an asymmetric optical communications system. Acquisition sequence 1200 represents a process for solving the pointing, acquisition, and tracking challenge that prevents existing free-space optical communications systems from being deployed on small tactical drones. The process enables initial link establishment when a drone payload and base station must find and lock onto each other across distances that may range from hundreds of meters to several kilometers, despite the inherent difficulty of aligning narrow infrared optical beams in three-dimensional space.

Acquisition sequence 1200 begins at step 1210 where approximate drone position information is received, typically via global positioning system data combined with inertial measurement unit data from onboard sensors. This initial position estimate provides base station pointing, acquisition, and tracking system 230 with a starting point for directing transmitter optics 240 toward approximate drone location. However, global positioning system accuracy is typically limited to several meters, and at ranges of one kilometer or more, this translates to angular uncertainties that are far larger than narrow beam divergence of optical transmitter. Furthermore, drone attitude and vibration mean that even if drone position were known precisely, payload orientation may differ significantly from what would be calculated from position alone.

At step 1220, processor 210 commands laser and modulation subunit 220 to generate an optical beam at base station 214. Optical beam may be of any wavelength. However, in a preferred embodiment, infrared wavelengths in range of 800 nanometers to one millimeter are utilized. Laser source may comprise a vertical-cavity surface-emitting laser with integrated modulation capability, or alternatively may utilize a continuous fiber laser, solid state laser, or diode laser combined with external electro-optic or acousto-optic modulator. Initial beam power is set based on link budget calculations that account for expected range, atmospheric conditions, and required signal-to-noise ratio at receiving detector 270.

Step 1230 involves scanning beam across a search volume using pointing, acquisition, and tracking module 230. Scanning pattern may employ either a spiral scan or a raster scan, with choice depending on expected uncertainty in drone position and characteristics of beam steering hardware. For solid-state beam steering implementations using microelectromechanical systems micromirrors or optical phased arrays, scan can be executed extremely rapidly with repositioning times under one millisecond. Scan volume is determined by combining positional uncertainty from global positioning system, expected drone velocity, and time elapsed since last position update. If drone is equipped with beacon light source as described in embodiment of FIG. 4, scanning may be performed at beacon wavelength separate from communications wavelength, allowing continuous beacon scanning without interrupting data transmission once link is established.

Decision point 1240 determines whether an optical signal from drone has been detected by detector 216 at base station receiver optics 215. Detection may occur through several mechanisms depending on system embodiment. In a standard bidirectional configuration as shown in FIG. 2, drone payload actively transmits its own optical beam through light source and modulation subunit 212 and transmitter optics 213, which base station can detect. In retroreflector embodiment shown in FIG. 4, base station transmitter beam is reflected back by modulated retroreflector 400 on drone, creating a return signal that base station can detect. If no signal is detected, control returns to step 1230 to continue scanning. This loop continues until optical signal is successfully detected or until search timeout is reached.

Upon successful signal detection, process advances to step 1250 where pointing error is computed from detected signal characteristics. Detector 216, which may comprise an indium gallium arsenide or germanium avalanche photodiode (e.g., for high sensitivity at 1550 nanometer wavelength), generates electrical signal proportional to received optical power. For beacon-based systems as illustrated in FIG. 4, position-sensitive detector 370 provides direct measurement of beacon spot position on detector surface, from which angular error can be calculated trigonometrically. Alternatively, if camera 210 or camera-based detector is employed, image processing algorithms analyze centroid of optical spot to determine pointing error in both azimuth and elevation. Error computation must account for optical aberrations in receiver optics 215, particularly at wide field angles where off-axis performance may degrade.

At step 1260, beam direction is adjusted based on computed pointing error. Pointing, acquisition, and tracking module 230 implements a control loop that translates error measurements into steering commands for beam steering optics. For systems employing fast steering mirrors, electromagnetic actuators reposition mirror angles to redirect transmitted beam toward drone. Microelectromechanical systems micromirror arrays can steer beam by coordinating tilt angles of individual mirror elements, achieving pointing updates at frequencies exceeding one kilohertz. Optical phased arrays steer beam electronically by adjusting phase relationships between individual emitter elements, with each phase shifter controlled by voltage signals from processor 210. Control algorithm typically employs proportional-integral-derivative feedback to minimize steady-state error while maintaining system stability. Gain parameters must be carefully tuned to balance tracking speed against susceptibility to noise and vibration.

Decision point 1270 evaluates whether lock has been achieved. Lock condition is met when pointing error falls below predetermined threshold and signal strength exceeds minimum required level for reliable communications. Specific thresholds depend on system design parameters including beam divergence, detector sensitivity, and required bit error rate. For a system with 50 microradian beam divergence and five kilometer range, lock threshold might be set at 10 microradians pointing accuracy with received power at least 10 decibels above detector noise floor. Additionally, lock verification may require signal stability over several consecutive measurement cycles to ensure beam alignment is not merely a momentary coincidence during continued scanning. If lock is not achieved, control returns to step 1250 for another iteration of error computation and beam adjustment. This refinement loop typically converges within several hundred milliseconds for well-designed systems with high-speed beam steering and adequate signal-to-noise ratio.

Once lock is confirmed at decision point 1270, process proceeds to step 1280 where bidirectional communications link is established. Processor 210 at base station initiates handshake protocol with processor 280 at drone payload, establishing synchronized timing for data transmission and acknowledgment. Link establishment involves negotiating modulation parameters, forward error correction schemes, and time-division multiplexing protocols if system will support multiple drone connections. In embodiments that do not have a dual-beam technology, the drone optical communication device may switch from acquisition mode where it receives a continuous beacon to communications mode where it transmits modulated interrogation beam using its solid-state beam-steering device. Link quality metrics such as received signal strength and bit error rate may be monitored to verify that established link meets performance requirements for real-time video data transmission exceeding 20 megabits per second.

Final step 1290 transitions system to tracking mode for continuous maintenance of optical link during drone flight. Tracking mode differs from acquisition mode in several important respects. Rather than scanning across wide search volume, tracking mode implements tight control loop that follows drone motion by continuously updating beam steering based on real-time detector feedback. Control loop frequency in tracking mode typically operates at 1 kilohertz or higher to compensate for drone vibration, atmospheric turbulence, and platform motion. Machine learning algorithms may be incorporated to predict drone trajectory and proactively adjust pointing, reducing lag in control system response. For systems with optical beacon as shown in FIG. 4, tracking can be performed simultaneously with data communications by separating beacon wavelength from communications wavelength using dichroic mirror 300 and dichroic mirror 350. Position-sensitive detector 370 continuously monitors beacon light source 310 to provide pointing error feedback even while data detector 360 processes communications data stream 320.

Acquisition sequence 1200 is designed to achieve expected target acquisition time of less than 10 seconds, as indicated at bottom of FIG. 12. This aggressive timeline is achievable through combination of solid-state beam steering technologies that eliminate slow mechanical gimbals, high-speed detectors with response times under 1 microsecond, and optimized search algorithms that efficiently cover expected drone position uncertainty. Fast acquisition time is critical for tactical military applications where drone must establish communications immediately upon deployment to denied environments where radio frequency communications are jammed or spoofed. Once tracking mode is established at step 1290, system maintains optical link continuously during drone flight, providing user with reliable high-bandwidth connection for transmitting control commands to flight system and receiving real-time video data from a camera monitoring the scene near the drone.

Robustness of acquisition sequence 1200 is enhanced by several fail-safe mechanisms. If acquisition cannot be completed within timeout period, system may expand search volume to account for larger positional uncertainties or may request updated position information through low-rate radio frequency side-channel if available. In mesh network configurations supporting swarm operations, nearby drones that have already established optical links may relay position information to assist new drone in acquisition process. System may also implement graduated acquisition strategy where initial contact is made using wider beam divergence for easier alignment, followed by transition to narrower beam once coarse lock is achieved. These adaptive strategies ensure that acquisition sequence 1200 succeeds even under challenging conditions including atmospheric turbulence, drone vibration, and significant position uncertainty from degraded global positioning system signals.

Figure 13:
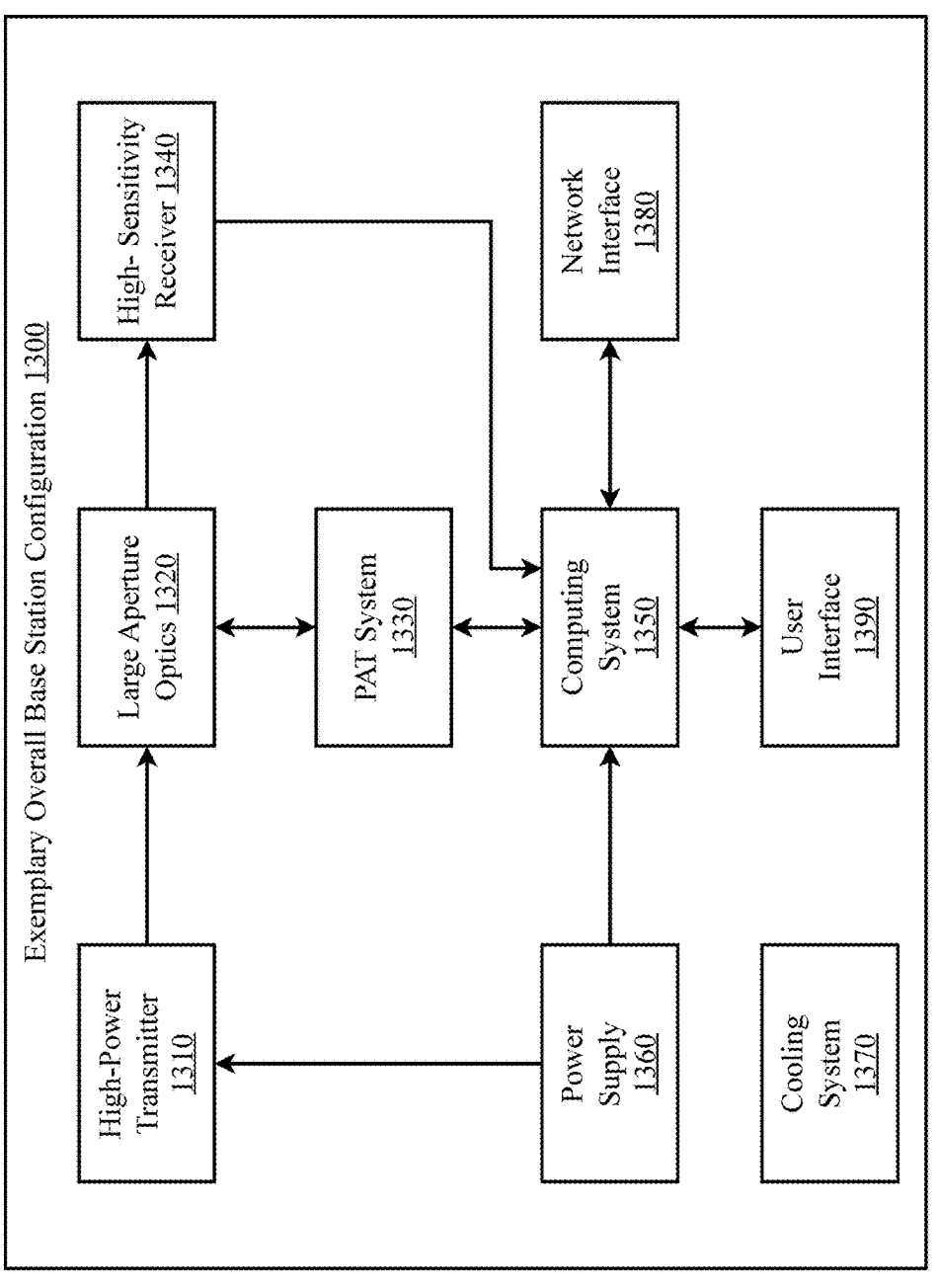
FIG. 13 illustrates an exemplary overall base station configuration for a free-space optical communication system for drone networks.

FIG. 13 illustrates an exemplary overall base station configuration 1300 that demonstrates the asymmetric architecture of an embodiment of the free-space optical communications system for drone networks. Base station configuration 1300 is largely unconstrained by size, weight, and power limitations that restrict drone payload, thereby enabling the disclosed system to achieve a 500-fold weight reduction and 1000-fold cost reduction compared to existing free-space optical communications systems. The asymmetric design philosophy embodied in base station 1300 allows all heavy, power-intensive, and computationally demanding components to be located on the ground or on large platforms, while drone payload carries only the minimum essential components necessary for establishing and maintaining optical link.

Interconnections shown in FIG. 13 illustrate functional relationships and data flow paths between components of base station configuration 1300. High-power transmitter 1310 provides optical output to large aperture optics 1320, which shape and direct beam toward drone payload. Return signal collected by large aperture optics 1320 is directed to high-sensitivity receiver 1340, which extracts data and provides feedback signals to computing system 1350. Pointing, acquisition, and tracking system 1330 receives control commands from computing system 1350 and adjusts beam steering elements within large aperture optics 1320 to maintain alignment with drone. Computing system 1350 serves as central hub, communicating with user interface 1390 to present information to user 200 and receive commands, with network interface 1380 to exchange data with external networks, with pointing, acquisition, and tracking system 1330 to maintain optical link, and with high-power transmitter 1310 to encode and transmit data. Power supply 1360 provides electrical power to computing system 1350 and high-power transmitter 1310, while cooling system 1370 removes waste heat from these and other thermally-loaded components.

High-power transmitter 1310 represents a significant departure from conventional optical communications systems that attempt to maintain symmetric designs with identical terminals at both ends of link. In some embodiments, high-power transmitter 1310 is capable of generating optical power of tens of watts (or even hundreds of watts if necessary), which is substantially greater than the milliwatt-level powers that can be accommodated on drone payload constrained to less than 10 watts total power consumption.

This high transmit power compensates for reduced aperture size and pointing accuracy available on drone payload, ensuring that sufficient optical power reaches drone receiver optics even at extended ranges of 10 kilometers or more. High-power transmitter 1310 may comprise fiber laser capable of continuous-wave output at 1550 nanometer wavelength, combined with external modulator such as electro-optic or acousto-optic modulator capable of switching speeds exceeding 100 megahertz to support real-time video data rates of 20 megabits per second or higher. Alternatively, high-power transmitter 1310 may employ array of vertical-cavity surface-emitting lasers with integrated modulation capability, where individual emitters are coherently combined to achieve desired output power while maintaining fast modulation response.

Large aperture optics 1320 provide extended range capability that would be impossible to achieve with compact optics that must fit within drone payload envelope. Large aperture optics 1320 may comprise telescope or other beam-forming optical system with aperture diameter of 10 centimeters or larger, which provides both improved beam collimation for transmitter function and increased light collection efficiency for receiver function. For transmitter function, large aperture optics 1320 reduce beam divergence inversely proportional to aperture diameter, allowing narrower beams that deliver higher intensity at drone location for given transmit power from high-power transmitter 1310. For receiver function, large aperture optics 1320 collect more photons from weak return signal transmitted by drone payload, improving signal-to-noise ratio at high-sensitivity receiver 1340. Large aperture optics 1320 are preferably designed using materials and coatings optimized for infrared wavelengths in range of 800 nanometers to one millimeter, with particular emphasis on 1550 nanometer wavelength for eye safety and covertness. Optical elements within large aperture optics 1320 may include lenses, mirrors, beam splitters, and filters arranged to separate transmit and receive optical paths as described above.

Pointing, acquisition, and tracking system 1330 coordinates operation of multiple subsystems to maintain optical alignment with one or more drones. Pointing, acquisition, and tracking system 1330 receives feedback signals from high-sensitivity receiver 1340 indicating detected signal strength and pointing error, processes this information through control algorithms executed by computing system 1350, and commands beam steering elements within large aperture optics 1320 to adjust transmitted beam direction. Pointing, acquisition, and tracking system 1330 may incorporate solid-state beam steering technologies including microelectromechanical systems micromirror arrays, optical phased arrays, or spatial light modulators that eliminate mechanical gimbals and their associated weight, size, inertia, and reliability limitations. These solid-state beam steering approaches enable control loop frequencies exceeding one kilohertz, allowing pointing, acquisition, and tracking system 1330 to compensate for vibration, atmospheric turbulence, and rapid drone maneuvers that would overwhelm slower mechanical systems. For swarm operations, pointing, acquisition, and tracking system 1330 must support multiple drone tracking capability, either through time-division multiplexing where single beam rapidly switches between multiple drones, or through spatial multiplexing where multiple independent beam steering channels simultaneously track different drones.

High-sensitivity receiver 1340 detects weak optical signals returning from drone payload after propagating across potentially kilometers of atmosphere. High-sensitivity receiver 1340 benefits from relaxed size, weight, and power constraints of base station 1300 by incorporating detector technologies that would be impractical for drone-mounted applications. High-sensitivity receiver 1340 preferably employs avalanche photodiode detector with cooling system 1370 to reduce thermal noise and improve sensitivity. For 1550 nanometer operation, for example, indium gallium arsenide avalanche photodiode provides quantum efficiency exceeding 70 percent with gain-bandwidth product sufficient for 100 megabits per second or higher data rates. Alternatively, high-sensitivity receiver 1340 may incorporate array detector or imaging detector that provides spatial information about received beam position for enhanced tracking performance. Signal processing electronics within high-sensitivity receiver 1340 amplify weak photocurrent from detector, perform analog-to-digital conversion, and implement forward error correction decoding to recover transmitted data with bit error rates better than $10^{-9}$ even under marginal link conditions. For solid-state beam-steering embodiments, high-sensitivity receiver 1340 must detect modulated return signal where drone payload uses solid-state beam-steering to modulate interrogation beam from base station rather than transmitting independently generated optical signal.

Computing system 1350 serves as central coordinator for functions within base station configuration 1300. Computing system 1350 may comprise general-purpose computer such as laptop or microcomputer, or may incorporate specialized hardware accelerators such as field-programmable gate arrays or graphics processing units optimized for intensive signal processing and control algorithm execution. Computing system 1350 receives video data decoded by high-sensitivity receiver 1340 and presents it to user 200 through user interface 1390, while simultaneously receiving control commands from user 200, encoding them into modulation signals, and directing high-power transmitter 1310 to transmit commands to drone flight system 290. Computing system 1350 may execute acquisition sequence 1200 described in FIG. 12, implementing search algorithms, error computation, and control loop algorithms that maintain optical link through pointing, acquisition, and tracking system 1330. For swarm operations, computing system 1350 may coordinate communications with multiple drones simultaneously, implementing time-division multiplexing protocols, managing network routing through mesh topology, and optimizing overall network throughput. Machine learning algorithms executed by computing system 1350 may predict drone trajectories to improve tracking performance, adapt modulation parameters based on link quality, and optimize acquisition strategies based on historical performance data.

Power supply 1360 provides electrical power to all components within base station configuration 1300 without the severe constraints that limit drone payload to less than 10 watts total power consumption. Power supply 1360 may draw power from commercial electrical grid if base station 1300 is deployed at fixed installation such as tower 130 shown in FIG. 1, or may comprise generator or battery system for mobile deployments on vehicles or portable towers. Total power consumption of base station 1300 is not limited, but would normally range from tens to hundreds of watts depending on transmit power level, cooling requirements, and computational demands, but this power budget is unconstrained compared to strict limitations imposed on drone payload. Power supply 1360 must provide clean, stable power with appropriate voltage levels and current capacity for high-power transmitter 1310, which may require tens of watts of electrical input to generate one watt or more of optical output, as well as power for computing system 1350, cooling system 1370, and other subsystems. Uninterruptible power supply or battery backup may be incorporated within power supply 1360 to maintain operations during brief power interruptions, which is particularly important for military applications where reliable communications must be maintained under all conditions.

Cooling system 1370 manages thermal loads generated by high-power transmitter 1310, computing system 1350, and high-sensitivity receiver 1340. Cooling system 1370 represents another component that benefits from asymmetric architecture of disclosed system, as active cooling would be impractical for drone payload constrained to less than one or two kilograms total weight. High-power transmitter 1310 generating one watt or more of optical output may dissipate several watts or more of waste heat that must be removed to prevent component damage and maintain stable operation. Similarly, high-sensitivity receiver 1340 benefits from cooling to reduce detector dark current and improve signal-to-noise ratio, particularly for long-range links where received signals are extremely weak. Cooling system 1370 may employ forced air cooling using fans, liquid cooling using pumped coolant, or thermoelectric cooling for precision temperature control of critical components. For outdoor deployments in extreme environments, cooling system 1370 must be designed to operate across wide temperature range from below freezing to desert heat conditions while maintaining component temperatures within specified operating ranges.

Network interface 1380 connects base station configuration 1300 to external communications networks and command infrastructure. Network interface 1380 may provide ethernet connectivity for wired networks, wireless connectivity through radio frequency links for mobile deployments, or fiber optic connectivity for high-bandwidth backbone connections. For military applications, network interface 1380 must implement appropriate encryption and authentication protocols to ensure secure communications and prevent unauthorized access to system or data. Network interface 1380 enables remote operation of base station 1300, allowing operators to control drone missions from distant command centers rather than requiring physical presence at base station location. For swarm operations involving multiple drones communicating through mesh network topology, network interface 1380 must support aggregated data rates from all drones simultaneously, potentially requiring gigabit-per-second or higher bandwidth depending on number of drones and video quality requirements. Network interface 1380 also facilitates integration with other sensor systems and command-and-control infrastructure, allowing drone video feeds and sensor data to be distributed to multiple users and integrated with broader situational awareness systems.

User interface 1390 provides means for user 200 to interact with base station configuration 1300, monitor system status, view received video data from camera 210 monitoring scene 211, and issue commands to drone flight system 290. User interface 1390 may comprise display screen showing real-time video feed, graphical overlays indicating drone position and orientation, link quality metrics such as received signal strength and bit error rate, and system health indicators for all subsystems within base station 1300. Input devices within user interface 1390 may include keyboard and mouse for general control, joystick or game controller for intuitive flight control, and touchscreen for rapid access to frequently-used functions. For swarm operations, user interface 1390 must provide clear presentation of multiple simultaneous video feeds and status information for all drones in network, potentially including map view showing drone positions and network connectivity topology. User interface 1390 may also provide diagnostic and configuration tools allowing operators to adjust system parameters such as transmit power levels, modulation schemes, acquisition search patterns, and tracking loop gains to optimize performance for specific mission requirements and environmental conditions.

Base station configuration 1300 shown in FIG. 13 may be deployed in variety of configurations. Fixed installation embodiments locate base station 1300 on a tower 130 as illustrated in FIG. 1, providing elevated position that extends line-of-sight range and reduces atmospheric path length through boundary layer where turbulence and particulate scattering are most severe. Mobile embodiments mount base station 1300 on vehicle such as Humvee, allowing rapid deployment to forward operating bases and tactical positions where fixed infrastructure is unavailable. Portable embodiment packages base station 1300 components in transportable cases that can be set up on tripod or other temporary mounting structure for rapid deployment by small teams. Aerial embodiment deploys base station 1300 on large overwatch drone capable of carrying substantial payload to high altitudes, serving as airborne relay node for intelligence, surveillance, and reconnaissance drones operating below. Each deployment embodiment benefits from fundamental asymmetry of disclosed design, where base station 1300 incorporates heavy, power-intensive, high-performance components while maintaining compatibility with ultra-lightweight drone payload that enables operation on small tactical drones for the first time.

FIG. 14 illustrates an exemplary implementation of a drone communication system as payload 1400, showing the practical integration of the free-space optical communications terminal onto a tactical drone platform. This embodiment demonstrates how the various subsystems described in the preceding figures are packaged into a compact, lightweight payload that meets the strict size, weight, and power constraints necessary for deployment on Group 2 drones. The exemplary implementation shown in FIG. 14 represents a configuration incorporating many of the weight-reduction strategies discussed throughout this disclosure, including solid-state beam steering, miniaturized optics, efficient power management, and integrated packaging that achieves the size, weight, and power (SWaP) needed for tactical drone applications.

Drone/payload mounting interface 1410 provides the mechanical and electrical connection between drone communication system as payload 1420 and the host drone airframe. Drone/payload mounting interface 1410 of this embodiment comprises a standardized mounting structure that enables plug-and-play integration with Group 2 drones, which are defined as unmanned aerial vehicles with total payload capacities of 10-25 kg. The standardized nature of drone/payload mounting interface 1410 is important for rapid deployment and field maintenance, allowing operators to quickly install or swap communications payloads without requiring specialized tools or extensive technical expertise. Drone/payload mounting interface 1410 includes mechanical attachment points that secure the payload to the drone airframe while isolating it from excessive vibration that could disrupt the precision optical alignment required for free-space optical communications. The interface further includes electrical connectors that provide power from the drone battery system to drone communication system as payload 1420, as well as data connections that enable communication between the payload processor and the drone flight controller.

Drone communication system as payload 1420 represents an integrated communications terminal that has been optimized to meet the SWaP constraints of tactical drone operations. The entire assembly of drone communication system as payload 1420 of this embodiment weighs less than 2 kg for intelligence, surveillance, and reconnaissance missions where the drone platform can support slightly larger payloads, or less than 1 kg for swarm missions where the individual drones are smaller and more weight-constrained. The power consumption of drone communication system as payload 1420 is maintained below 10 W to preserve battery life and ensure adequate flight duration for mission completion. The physical dimensions of drone communication system as payload 1420 are approximately 15 cm by 15 cm by 10 cm, creating a compact form factor that minimizes aerodynamic drag and fits within the payload bays or mounting provisions of standard Group 2 drone platforms.

Camera 1421 is the primary sensor that captures video imagery of the operational area below or around the drone. Camera 1421 may comprise a visible spectrum camera, infrared camera, multispectral imaging sensor, or combination thereof depending on the mission requirements. For intelligence, surveillance, and reconnaissance missions, camera 1421 typically provides high-resolution video at frame rates of 30-60 frames per second, generating data streams that require bandwidth exceeding 20 Mbps when transmitted in real-time with minimal compression. Camera 1421 connects to processor 1424, providing the raw or lightly compressed video data that will be encoded for transmission over the optical communications link. The selection of camera 1421 balances image quality requirements with the weight and power constraints of the overall payload, often utilizing compact CMOS or CCD sensors with integrated digital signal processing to minimize the computational burden on processor 1424.

Optics 1422 comprises the optical elements that focus, collimate, and direct the infrared optical beam for free-space communications. Optics 1422 includes transmitter optics that shape the outgoing optical beam for efficient propagation across the link distance, as well as receiver optics that collect incoming optical signals from the base station and focus them onto detector 1427. In preferred embodiments, optics 1422 implements a common aperture configuration where the same optical elements serve both transmit and receive functions, reducing weight and size compared to separate transmit and receive apertures. Optics 1422 may utilize lightweight materials such as plastic or composite optical elements where aberration and scatter specifications permit, further reducing weight compared to conventional glass optics. The aperture diameter of optics 1422 is typically in the range of 3-10 cm for drone-mounted terminals, balancing the competing requirements of beam divergence, collection efficiency, and weight constraints. Optics 1422 includes appropriate coatings optimized for the infrared wavelength range of 800 nm to 1 mm, preferably centered around 1550 nm for eye safety and to take advantage of mature telecommunications components.

Battery 1423 provides electrical power to all components within drone communication system as payload 1420. In the illustrated embodiment, battery 1423 draws power from the drone main battery system through drone/payload mounting interface 1410, distributing regulated power to processor 1424, PAT system 1425, detector 1427, and camera 1421. Battery 1423 may incorporate power conditioning circuitry that provides stable, noise-free power to the sensitive optical and electronic components, preventing power supply fluctuations from degrading communication link performance. In some embodiments, battery 1423 may include a local energy storage capacitor or small battery cell that can provide brief bursts of higher power during periods of peak demand, such as during initial acquisition of the optical link when the beam steering systems are performing rapid search patterns. The power management implemented through battery 1423 is critical to achieving the overall power budget of less than 10 W for the entire payload, requiring careful allocation of power among the various subsystems and implementation of power-saving modes during periods when full communications capability is not required.

Processor 1424 serves as the central computing element that coordinates all functions within drone communication system as payload 1420. Processor 1424 receives video data from camera 1421 and encodes it into a format suitable for transmission over the optical communications link, implementing appropriate modulation schemes, error correction coding, and data compression as needed to achieve reliable transmission while maximizing bandwidth utilization. Processor 1424 also receives command and control data from the base station via the optical link, decoding the received signals from detector 1427 and forwarding the resulting flight commands to flight controller 1426. Processor 1424 implements the control algorithms for PAT system 1425, computing the pointing corrections needed to maintain optical alignment with the base station based on feedback from detector 1427 or other tracking sensors. The computational requirements of processor 1424 are substantial, including real-time video encoding, communications protocol handling, beam steering control loop execution at frequencies exceeding 100 Hz and preferably exceeding 1 kHz, and coordination with flight controller 1426 for integrated navigation and communications functions.

To meet the stringent power and size constraints of the drone payload, processor 1424 may be selected from low-power embedded computing platforms and microcontrollers with sufficient processing capability, or custom system-on-chip designs that integrate multiple functions onto a single die. These compact computing platforms provide adequate computational performance for the required signal processing tasks while consuming only 1-5 W of power, leaving sufficient power budget for the optical subsystems. Processor 1424 may incorporate hardware acceleration for video encoding and decoding, reducing the computational burden on the main processor and improving power efficiency. In advanced embodiments, processor 1424 may implement machine learning algorithms that predict drone motion and base station location, enabling predictive pointing of PAT system 1425 to compensate for control loop latency and improve tracking performance during rapid drone maneuvers.

PAT system 1425 implements the pointing, acquisition, and tracking functionality that maintains optical alignment between the drone-mounted terminal and the base station despite the motion of the drone and environmental disturbances. PAT system 1425 of this embodiment enables the ultra-low weight implementation shown in FIG. 14, utilizing solid-state beam steering technologies rather than the heavy mechanical gimbals employed by conventional optical communications terminals. PAT system 1425 may comprise MEMS micromirror arrays that provide fast, lightweight beam steering through arrays of individually controllable microscale mirrors, optical phased arrays that steer the optical beam through electronic control of phase shifters without any moving parts, or combinations of these technologies that provide both coarse and fine pointing capability.

The solid-state beam steering implemented by PAT system 1425 eliminates the mechanical gimbals that have traditionally added tens to hundreds of kilograms to optical communications terminals, enabling the 500-fold weight reduction claimed in this disclosure. PAT system 1425 receives control signals from processor 1424 indicating the required beam pointing direction, and adjusts the beam steering elements accordingly to direct the transmitted optical beam toward the base station and optimize collection of the received optical signal. PAT system 1425 must operate at control loop frequencies exceeding 100 Hz to compensate for drone vibration and motion, with preferred implementations operating at frequencies exceeding 1 kHz to provide rapid response to disturbances. The field of regard provided by PAT system 1425 depends on the specific beam steering technology employed, with MEMS systems typically providing 60-180 degrees of steering range and optical phased arrays currently providing 10-30 degrees, with future implementations targeting broader coverage as the technology matures.

PAT system 1425 connects bidirectionally with optics 1422, controlling the beam direction of the transmitted signal and receiving feedback about the received signal quality to optimize pointing. PAT system 1425 also connects to detector 1427, using the received signal strength and quality metrics from detector 1427 as feedback to refine the pointing direction and maximize communications link performance. In some embodiments, PAT system 1425 may incorporate inertial measurement unit data from flight controller 1426 to compensate for drone motion and vibration, implementing feedforward control that anticipates pointing corrections needed due to known aircraft accelerations and rotations.

Flight controller 1426 is the drone autopilot system that maintains stable flight and executes commanded maneuvers. Flight controller 1426 receives control commands from processor 1424, which has decoded these commands from the optical communications link originating at the base station. Flight controller 1426 translates the high-level navigation commands into motor control signals that adjust the thrust and orientation of the drone rotors or control surfaces, executing the commanded flight path while maintaining stability. Flight controller 1426 incorporates inertial measurement units, GPS receivers when available, barometric pressure sensors, and other navigation sensors that enable it to determine the drone position, velocity, and attitude. This navigation information is provided back to processor 1424 where it can be included in the telemetry data transmitted to the base station, and also used by PAT system 1425 to improve pointing accuracy through compensation for known aircraft motions.

The integration between flight controller 1426 and drone communication system as payload 1420 is facilitated through drone/payload mounting interface 1410, which provides the electrical data connections between processor 1424 and flight controller 1426. This integration enables the plug-and-play installation that is an important practical feature for field deployment, allowing operators to install the communications payload on compatible drones without requiring extensive reconfiguration or custom software development. Flight controller 1426 typically implements standard communications protocols such as MAVLink that enable it to receive commands and report status to external systems, and processor 1424 is configured to translate between these standard drone control protocols and the optical communications link protocols.

Detector 1427 converts the received optical signal from the base station into electrical signals that can be processed by processor 1424. Detector 1427 of this embodiment is selected to provide high sensitivity in the infrared wavelength range of 800 nm to 1 mm, with particular emphasis on performance at 1550 nm where the system preferably operates. Detector 1427 of this embodiment] comprises an InGaAs or Ge photodiode that is sensitive to infrared radiation, with avalanche photodiode configurations preferred for applications requiring maximum sensitivity to detect weak optical signals received over long link distances or during adverse atmospheric conditions. The response time of detector 1427 is fast enough to support the high data rates exceeding 20 Mbps required for real-time video transmission, with bandwidths of 50-200 MHz typical for such applications. Detector 1427 receives optical signals that have been collected by optics 1422 and focused onto the active area of the photodetector. Optical filters may be incorporated in the optical path before detector 1427 to reject background light from the sun or other sources that could overwhelm the desired signal or reduce signal-to-noise ratio. Detector 1427 connects to PAT system 1425, providing feedback signals that indicate the received signal strength and enable PAT system 1425 to optimize the pointing direction to maximize received power. Detector 1427 also connects to processor 1424, providing the demodulated data signal that processor 1424 decodes to recover the control commands and other information transmitted from the base station.

The power consumption of detector 1427 is minimized as part of the overall power budget management for drone communication system as payload 1420. Avalanche photodiodes, while providing excellent sensitivity, require bias voltages of tens to hundreds of volts, necessitating efficient high-voltage power supplies that minimize quiescent power consumption. Consequently, PIN photodiodes may be used to eliminate the high-voltage requirement at the cost of reduced sensitivity, and may be preferred in applications where the optical link budget provides adequate margin. The selection of detector 1427 technology involves trading off sensitivity, bandwidth, power consumption, size, and cost to optimize the overall system performance within the constraints of the tactical drone platform.

Power management within drone communication system as payload 1420 in this embodiment is less than 10 W. Battery 1423 distributes power to all subsystems, with typical allocations being approximately 1-3 W for processor 1424, 2-4 W for PAT system 1425 including the optical transmitter and beam steering elements, 0.5-1 W for detector 1427 and associated receiver electronics, and 1-2 W for camera 1421. These power allocations require careful component selection and the implementation of power-saving modes that reduce consumption during periods of lower activity. For example, processor 1424 may reduce its clock frequency during periods when video encoding demands are lower, PAT system 1425 may reduce its update rate when the optical link is stable and not requiring rapid pointing corrections, and camera 1421 may reduce its frame rate or resolution when bandwidth constraints necessitate lower data rates.

The weight budget of drone communication system as payload 1420 of this embodiment is similarly partitioned among the various subsystems. For the 2 kg ISR mission configuration, typical weight allocations are approximately 0.4-0.6 kg for optics 1422 including lenses, mirrors, and mechanical housings, 0.3-0.5 kg for PAT system 1425 including the beam steering elements and drive electronics, 0.2-0.4 kg for processor 1424 and associated circuit boards, 0.1-0.2 kg for detector 1427 and receiver electronics, 0.2-0.4 kg for camera 1421, and 0.3-0.5 kg for structural elements, thermal management, and the integration hardware of drone/payload mounting interface 1410. For the more aggressive 1 kg swarm mission configuration, each of these components must be further optimized, potentially through the use of advanced materials, higher levels of integration, and acceptance of reduced performance margins in favor of weight savings.

The dimensional envelope of the payload 1420 of this embodiment is approximately 15 cm by 15 cm by 10 cm configured to fit within the payload bays or mounting provisions of Group 2 drones while maintaining aerodynamic cleanliness. In this compact form factor, components are stacked and nested to maximize volume utilization. Optics 1422 typically defines a major dimension of the package, as the aperture diameter and required focal length establish minimum optical path lengths that cannot be arbitrarily reduced. Folded optical paths using mirrors may be employed to reduce the overall package length while maintaining the required optical performance. PAT system 1425 using MEMS or optical phased array technologies can be made extremely compact, occupying volumes of only a few cubic centimeters, which is a key advantage over the bulky mechanical gimbals of conventional systems.

The plug-and-play integration capability specified for drone communication system as payload 1420 is an important practical feature that facilitates rapid deployment and enables the communications capability to be quickly transferred between different drone platforms as mission requirements change. The standardized nature of drone/payload mounting interface 1410 means that operators in the field can install the payload on any compatible Group 2 drone using only basic tools and without requiring specialized training. The automatic configuration and calibration capabilities implemented in processor 1424 minimize the setup time required after installation, automatically detecting the drone type through communication with flight controller 1426 and adjusting operating parameters accordingly.

The compatibility with Group 2 drones specified for drone communication system as payload 1420 addresses an important operational requirement, as this drone category represents a sweet spot for tactical applications where the platforms are large enough to carry useful payloads and provide adequate flight duration, yet small enough to be manportable and rapidly deployable. Group 2 drones are defined as unmanned aerial systems weighing between 10 and 25 kg, with typical examples including the Boeing Insitu ScanEagle, Aero Vironment Puma, and similar platforms. These drones typically offer payload capacities of 2-5 kg and flight durations of 2-8 hours, making them well-suited for intelligence, surveillance, and reconnaissance missions where the high-bandwidth communications provided by drone communication system as payload 1420 enable real-time transmission of video data to ground operators.

The two weight configurations specified for drone communication system as payload 1420 reflect different mission priorities and platform constraints. The 2 kg configuration for ISR missions provides maximum capability in terms of optical aperture size, transmit power, receiver sensitivity, and processing capability, supporting the longest communication ranges and highest data rates. This configuration is appropriate for larger Group 2 platforms and missions where intelligence gathering is the primary objective and the communications link must support full-motion high-definition video transmission. The 1 kg configuration for swarm missions sacrifices some performance to achieve the weight target necessary for deployment on smaller drones operating in coordinated groups, where network effects and mission redundancy compensate for the reduced individual capability of each node.

Figure 15:
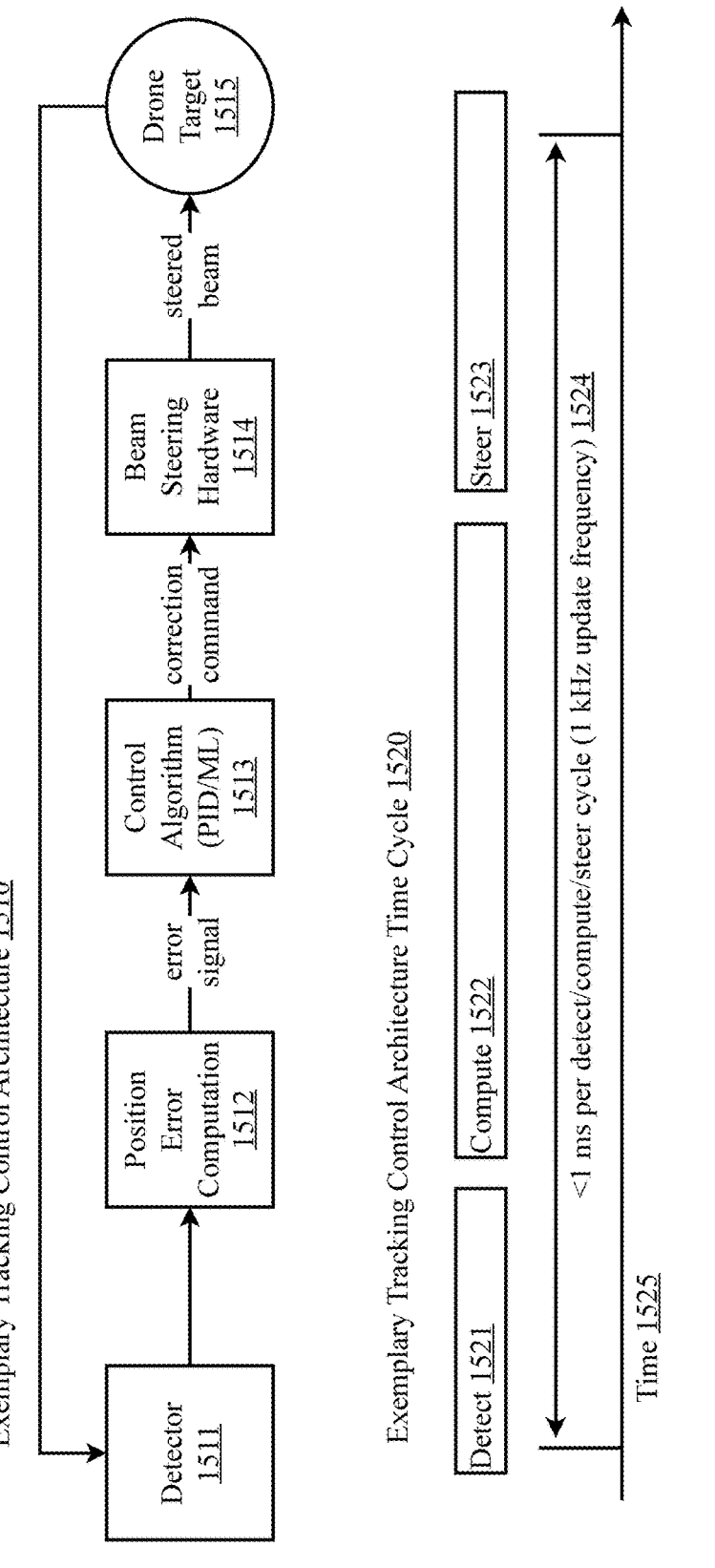
FIG. 15 illustrates an exemplary tracking communication loop for a free-space optical communication system for drone networks.

FIG. 15 illustrates an exemplary tracking control loop 1500 that maintains continuous optical alignment between base station and drone during flight operations. Tracking control loop 1500 represents an important part of pointing, acquisition, and tracking system 230 described in FIG. 2 and pointing, acquisition, and tracking system 1330 shown in FIG. 13, operating after successful completion of acquisition sequence 1200 illustrated in FIG. 12. A challenge addressed by tracking control loop 1500 is maintaining precise optical alignment despite drone motion, vibration, atmospheric turbulence, and platform instabilities that continuously perturb beam pointing. Unlike acquisition mode where system searches over wide angular region to locate drone, tracking mode implements tight closed-loop control that follows drone movements in real time with high bandwidth and low latency. Success of entire free-space optical communications system depends on ability of tracking control loop 1500 to maintain link continuity during dynamic flight operations including turns, climbs, descents, and evasive maneuvers.

Exemplary tracking control architecture 1510 shown in upper portion of FIG. 15 depicts functional blocks and signal flow paths that comprise tracking control loop 1500. Architecture 1510 implements classical feedback control structure where measured output is compared to desired reference to generate error signal that drives corrective action. This architecture is fundamental to control theory and has been successfully applied to countless systems requiring precise regulation or tracking. However, application to free-space optical communications for small tactical drones presents unique challenges due to extreme angular precision requirements, rapid drone motion, severe vibration environment, and stringent size, weight, and power constraints that limit available hardware solutions. Architecture 1510 addresses these challenges through combination of fast solid-state beam steering hardware and sophisticated control algorithms that predict drone motion and compensate for system delays.

Detector 1511 within tracking control architecture 1510 measures optical signal received from drone target 1515 and provides information about signal strength and beam position that is used to compute pointing error. Detector 1511 corresponds to detector 216 at base station shown in FIG. 2 or may correspond to position-sensitive detector 370 receiving beacon light in optical beacon embodiment illustrated in FIG. 3. For tracking applications, detector 1511 must provide not only signal strength information but also spatial information indicating where optical beam is centered relative to detector sensitive area. This spatial information can be obtained through several approaches. Position-sensitive detector directly measures centroid of optical spot, providing analog output voltages proportional to beam position in two orthogonal axes. Quadrant detector divides sensitive area into four regions and compares signal levels between regions to compute beam position. Imaging detector or camera captures full two-dimensional intensity distribution from which beam centroid can be calculated through digital image processing. Choice among these detector types involves tradeoffs between speed, sensitivity, complexity, and cost. For tracking control loop 1500 operating at update frequencies greater than 1 kilohertz as specified in exemplary system specifications 1530, detector 1511 must have response time well under 1 millisecond to avoid becoming bottleneck in control loop timing.

Position error computation 1512 processes measurements from detector 1511 to calculate angular error between current beam pointing direction and desired direction toward drone target 1515. Position error computation 1512 generates error signal that quantifies magnitude and direction of pointing error in both azimuth and elevation axes. For position-sensitive detector or quadrant detector, error computation involves simple arithmetic operations on analog voltage levels, potentially with corrections for nonlinearities and offset errors determined through calibration. For imaging detector, error computation requires more sophisticated digital image processing including background subtraction, thresholding, and centroid calculation algorithms. Regardless of implementation approach, position error computation 1512 should execute quickly enough to meet overall control loop latency requirement of less than 1 millisecond per cycle specified in exemplary system specifications 1530. Error signal output from position error computation 1512 represents instantaneous pointing error at moment of measurement, but effective tracking requires that control algorithm 1513 account for delays in control loop and predict where drone target 1515 will be by time beam steering hardware 1514 completes commanded adjustment. Position error computation 1512 may also filter measurements to reduce noise while maintaining adequate bandwidth for tracking drone motion, implementing techniques such as Kalman filtering that optimally balance noise reduction against tracking responsiveness.

Control algorithm 1513 implements control signals that convert error signal from position error computation 1512 into correction command that drives beam steering hardware 1514 to reduce pointing error. Control algorithm 1513 designation of proportional-integral-derivative or machine learning indicated in FIG. 15 represents two complementary approaches to control law design. Proportional-integral-derivative control is classical approach that has been successfully applied to countless control systems and is well understood from both theoretical and practical perspectives. Proportional term generates correction command proportional to instantaneous error, providing immediate response that tends to drive error toward zero. Integral term accumulates error over time and generates correction command proportional to accumulated error, eliminating steady-state errors that proportional control alone cannot remove. Derivative term generates correction command proportional to rate of change of error, providing damping that prevents oscillations and overshoot. Proportional-integral-derivative gains must be carefully tuned to achieve desired transient response while maintaining stability margins adequate for operation across range of conditions including varying drone velocities, different atmospheric turbulence levels, and changes in link geometry as range varies. Other control algorithms may be used.

Machine learning approach to control algorithm 1513 offers potential advantages over classical proportional-integral-derivative control by learning optimal control strategy from data rather than relying on manually tuned parameters. Machine learning algorithms may predict drone trajectories to improve tracking performance. Neural network trained on historical tracking data can learn complex relationships between current and past errors, drone motion patterns, and optimal correction commands. Recurrent neural network or long short-term memory network can incorporate temporal information, effectively implementing sophisticated predictive control that anticipates future drone motion based on recent trajectory. Machine learning approach is particularly valuable for handling nonlinearities in beam steering hardware 1514 response, adapting to changing atmospheric conditions, and learning characteristic motion patterns of different drone types or flight modes. However, machine learning approach requires substantial training data and validation to ensure stable operation across full range of operating conditions. Hybrid approaches combining proportional-integral-derivative baseline control with machine learning enhancement may provide both guaranteed stability of classical control and performance improvements of learned optimization.

Beam steering hardware 1514 executes correction command from control algorithm 1513 by physically adjusting direction of transmitted optical beam to reduce pointing error toward drone target 1515. Beam steering hardware 1514 represents key technology enabler for disclosed free-space optical communications system, as conventional mechanical gimbals are far too slow, heavy, and power-intensive to meet requirements for tracking control loop 1500 operating at update frequencies greater than 1 kilohertz. Solid-state beam steering technologies including microelectromechanical systems micromirror arrays, optical phased arrays, and spatial light modulators eliminate mechanical gimbals and their associated weight, size, inertia, and reliability limitations. Microelectromechanical systems micromirror arrays employ arrays of individually controllable microscale mirrors, each tilted by electrostatic or electromagnetic actuation to redirect incident light. By coordinating tilt angles across array, beam can be steered in arbitrary direction within field of regard. Response time of individual microelectromechanical systems mirrors is typically under 100 microseconds, allowing beam repositioning at kilohertz rates required for tracking control loop 1500. Optical phased arrays steer beam through interference effects by controlling relative phases of light emitted from array of individual emitters, with each emitter phase controlled by voltage applied to integrated phase shifter. Electronic beam steering through optical phased arrays can be extremely fast, potentially achieving microsecond-level response times. Spatial light modulators control amplitude, phase, or polarization of light in spatially varying pattern, enabling beam steering through holographic or diffractive techniques. Common to all these solid-state beam steering approaches is elimination of mechanical inertia that limits speed of conventional gimbals and servomotors.

Drone target 1515 represents moving object that tracking control loop 1500 must follow. Drone target 1515 corresponds to drone 100 shown in FIG. 1 carrying payload illustrated in FIG. 2 or drone communication system as payload 1420 shown in FIG. 14. Motion characteristics of drone target 1515 drive requirements for tracking control loop 1500. A typical tactical drone may fly at velocities of 10 to 30 meters per second, executing turns with angular rates of several degrees per second. At range of 5 kilometers, 20 meters per second lateral velocity translates to angular rate of 4 milliradians per second, which tracking control loop 1500 must follow continuously. Beyond smooth flight path, drone target 1515 exhibits high-frequency vibration from motors, propellers, and aerodynamic turbulence. These vibrations can reach frequencies of hundreds of hertz with amplitudes of several milliradians, requiring tracking control loop 1500 bandwidth sufficient to follow or filter such disturbances. Provisional patent document describes how control loop frequencies exceeding one kilohertz allow pointing, acquisition, and tracking system to compensate for vibration, atmospheric turbulence, and rapid drone maneuvers that would overwhelm slower mechanical systems. Steered beam from beam steering hardware 1514 illuminates drone target 1515, and return signal from drone target 1515 propagates back to detector 1511 to close feedback loop.

Exemplary tracking control architecture time cycle 1520 shown in middle portion of FIG. 15 illustrates the temporal sequence of operations within single iteration of tracking control loop 1500. Time cycle 1520 comprises three sequential phases that, in this embodiment, complete within a total cycle time of less than 1 millisecond to achieve update frequency greater than 1 kilohertz 1524 as shown in exemplary system specifications 1530. Time is shown as a horizontal arrow at 1525. This aggressive timing requirement drives design of all subsystems within tracking control architecture 1510 of this embodiment, requiring fast detectors, efficient computation, and rapid beam steering actuation.

Detect 1521 represents first phase of time cycle 1520 where detector 1511 measures optical signal returning from drone target 1515. Detect phase 1521 duration is determined by detector 1511 response time and any signal integration or averaging performed to improve signal-to-noise ratio. For avalanche photodiode detector recommended in provisional patent document, intrinsic response time may be well under 1 microsecond, but practical detect phase 1521 duration will be longer to allow adequate photon collection. Tradeoff exists between detect phase 1521 duration and measurement noise, with longer integration times providing better signal-to-noise ratio at cost of increased latency and reduced effective control bandwidth. For tracking control loop 1500 operating at 1 kilohertz update frequency, detect phase 1521 might occupy 100 to 300 microseconds of total 1 millisecond cycle time. Position-sensitive detector or quadrant detector can provide position information immediately after integration period, while imaging detector requires additional time for readout of pixel array. As shown in timeline portion of FIG. 15, detect phase 1521 is shortest of three phases, reflecting relatively simple hardware operation of photodetection compared to subsequent computational and mechanical operations.

Compute 1522 represents second phase of time cycle 1520 where position error computation 1512 and control algorithm 1513 process detector 1511 measurements to generate correction command for beam steering hardware 1514. Compute phase 1522 duration depends on computational complexity of error computation and control algorithms and on processing hardware performance. For simple proportional-integral-derivative control with analog or simple digital implementation, compute phase 1522 might require only tens of microseconds. For machine learning control algorithm 1513 involving neural network evaluation, compute phase 1522 may require several hundred microseconds depending on network size and complexity. Hardware acceleration using field-programmable gate arrays or graphics processing units mentioned in description of computing system 1350 can reduce compute phase 1522 latency by parallelizing operations and eliminating software overhead. As shown in timeline of FIG. 15, compute phase 1522 occupies substantial portion of total cycle time, reflecting computational intensity of error computation and control law evaluation. Optimization of compute phase 1522 efficiency is critical for achieving overall cycle time 1524 of less than 1 millisecond.

Steer 1523 represents third and final phase of time cycle 1520 where beam steering hardware 1514 executes correction command to adjust beam pointing direction. Steer phase

1523 duration is determined by response time of beam steering hardware 1514, which varies dramatically depending on technology employed. Conventional mechanical gimbals typically require tens to hundreds of milliseconds to complete commanded motion, which would be far too slow for tracking control loop 1500 operating at 1 kilohertz update rate. This fundamental limitation of mechanical systems motivated development of solid-state beam steering approaches that eliminate mechanical inertia. Microelectromechanical systems micromirrors can complete transitions in under 100 microseconds, fast steering mirrors employing voice coil actuators can achieve response times of few hundred microseconds, and optical phased arrays can electronically redirect beam in microseconds. Timeline shown in FIG. 15 depicts steer phase 1523 as occupying significant portion of cycle time, though shorter than compute phase 1522. After steer phase 1523 completes, corrected beam illuminates drone target 1515, return signal propagates back to detector 1511, and next cycle begins with detect phase 1521 measuring updated signal.

Figure 16:
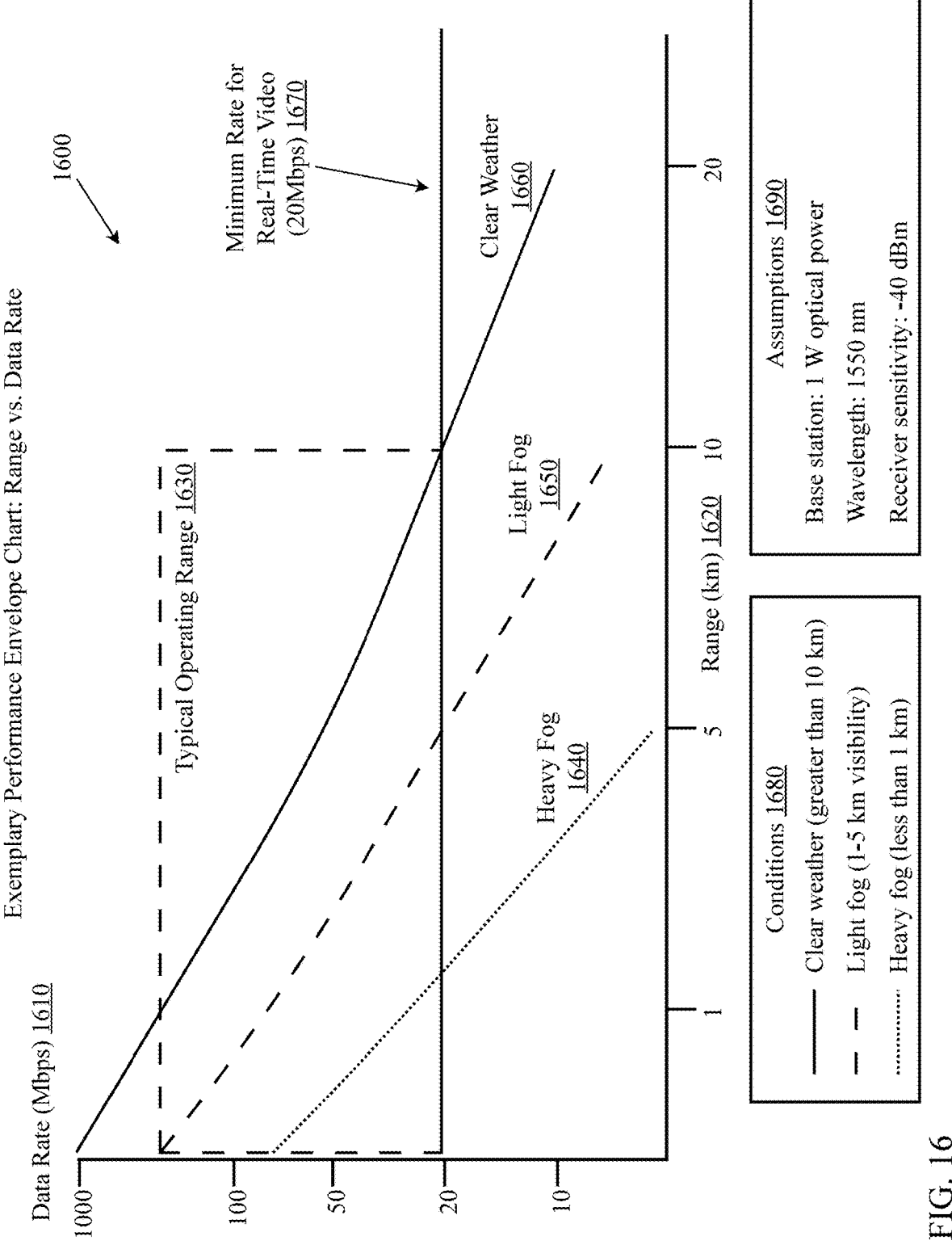
FIG. 16 illustrates an exemplary performance envelope chart for a free-space optical communication system for drone networks.

FIG. 16 illustrates an exemplary performance envelope chart 1600 showing the relationship between communication range and achievable data rate under various atmospheric conditions for disclosed free-space optical communications system. Performance envelope chart 1600 provides information for mission planning, allowing operators to understand what communication performance can be expected at different ranges and weather conditions. This information enables informed decisions about drone deployment distances, video quality settings, and operational limitations under degraded weather. Performance envelope defined by chart 1600 demonstrates practical utility of the system disclosed herein across operationally relevant conditions, showing that real-time video communications at 20 megabits per second or higher can be maintained at ranges exceeding 10 kilometers in clear weather, with graceful degradation to shorter ranges under adverse atmospheric conditions.

Data rate 1610 represents vertical axis of performance envelope chart 1600 and quantifies information throughput that can be reliably communicated through free-space optical link under specified conditions. Data rate 1610 is expressed in megabits per second and spans from 10 megabits per second at lower end to 1000 megabits per second at upper end, covering more than two orders of magnitude in communication bandwidth. This wide range accommodates diverse mission requirements from basic telemetry and low-resolution video at lower data rates through high-definition real-time video at intermediate rates to future applications requiring very high bandwidth. The logarithmic scale used for data rate axis 1610 allows visualization of performance across this wide dynamic range. Achievable data rate at any given range depends fundamentally on received signal-to-noise ratio, which determines bit error rate that can be achieved with available forward error correction and modulation schemes. Higher received signal-to-noise ratio supports higher-order modulation and less aggressive error correction, enabling higher data rates. As range increases or atmospheric conditions degrade, received signal-to-noise ratio decreases, forcing system to reduce data rate to maintain acceptable bit error rate typically better than $10^{-9}$ for reliable communications.

Range 1620 represents horizontal axis of performance envelope chart 1600 and quantifies distance between base station configuration 1300 and drone communication system as payload 1420 carried by drone. Range 1620 is expressed in kilometers and spans from 1 kilometer to 20 kilometers, covering tactical engagement distances relevant for small drone operations. This range capability far exceeds radio frequency communications ranges achievable by small tactical drones in radio frequency denied environments where jamming and spoofing render conventional links unreliable beyond few hundred meters. Optical link budget that determines maximum achievable range depends on multiple factors including transmit power from high-power transmitter 1310, aperture sizes of large aperture optics 1320 at base station and optics within payload 1420, pointing accuracy maintained by tracking control loop 1500, atmospheric transmission losses, and receiver sensitivity of high-sensitivity receiver 1340 or detector within payload. Asymmetric architecture enabling base station to employ high transmit power and large aperture while payload remains lightweight is fundamental to achieving ranges shown in chart 1600.

Typical operating range 1630 indicated by a dashed box in chart 1600 represents nominal standoff distance at which disclosed system is expected to operate for typical intelligence, surveillance, and reconnaissance missions. Typical operating range 1630 is from 0 km to approximately 10 kilometers, which provides substantial standoff distance allowing drone to operate beyond direct line of sight from launch point while maintaining reliable high-bandwidth communications. This standoff distance is particularly important for military applications where base station configuration 1300 may need to remain concealed or protected from enemy action while drone conducts reconnaissance or surveillance of forward areas. Intersection of typical operating range 1630 with various performance curves shows what data rates can be expected under different weather conditions at this nominal operating distance. In clear weather indicated by curve 1660, data rate at typical operating range 1630 remains well above 20 megabits per second required for real-time video, while degraded weather conditions reduce available data rate but may still support communications mission depending on requirements.

Heavy fog curve 1640 shown as dotted line represents most degraded atmospheric condition illustrated in chart 1600. Heavy fog 1640 corresponds to meteorological visibility less than 1 kilometer as specified in conditions 1680, indicating presence of dense water droplets that severely attenuate optical signals through scattering and absorption. Under heavy fog conditions 1640, achievable data rate decreases rapidly with range, falling below 100 megabits per second at ranges less than 1 kilometer and continuing to degrade at longer distances. The steep slope of heavy fog curve 1640 indicates strong sensitivity to range under these conditions, with each kilometer of additional propagation distance causing substantial reduction in available signal-to-noise ratio. Free-space optical communications systems are severely impacted by line-of-sight blockage and atmospheric conditions including fog. However, even under heavy fog conditions 1640, disclosed system maintains communications capability at short ranges where radio frequency alternatives would be completely jammed in contested environments, providing critically important jam-resistant communications even when atmospheric conditions limit range.

Light fog curve 1650 shown as dashed line represents moderately degraded atmospheric conditions with meteorological visibility between 1 and 5 kilometers as specified in conditions 1680. Light fog 1650 produces less severe attenuation than heavy fog 1640 due to lower concentration of scattering particles, allowing longer range communications at given data rate. Performance under light fog conditions 1650 falls between extremes of heavy fog 1640 and clear weather 1660, providing operationally useful compromise. At typical operating range 1630 of approximately 10 kilometers, light fog curve 1650 indicates achievable data rate near or slightly below 20 megabits per second threshold for real-time video, suggesting that missions may need to reduce range, accept lower video quality, or wait for improved weather depending on specific requirements and priorities. At shorter ranges of 5 kilometers or less, light fog conditions 1650 permit data rates well above 20 megabits per second, maintaining full high-definition video capability. Light fog represents relatively common atmospheric condition in many operational environments, so performance under these conditions is particularly relevant for assessing the practical utility of disclosed system.

Clear weather curve 1660 shown as solid line represents best-case atmospheric conditions with meteorological visibility greater than 10 kilometers as specified in conditions 1680. Clear weather 1660 minimizes atmospheric attenuation, with optical transmission limited primarily by molecular absorption and Rayleigh scattering rather than particulate scattering from fog, haze, or smoke. Under clear weather conditions 1660, disclosed system achieves its maximum performance envelope, supporting very high data rates at extended ranges. At typical operating range 1630 of approximately 10 kilometers, clear weather curve 1660 indicates achievable data rate between 20 and 50 megabits per second, comfortably exceeding minimum rate for real-time video 1670 and allowing margin for compressed high-definition video or multiple video streams. Even at maximum range of 20 kilometers shown on horizontal axis, clear weather curve 1660 remains above 10 megabits per second, demonstrating extended standoff capability valuable for surveillance missions where drone must operate at long distances from base station. The relatively gentle slope of clear weather curve 1660 compared to fog conditions indicates that performance under clear weather is less sensitive to range variations, allowing more flexible mission planning without severe range-data rate tradeoffs.

Minimum rate for real-time video 1670 indicated by horizontal line at 20 megabits per second represents a typical threshold distinguishing between communication links capable of supporting primary mission objective of real-time video transmission and those limited to lower-bandwidth applications. A value of 20 megabits per second for minimum rate 1670 corresponds to compressed high-definition video using modern H.264 or H.265 codecs, providing resolution and frame rate adequate for intelligence, surveillance, and reconnaissance missions while maintaining manageable bandwidth requirements. Intersection of minimum rate for real-time video 1670 with various weather condition curves defines maximum ranges at which video mission can be conducted under each atmospheric condition. Under clear weather 1660, video communications can be maintained beyond typical operating range 1630 of 10 kilometers. Under light fog 1650, video range is constrained to approximately 10 kilometers or slightly less. Under heavy fog 1640, video communications are limited to very short ranges of few kilometers, though system continues to support lower data rate communications at longer distances.

Conditions 1680 legend box in lower left of chart 1600 defines three atmospheric scenarios represented by curves in graph with a solid line curve representing clear conditions, a dashed line representing light fog, and a dotted line representing heavy fog.

Assumptions 1690 legend box in lower right of chart 1600 specifies assumed system parameters used to generate these performance curves, including that the base station employs 1 watt optical power from high-power transmitter, a wavelength of 1550 nanometers, and that receiver sensitivity of negative 40 decibels can be reliably detected by high-sensitivity receiver of base station. This sensitivity level is achievable with avalanche photodiode detectors recommended in provisional patent document, particularly when cooled to reduce thermal noise.

Figure 17:
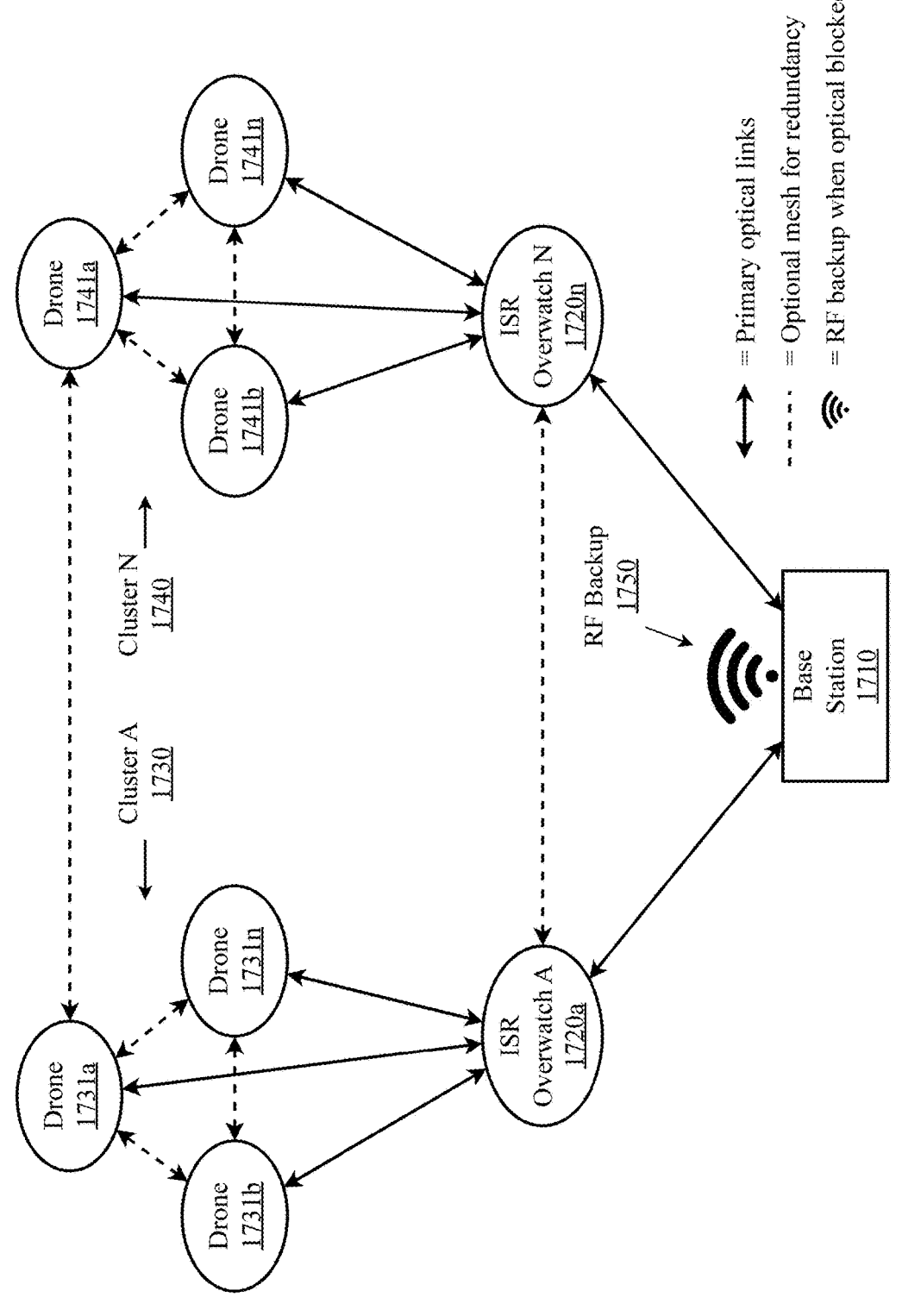
FIG. 17 illustrates an exemplary swarm network topology for a free-space optical communication system for drone networks.

FIG. 17 illustrates an exemplary swarm network topology 1700 for implementing high-bandwidth free space optical communications links for drone networks operating in RF-denied or contested environments. The system architecture demonstrates a hierarchical mesh network configuration that enables jam-free, low probability of intercept and low probability of detection communications across multiple drone platforms while maintaining operational resilience through redundant connectivity pathways.

At the foundation of the network topology is base station 1710, which serves as the primary command and control node for the entire swarm communications architecture. Base station 1710 is capable of pointing, acquisition, and tracking of remote devices and includes a receiver capable of receiving real-time video data at rates exceeding 20 megabits per second from remote platforms. Base station 1710 of this embodiment further includes a transmitter capable of sending control data to remote platforms using infrared optical signals in the wavelength range of 800 nanometers to 1 millimeter, with a preferred data wavelength of 1550 nanometers. Base station 1710 may be mounted on various platforms including fixed towers, vehicle-mounted mobile installations such as those on Humvees, tripod-deployed portable systems, or aerial platforms such as large overwatch drones capable of carrying substantial payloads to high altitudes.

Connected to base station 1710 through primary optical links are multiple intelligence, surveillance, and reconnaissance (ISR) overwatch platforms including ISR overwatch A 1720*a* through ISR overwatch N 1720*n*, where N represents an arbitrary number of overwatch drones that can be deployed based on mission requirements and operational area coverage needs. These ISR overwatch platforms serve as intermediate relay nodes that extend the effective range and coverage area of the optical communications network while providing enhanced situational awareness through their elevated vantage points. Each ISR overwatch platform carries optical communications terminals with specifications suitable for Group 2 drones having payload capacities of 10 to 25 kilograms, though the specific payload weight varies based on the drone platform selected for the overwatch mission.

ISR overwatch A 1720*a* maintains optical communications links with cluster A 1730, which comprises multiple mission drones including drone 1731*a*, drone 1731*b*, and drone 1731*n*. Similarly, ISR overwatch N 1720*n* maintains optical communications links with cluster N 1740, which comprises mission drones including drone 1741*a*, drone 1741*b*, and drone 1741*n*. The clustering architecture allows for localized command and control within each operational area while maintaining connectivity back to base station 1710 through the overwatch platforms.

Each mission drone within the clusters carries remote communications equipment having sufficiently low weight and power requirements to serve as a drone payload, specifically designed to meet constraints of less than 10 kilograms and less than 10 watts power consumption. In preferred embodiments targeting smaller tactical drones, the payload weight is further reduced to less than 2 kilograms or even less than 1 kilogram through the use of solid-state beam steering technologies including microelectromechanical systems micromirror arrays, optical phased arrays, and photonic integrated circuits that eliminate the need for heavy mechanical gimbals traditionally required for pointing, acquisition, and tracking functions.

The primary optical links between nodes are indicated by solid lines and utilize free space optical communications operating exclusively in infrared wavelengths. These primary links enable high-bandwidth bidirectional communications with mission drones receiving control commands from base station 1710 through the overwatch relay platforms and sending real-time video data back through the same optical pathways. The optical communications achieve data rates exceeding 20 megabits per second, with preferred embodiments supporting 50 megabits per second or 100 megabits per second to accommodate high-resolution video streams and other sensor data requiring substantial bandwidth.

Optional mesh networking connections between drones within each cluster are indicated by dashed lines, providing redundant communication pathways that enhance network resilience. For example, within cluster A 1730, drone 1731*a* can communicate directly with drone 1731*b* and drone 1731*n* through optical mesh links, allowing continued operations even if the primary link to ISR overwatch A 1720*a* is temporarily blocked or disrupted. Similarly, within cluster N 1740, drone 1741*a*, drone 1741*b*, and drone 1741*n* maintain optional mesh connections that create multiple routing paths for data transmission.

Cross-cluster mesh networking capability is also illustrated, with dashed lines connecting drones across different clusters, such as the connection between drone 1731*a* in cluster A 1730 and drone 1741*a* in cluster N 1740. This cross-cluster mesh networking enables swarm operations where multiple drones coordinate their activities and share situational awareness data without necessarily routing all communications through the overwatch platforms or base station 1710. The mesh architecture implements dynamic routing protocols that automatically select optimal transmission paths based on link quality, available bandwidth, and network topology changes as drones maneuver within the operational area.

RF backup 1750 provides an auxiliary communications channel using radio frequency signals as indicated by the wireless symbols connecting ISR overwatch A 1720*a*, ISR overwatch N 1720*n*, and base station 1710. This RF backup capability ensures continuous connectivity even when optical line-of-sight is blocked by obstacles, atmospheric conditions such as dense fog, or other environmental factors that degrade free space optical link performance. The hybrid architecture implements automatic failover mechanisms that seamlessly transition between optical and RF communications modes based on link quality assessments and signal strength measurements. When optical communications are available, the system preferentially uses the optical links due to their higher bandwidth, improved security characteristics, and resistance to radio frequency jamming. When optical links are temporarily unavailable, the system automatically switches to RF backup 1750 to maintain minimum essential communications, then reverts to optical communications when line-of-sight is reestablished.

The pointing, acquisition, and tracking systems within each terminal enable rapid beam steering to establish and maintain optical links despite drone movement and vibration. Acquisition of optical links utilizes multiple complementary methods including optical beacons with position-sensitive detectors, retroreflector-based passive tracking, camera or detector-based visual acquisition, low-rate RF side-channel communications for initial positioning, mission planning to acquire links at short standoff distances, and machine learning algorithms for predictive tracking. The control loop frequency for the pointing and tracking systems operates at rates exceeding 1 kilohertz to compensate for drone motion and atmospheric turbulence effects.

The network topology 1700 enables swarm operations where multiple drones coordinate their activities in RF-denied zones through the optical mesh network. Dynamic routing algorithms implemented in the processors at each node determine optimal data paths through the network based on current link status, available bandwidth, latency requirements, and mission priorities. Time-division multiplexing allows individual terminals to communicate with multiple other terminals by rapidly switching the optical beam between different targets according to a predetermined timing schedule synchronized across the network.

Security features inherent to the free space optical communications include the extremely narrow beamwidths that make interception difficult without being physically positioned along the beam path, the use of eye-safe infrared wavelengths that are not visible to the human eye, and the absence of radio frequency emissions that would otherwise be detectable by signals intelligence systems. Additional security layers including encryption of the data stream and authentication protocols prevent unauthorized access even if an adversary manages to intercept portions of the optical signal through scattered light.

The system operates effectively across ranges exceeding 1 kilometer, with preferred embodiments achieving ranges exceeding 5 kilometers or 10 kilometers under favorable atmospheric conditions. Tracking speeds exceed 10 degrees per second to follow maneuvering drones, with preferred embodiments achieving 30 degrees per second or 50 degrees per second tracking capability. Pointing accuracy is maintained at better than 50 microradians, with preferred embodiments achieving pointing accuracy better than 10 microradians to ensure adequate power coupling into the receive aperture despite the long propagation distances and small receiver sizes.

Acquisition time for establishing new optical links is kept below 10 seconds, with preferred embodiments achieving acquisition in less than 5 seconds to minimize vulnerability during the initial link establishment phase. The field of regard for the solid-state beam steering systems exceeds 90 degrees in at least one axis, enabling hemispherical coverage from the drone payloads without requiring mechanical rotation of the entire terminal assembly.

The swarm network topology 1700 thus provides a robust, high-bandwidth communications architecture for tactical drone operations in contested electromagnetic environments where traditional radio frequency communications are jammed or otherwise denied, while maintaining the flexibility to employ RF backup 1750 when optical line-of-sight is temporarily unavailable, thereby ensuring mission success across a wide range of operational scenarios and environmental conditions.

Exemplary Computer System for Computer-Implemented Aspects and Embodiments

Figure 18:
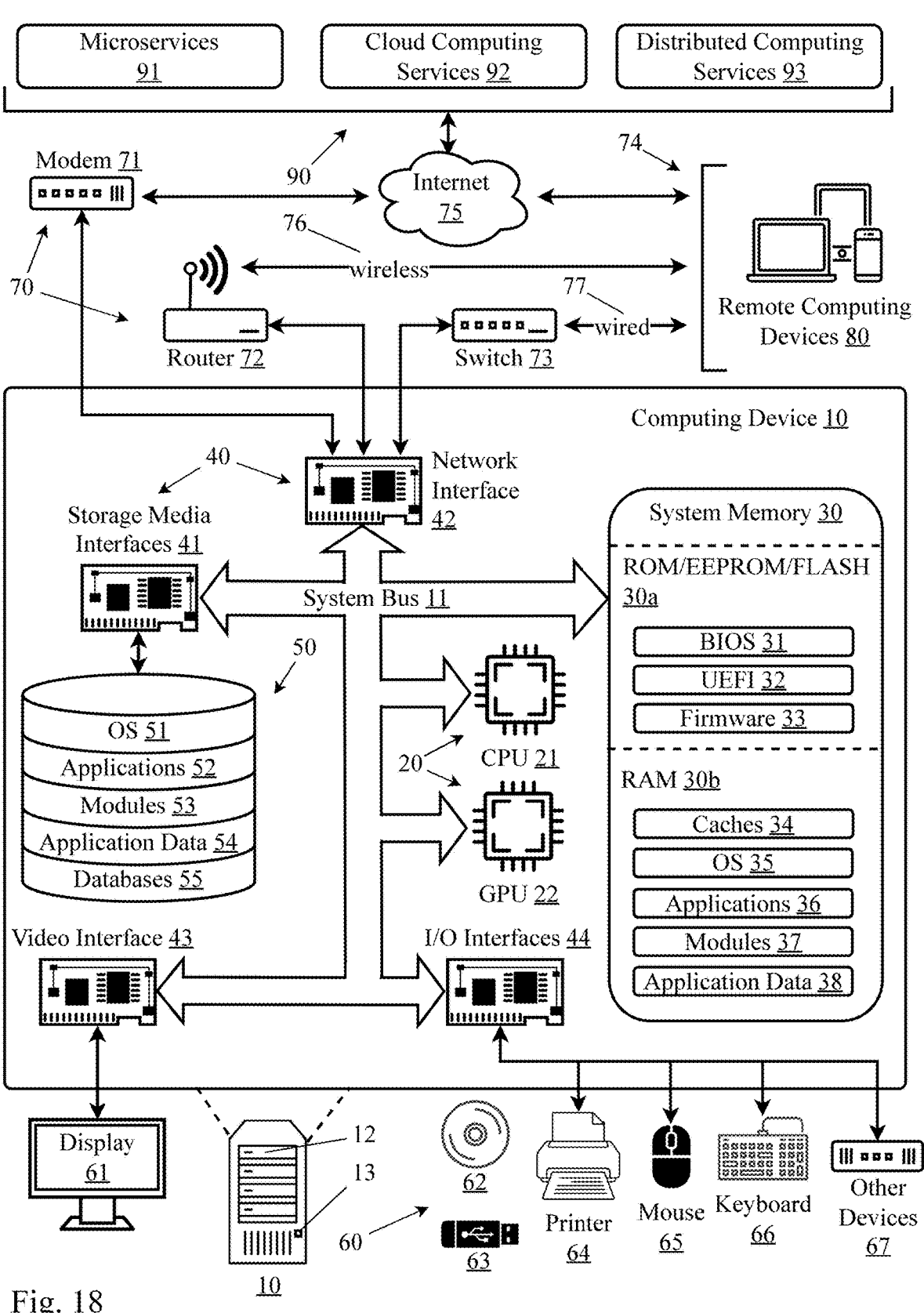
FIG. 18 illustrates an exemplary computer system on which embodiments described herein may be implemented.

FIG. 18 illustrates an exemplary computer system on which embodiments described herein may be implemented, in full or in part. This exemplary computer system describes computer-related components and processes supporting enabling disclosure of computer-implemented embodiments. Inclusion in this exemplary computer system of well-known processes and computer components, if any, is not a suggestion or admission that any aspect or embodiment is no more than an aggregation of such processes or components. Rather, implementation of an aspect or embodiment using processes and components described in this exemplary computer system will involve programming or configuration of such processes and components resulting in a machine specially programmed or configured for such implementation. The exemplary computer system described herein is only one example of such an environment and other configurations of the components and processes are possible, including other relationships between and among components, and/or absence of some processes or components described. Further, the exemplary computer system described herein is not intended to suggest any limitation as to the scope of use or functionality of any embodiment implemented, in whole or in part, on components or processes described herein.

The exemplary computer system described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computer architectures, operating systems, and environments.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computer system are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computer architectures. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A free space optical communication system for unmanned aerial vehicles, the system comprising:
   a base station optical communications device configured to transmit and receive optical signals, the base station comprising:
      a laser light source configured to produce an outgoing laser emission;
      a first pointing, acquisition, and tracking (PAT) module operating on a first computing device, the first PAT module configured to acquire and track an unmanned aerial vehicle; and
      a first solid-state beam steering device configured to aim the outgoing laser emission at the unmanned aerial device based on tracking information from the first PAT module;
   an unmanned aerial vehicle optical communications device comprising:
      a common optics arrangement configured to both receive the outgoing laser emission from the base station and transmit a return laser emission to the base station through a single shared aperture;
      a second PAT module operating on a second computing device, the second PAT module configured to acquire and track the base station; and
      a second solid-state beam steering device configured to aim the return laser emission at the base station optical communications device based on tracking information from the second PAT module; and a fiber optic coupler between the common optics arrangement and the second solid-state beam steering device.

2. The system of claim 1, wherein the unmanned aerial vehicle optical communications device is configured as a payload for the unmanned aerial vehicle.

3. The system of claim 1, wherein the outgoing laser emission and the return laser emission are in the infrared spectrum from 800 nm to 1 mm.

4. The system of claim 3, wherein the outgoing laser emission and the return laser emission are in the range of 1,250 nanometers to 1,850 nanometers (1,550 nm+/−300 nm).

5. The system of claim 1, wherein:
   the second solid state beam steering device comprises retroreflectors or micromirrors; and
   the return laser emission is a reflection of the outgoing laser emission from the retroreflectors or micromirrors of the second solid-state beam steering device.

6. The system of claim 1, wherein:
   the unmanned aerial vehicle optical communications device further comprises a second laser light source;
   the return laser emission is a laser emission from the second laser light source; and
   the second solid-state beam steering device comprises an optical phased array (OPA) or a photonic integrated circuits (PIC).

7. The system of claim 1, wherein:
   the base station optical communications device further comprises:
      a third laser light source configured to produce a second outgoing laser emission; and
      a first dichroic mirror;
   the unmanned aerial vehicle optical communications device further comprises:
      a second dichroic mirror;
      a beacon position detector; and
      a data light detector;
   wherein:
      the first outgoing laser emission is a beacon signal at a first wavelength;
      the second outgoing laser emission is a data signal at a second wavelength;
      the first dichroic mirror is configured to merge the first outgoing laser emission and the second outgoing laser emission into a dual-wave beam aimed at the unmanned aerial vehicle;
      the second dichroic mirror is configured to separate the dual-wave beam back into the first outgoing laser emission and the second outgoing laser emission;
      the beacon position detector is configured to decode the beacon signal of the first outgoing laser emission; and
      the data light detector is used to decode the data signal of the second outgoing laser emission.

8. The system of claim 7, wherein:
   the first wavelength is in the range of 800 nanometers to 1,250 nanometers;
   the second wavelength is in the range of 1,250 nanometers to 1,850 nanometers; and
   the dichroic mirrors are configured to reflect the first wavelength and pass through the second wavelength.

9. The system of claim 1, wherein:
   the base station optical communications device further comprises:
      a first radio frequency communications subsystem;

a first link monitor operating on the first computing device; and a first switching logic module operating on the first computing device;

the unmanned aerial vehicle optical communications device further comprises:

a second radio frequency communications subsystem;

a second link monitor operating on the second computing device; and a second switching logic module operating on the second computing device;

wherein:

the link monitors monitor a quality of an optical communications connection and a quality of a radio frequency communications connection between the base station optical communications device and the unmanned aerial vehicle optical communications device;

when the switching logic modules determine that the quality of the optical communications connection falls below a threshold, they switch to radio frequency communications using the radio frequency communications systems, and vice-versa.

10. The system of claim 9, wherein a tracking control loop operating on the base station optical communications device comprising a cycle of detection of a laser emission, position error computation, control algorithm calculation, beam steering, and laser emission to a target operates at 1 millisecond or less per cycle.

11. A method of free space optical communication for unmanned aerial vehicles, the method comprising the steps of:

at a base station optical communications device configured to transmit and receive optical signals:

producing an outgoing laser emission using a laser light source;

acquiring and tracking an unmanned aerial vehicle using a first pointing, acquisition, and tracking (PAT) module operating on a first computing device; and aiming the outgoing laser emission at the unmanned aerial device using a first solid-state beam steering device based on tracking information from the first PAT module;

at an unmanned aerial vehicle optical communications device:

receiving the outgoing laser emission from the base station and transmitting a return laser emission to the base station through a single shared aperture using a common optics arrangement;

acquiring and tracking the base station using a second PAT module operating on a second computing device; and aiming the return laser emission at the base station optical communications device using a second solid-state beam steering device based on tracking information from the second PAT module; and coupling optical signals between the common optics arrangement and the second solid-state beam steering device using a fiber optic coupler.

12. The method of claim 11, wherein the unmanned aerial vehicle optical communications device is configured as a payload for the unmanned aerial vehicle.

13. The method of claim 11, wherein the outgoing laser emission and the return laser emission are in the infrared spectrum from 800 nm to 1 mm.

14. The method of claim 13, wherein the outgoing laser emission and the return laser emission are in the range of 1,250 nanometers to 1,850 nanometers (1,550 nm+/−300 nm).

15. The method of claim 11, wherein:

the second solid state beam steering device comprises retroreflectors or micromirrors; and the return laser emission is a reflection of the outgoing laser emission from the retroreflectors or micromirrors of the second solid-state beam steering device.

16. The method of claim 11, wherein:

the unmanned aerial vehicle optical communications device further comprises a second laser light source;

the return laser emission is a laser emission from the second laser light source; and the second solid-state beam steering device comprises an optical phased array (OPA) or a photonic integrated circuits (PIC).

17. The method of claim 11, further comprising the steps of:

at the base station optical communications device:

producing a second outgoing laser emission using a third laser light source;

merging a first outgoing laser emission and the second outgoing laser emission into a dual-wave beam aimed at the unmanned aerial vehicle using a first dichroic mirror;

at the unmanned aerial vehicle optical communications device:

separating the dual-wave beam back into the first outgoing laser emission and the second outgoing laser emission using a second dichroic mirror;

decoding a beacon signal of the first outgoing laser emission using a beacon position detector; and decoding a data signal of the second outgoing laser emission using a data light detector;

wherein:

the first outgoing laser emission is the beacon signal at a first wavelength; and the second outgoing laser emission is the data signal at a second wavelength.

18. The method of claim 17, wherein:

the first wavelength is in the range of 800 nanometers to 1,250 nanometers;

the second wavelength is in the range of 1,250 nanometers to 1,850 nanometers; and the dichroic mirrors are configured to reflect the first wavelength and pass through the second wavelength.

19. The method of claim 11, further comprising the steps of:

monitoring a quality of an optical communications connection and a quality of a radio frequency communications connection between the base station optical communications device and the unmanned aerial vehicle optical communications device using a first link monitor operating on the first computing device and a second link monitor operating on the second computing device;

when a first switching logic module operating on the first computing device and a second switching logic module operating on the second computing device determine that the quality of the optical communications connection falls below a threshold, switching to radio frequency communications using a first radio frequency communications subsystem at the base station optical communications device and a second radio frequency communications subsystem at the unmanned aerial vehicle optical communications device, and vice-versa.

20. The method of claim 19, wherein a tracking control loop operating on the base station optical communications device comprising a cycle of detecting a laser emission, computing position error, calculating a control algorithm, steering a beam, and emitting a laser to a target operates at 1 millisecond or less per cycle.

* * * * *